United States Patent [19]

Strandberg

[11] 4,189,625
[45] Feb. 19, 1980

[54] METHOD AND APPARATUS FOR PROCESSING DUAL FREQUENCY DIGITAL INFORMATION SIGNALS

[76] Inventor: Terry W. Strandberg, 614 Park Rd., Redwood City, Calif. 94062

[21] Appl. No.: 886,181

[22] Filed: Mar. 13, 1978

[51] Int. Cl.² .............................................. H04J 3/12
[52] U.S. Cl. ........................ 179/15 BY; 179/84 VF; 179/15.55 T; 179/15 AP
[58] Field of Search ....... 179/15 BY, 15 BA, 15 BW, 179/15.55 T, 15 AP, 84 VF; 325/38 B; 340/347 DD

[56] References Cited
U.S. PATENT DOCUMENTS

| 3,936,611 | 2/1976 | Poole | 179/15.55 T |
| 3,980,953 | 9/1976 | Nance et al. | 179/15 AP |

Primary Examiner—Bernard Konick
Assistant Examiner—Joseph A. Popek
Attorney, Agent, or Firm—Townsend and Townsend

[57] ABSTRACT

A method and system for permitting high quality analog signal processing to multiple channel digital information signals, which requires a minimal number of analog signal processing elements and which is transparent to a host communication system.

Multiple channel digital information signals are time compressed by a factor sufficient to permit subsequent digital-to-analog conversion and analog signal processing, such as DTMF or FSK filtering, and conversion from one digital code to another, to be effected by circuitry which is common to all of a given number of information channels, with the processed analog signals then converted to resulting digital signals which are time expanded in such a manner as to be completely compatible with the digital signal flow format of the host communication system. Time compression is effected by storing the individual input digital signals in an input memory in their order of appearance at substantially the data input rate and reading the stored characters from the input memory at a substantially greater rate in information channel groups, each group comprising a predetermined number of samples from a particular channel. Each information channel group is processed in the analog domain and the resulting signals are converted to digital form and time expanded by storing the converted digital signals in an output memory and reading the stored signals from the output memory at rates preselected to provide the complementary time expansion.

Both contiguous time processing and packet processing, as well as a special time encoding/time decoding technique can be employed in the invention.

119 Claims, 31 Drawing Figures

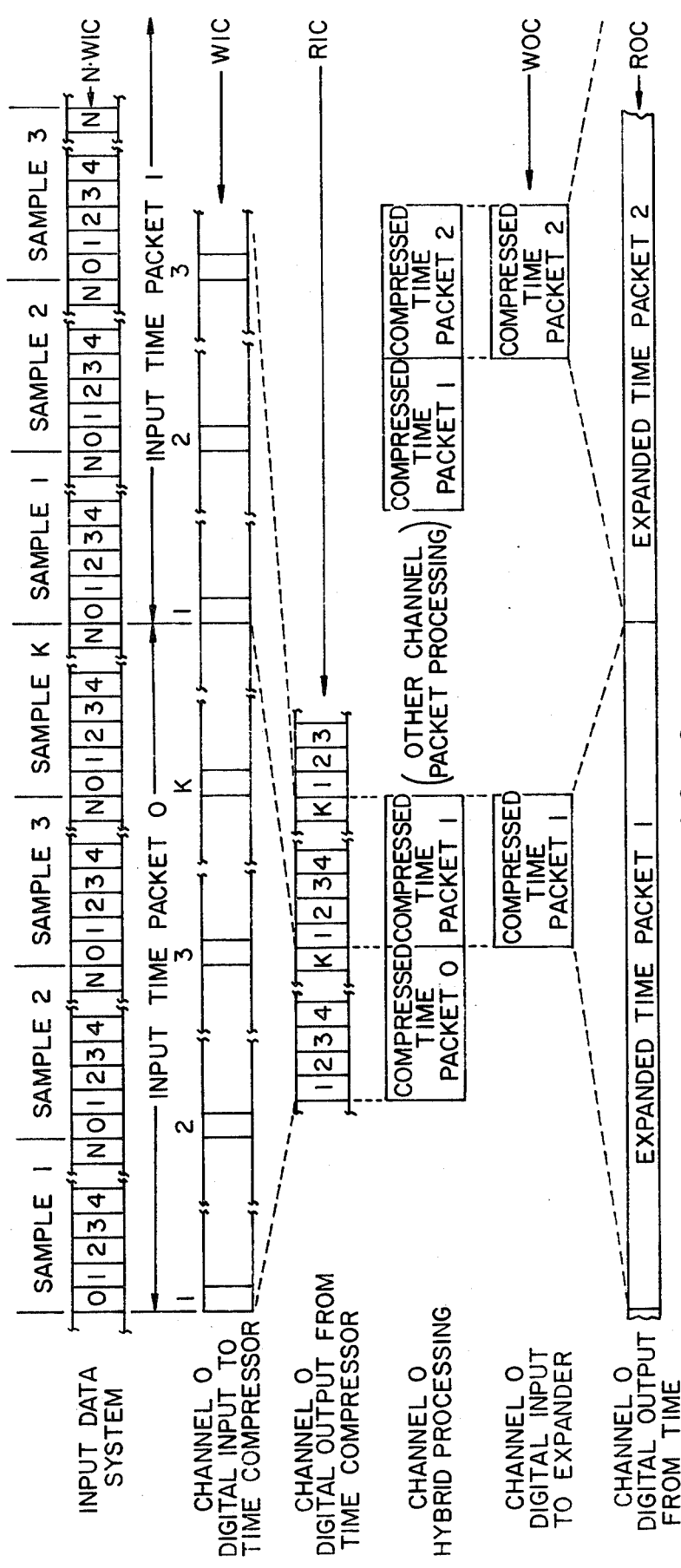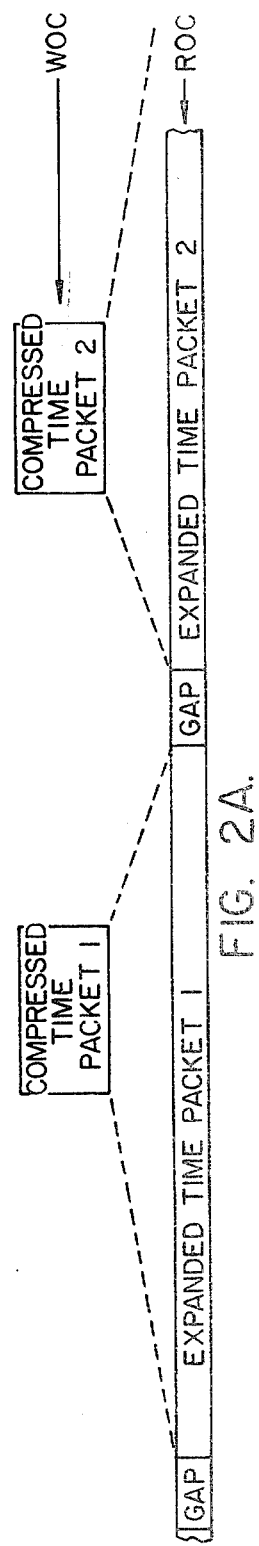
FIG. 2.
FIG. 2A.

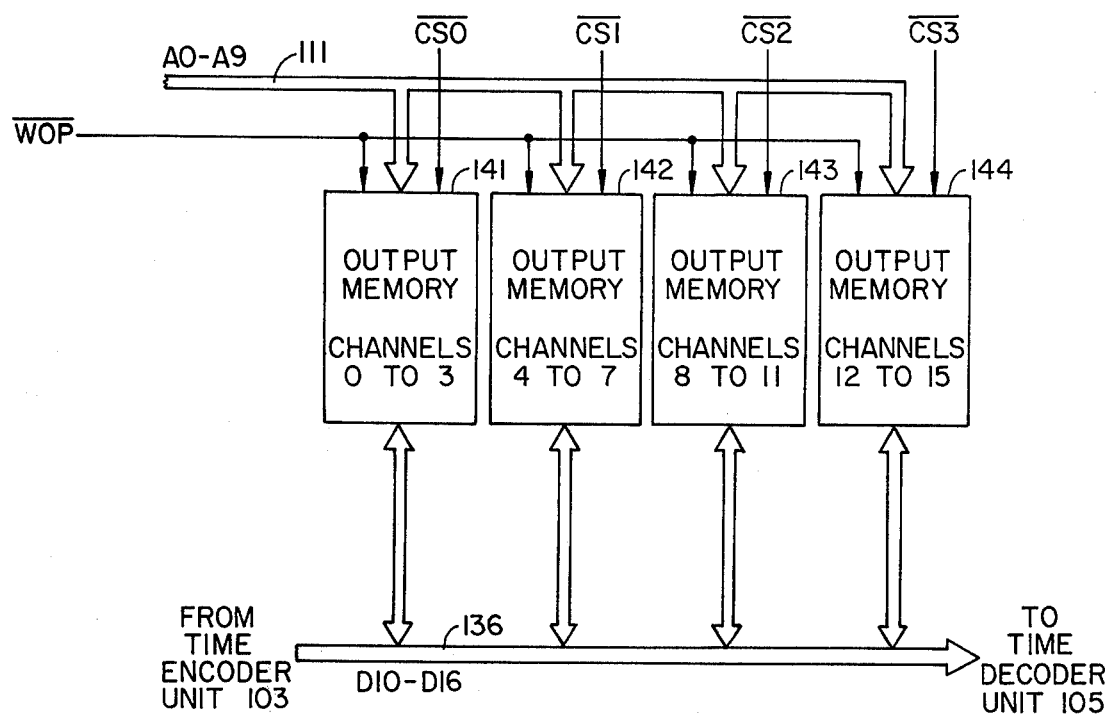
FIG. 16.
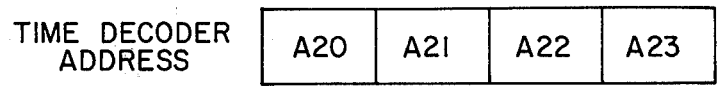
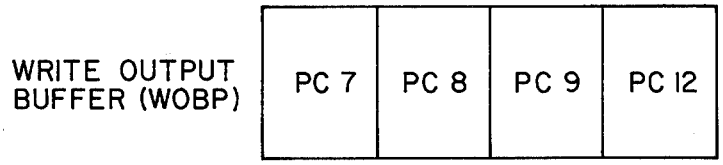
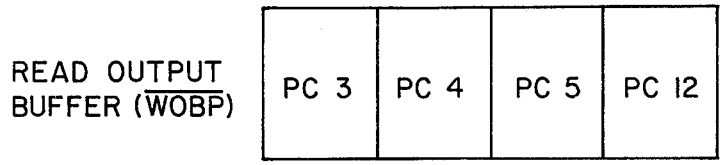
TIME DECODER ADDRESSING
FIG. 23.

FIG. 19. READ INPUT / WRITE OUTPUT TIMING

| INPUT/OUTPUT MEMORY ADDRESS | A0 | A1 | A2 | A3 | A4 | A5 | A6 | A7 | A8 | A9 | A10 | A11 |
|---|---|---|---|---|---|---|---|---|---|---|---|---|
| WRITE INPUT (WI) | PC 12 | PC 13 | PC 14 | PC 15 | PC 16 | PC 17 | PC 18 | PC 19 | PC 8 | PC 9 | PC 10 | PC 11 |
| READ OUTPUT (RO=ROH+ROL) | PC 12 | PC 13 | PC 14 | PC 15 | PC 16 | PC 17 | PC 18 | PC 7 | PC 8 | PC 9 | PC 10 | PC 11 |
| READ INPUT (RI) | PC 6 | PC 7 | PC 8 | PC 9 + PC 15 | PC 10 + PC 16 | PC 11 + PC 17 | PC 12 + PC 18 | PC 13 + PC 19 | PC 15 | PC 16 | PC 17 | PC 18 |
| WRITE OUTPUT ADDRESS | PC 6 | PC 7 + 1 | PC 8 | PC 9 + PC 15 | PC 10 + PC 16 | PC 11 + PC 17 | PC 12 + PC 18 | PC 13 + PC 19 | PC 15 | PC 16 | PC 17 | PC 18 |

INPUT/OUTPUT MEMORY ADDRESSING

FIG. 22.

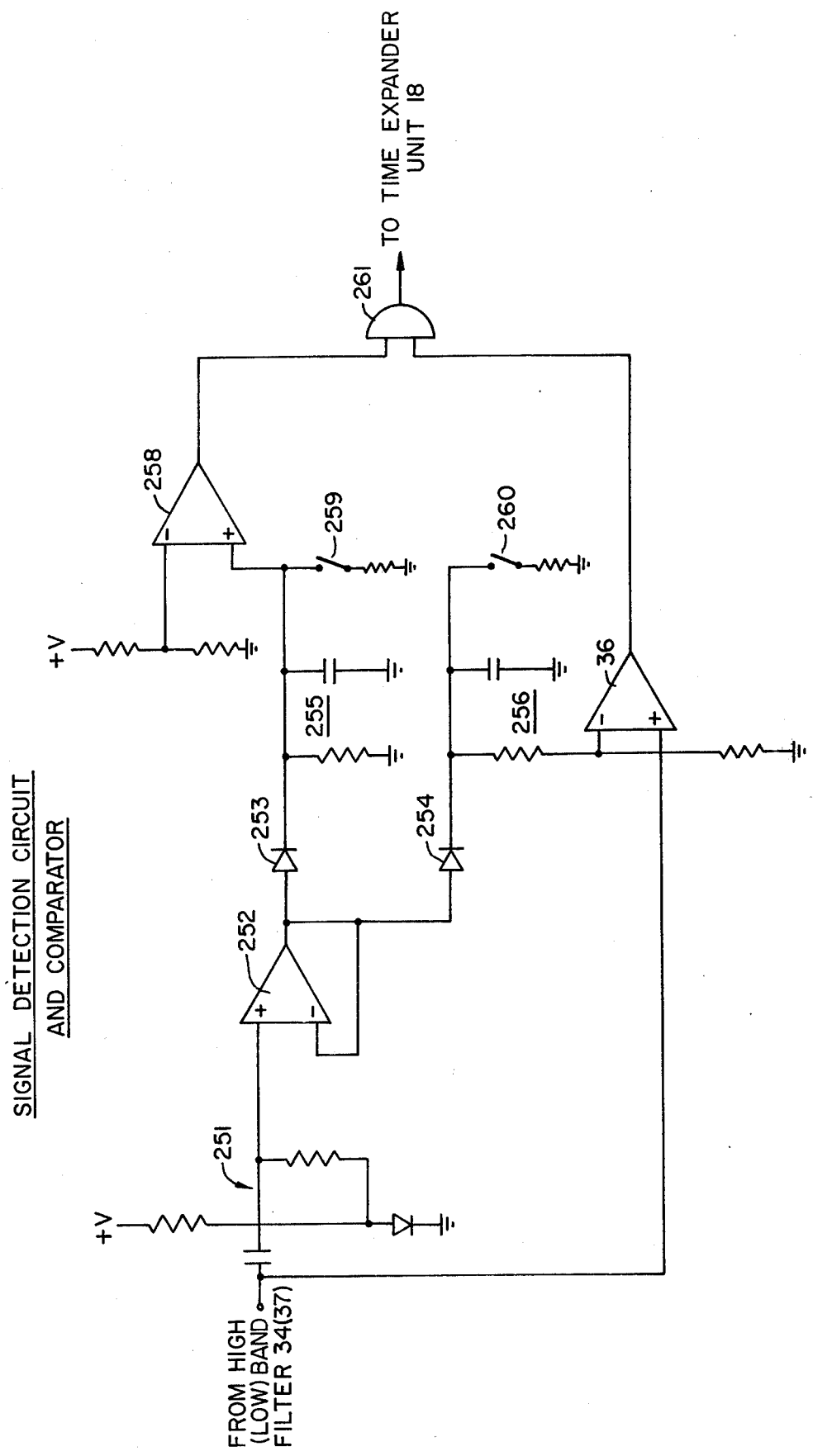

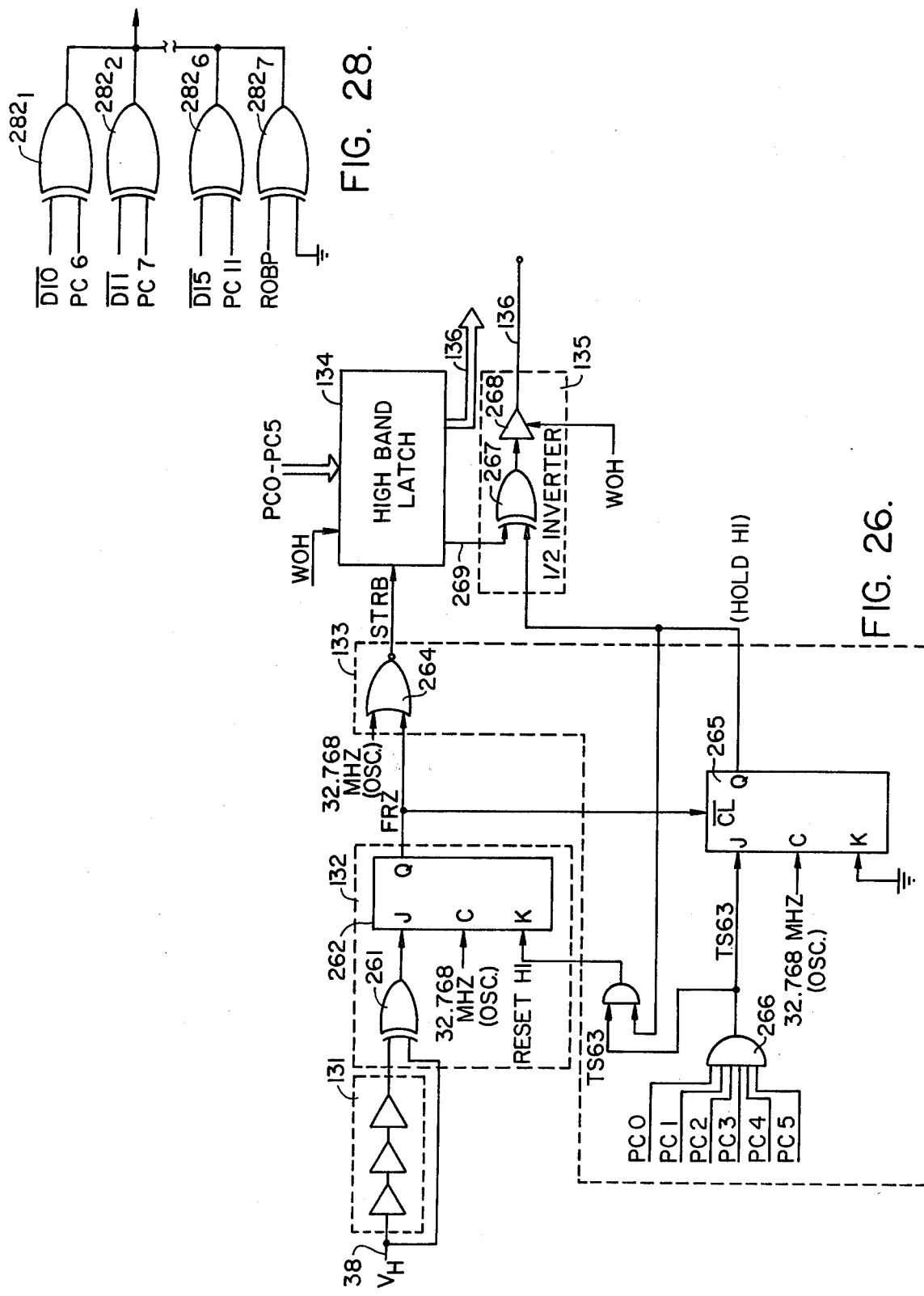

METHOD AND APPARATUS FOR PROCESSING DUAL FREQUENCY DIGITAL INFORMATION SIGNALS

BACKGROUND OF THE INVENTION

This invention relates to signal processing of multi-bit digital information signals, particularly processing of such information signals which requires conversion to the analog domain.

In the field of information signal processing, wherein human speech, musical sounds or other intelligence is communicated from one location to another in the form of electrical signals, recent trends have favored the use of digital signals over the more traditional analog signals due to several advantages inherent in the digital signal format, such as greater reliability, the ability to pack more information onto a given communication link, greater immunity to interference and other well known advantages. Nevertheless, in spite of the advantages afforded by use of the digital signal format, analog signal processing techniques are regularly employed at critical stages in information transmission systems due primarily to the vast body of analog processing technology which has been developed during the past few decades, which has resulted in thoroughly studied and tested methods and apparatus for performing certain information processing functions.

In the field of telecommunications, for example, and specifically in telephone systems, a time division multiplexed, pulse code modulated digital information signal format has been adopted in recent years for transmitting information from point to point. However, the digital information signals used to convey signaling information, such as the successive identifying digits of a called station, which are usually termed dual tone multiple frequency (DTMF) signals, are typically processed in the analog domain. This is typically accomplished by converting the digital DTMF signals to equivalent analog signals, passing the analog counterpart signals through a pair of parallel connected band pass filters each having a relatively narrow pass band for filtering out all signals except those lying in one of two well defined frequency ranges (i.e., the high band and the low band filters), and detecting the high band frequency component and the low band frequency component by means of suitable detection devices. Successful operation of this analog processing technique is dependent upon the use of high quality band pass filters, the cost of which increases with increasingly exacting performance characteristics, such as shorter minimum response time. For a time division multiplexed digital telephone system having N channels requiring DTMF processing, N high band filters and N low band filters are required, for a total of 2N. In addition, there are additional circuit elements employed in a DTMF analog signal processing system, such as a sample and hold circuit coupled between the digital-to-analog converter and the paired band pass filters which also must be included when expanding the number of channels, which also adds additional costs with increasing channel capacity.

Similar considerations apply to other analog processing techniques in the field of telecommunications, all due to the requirement that the information handling capability of existing communications links and links planned for the future be greatly increased. For example, while pulse code modulation has become the standard digital encoding technique employed in the telephone industry, other more efficient digital encoding schemes, such as delta modulation, adaptive delta modulation, and continuously variable slope delta modulation, are being increasingly employed in order to convey more information over existing communications highways, such as telephone lines, microwave links and satellite communication links. The great majority of these more efficient digital encoding techniques require processing in the analog domain, using high quality analog processing circuitry. Similarly, echo suppression, echo cancellation and low speed modem communication applications traditionally employ analog processing techniques. Although it is possible to share some of the analog circuitry among some of the multiplicity of information channels, in all known applications a substantial number of high quality, costly analog processing devices have been found to be required.

SUMMARY OF THE INVENTION

The invention comprises a method and apparatus for providing high quality analog signal processing to multiple channel digital signals which requires only a minimal number of analog signal processing elements shared among the several information channels of a communication system, and which is transparent to the digital portions of a given information signal communications system, i.e., employs elements which may be physically inserted between a conventional input and output processing section of the system to effect the required analog processing of all channels and produce output signals in a form recognizable by the follow-on portion of the system.

In the most general aspect, the invention comprises an information signal processing method and apparatus in which digital information signals from multiple information channels are time compressed by a factor sufficient to permit subsequent digital-to-analog conversion an analog signal processing to be effected by circuitry which is common to all of the information channels with the processed analog signals then converted to resulting digital signals which are time expanded in such a manner as to be completely compatible with the digital signal flow format of a host communication system. Time compression is effected by storing the individual digital characters in an input memory in their order of appearance at substantially the data input rate and reading the stored characters from the input memory at a substantially greater rate in a different order—i.e., individual channel groups—prior to performing the predetermined analog signal processing in any particular application, such as DTMF dual tone filtering, code conversion, echo suppression, echo cancellation, low speed modem tone filtering or the like. After processing in the analog domain, the resulting signals are converted to digital form, which may be the same or different from the digital input signal format, and time expanded by storing the converted digital signals in an output memory and reading the stored signals from the output memory, the output memory store and read rates being preselected to provide the complementary time expansion in the manner described below.

The input digital characters are stored in the input memory in their order of appearance: however, the stored input digital characters are read out at the higher rate in information channel groups. Each group comprises a predetermined number of samples from a particular channel sufficient to permit the predetermined analog processing technique to be performed to a desired degree of accuracy when that group is converted to the analog domain, passed through the high quality analog processing circuitry and reconverted to digital form. Although redundant signal information may be used for the purpose of initializing certain portions of a given system, no redundant information signals are passed completely through the entire system, i.e., the totality of samples in each channel group are completely processed only once and no overlap exists in the information samples in successive groups from a given channel which are completely processed by the system. This concept, termed contiguous time processing, is achieved by arranging the successively stored samples of a given channel into successive individual input packets of predetermined duration, with no packet containing individual samples found in another packet, time compressing each input packet of signals in the order of appearance of the packets, processing the information signals in each successive time compressed input packet in the same order, arranging the resulting signals corresponding to the signals in each successive time compressed input packet into successive output packets, time expanding each output packet to provide an expanded output packet containing the same amount of real time information as that contained in the input packet, and splicing the time expanded output packets into the host information stream.

While each expanded output packet must contain information corresponding to the information contained in the corresponding input packet, the real time duration of each expanded output jacket need not be equal to the real time duration of the corresponding input packet, but may be less. Regardless of the relative real time duration of each expanded output packet, for proper operation the time compression and time expansion performed on the signals in each packet must be complementary: this requirement may be alternatively defined in terms of the input and output information channel sampling rates or sampling periods. For those embodiments in which the real time duration of the output packet and the input packet are equal—termed herein the "continuous" embodiment—the complementary time compression-time expansion requirement can be achieved by setting the ratio of the read input rate per channel to the write input rate per channel (i.e., the time compression ratio) equal to the inverse of the ratio of the read output rate per channel to the write output rate per channel (i.e., the inverse of the time expansion ratio). Alternatively, the ratio of the write input channel sample period to the read input period must equal the inverse of the ratio of the write output period to the read output period. More specifically, this relationship may be concisely expressed as follows:

$$\frac{RIC}{WIC} = \frac{1}{\frac{ROC}{WOC}} = \frac{WOC}{ROC}$$

where RIC, WIC, and WOC and ROC are the per channel read input, write input, write output and read output clock rates, respectively. Additionally, in terms of the periods noted above, the equivalent relationship is:

$$\frac{WIP}{RIP} = \frac{1}{\frac{WOP}{ROP}} = \frac{ROP}{WOP}$$

where WIP, RIP, WOP and ROP are the per channel write input, read input, write output and read output periods, respectively. For those embodiments in which the real time duration of the expanded output packet is less than the real time duration of the input packet, which embodiments are termed the "packet burst" embodiments, the complementary time compression-time expansion is achieved by setting the ratio of the read input rate to the write input rate equal to the inverse of the ratio of the read output rate to the write output rate multiplied by the factor F, where F is the ratio of the duration of the expanded output packet to the duration of the input packet measured in real time. Algebraically, the corresponding expressions are:

$$\frac{RIC}{WIC} = \frac{1}{\frac{ROC}{WOC} \cdot F} = \frac{WOC}{ROC} \cdot \frac{1}{F}$$

Additionally, in terms of the periods:

$$\frac{WIP}{RIP} = \frac{1}{\frac{WOP}{ROP} \cdot F} = \frac{ROP}{WOP} \cdot \frac{1}{F}$$

In the packet burst embodiments in which the expanded output packets are applied to follow on digital circuitry operated by associated host clock signals, the associated host clock signals must be multiplied by the factor 1/F. In addition, since a gap will exist between consecutive transfers of contiguous time packets to the follow-on digital circuitry, in the packet burst embodiments provision must be made for enabling the follow-on digital circuitry to retain the status existing therein at the end of the previously transferred time packet for the corresponding channel during the gap. This is accomplished in a variety of ways, depending upon the nature of the follow-on digital circuitry. For example, in an embodiment providing DTMF signal filtering and subsequent DTMF tone detection using conventional digital tone decoders each dedicated to a specific channel, the previous status is maintained by terminating the clock signal train applied to the digital tone decoder during the gap. It should be noted that the complementary time compression-time expansion requirement for the packet burst embodiments and the remaining embodiments are equivalent, the fraction F being equal to 1 for the latter case.

While each time packet contains no redundant signal information, certain analog processing techniques can be optimized by initializing the circuitry prior to the arrival of the first signal information. In such applications, each input time packet may be combined with a portion of one or more previous time packets prior to compression and processing. The previous time packet signal portions, which contain information previously processed through the system, may be used to permit transients to decay in the analog processor circuitry and to provide proper initialization of certain circuitry.

The invention has application to a wide variety of analog signal processing techniques, such as frequency shift key signal processing, DTMF high band-low band signal processing, digital code conversion and the like.

In each application, the digital input signals from the host device are stored in an input memory in the order received either asynchronously or synchronously with the host system clock, read from the input memory a channel at a time at a substantially higher rate, converted from digital to analog form, subjected to the particular analog signal processing technique, reconverted to digital form, stored in an output memory, read from the output memory and applied to the follow-on digital circuitry, the per channel read-write rates for the input memory and the output memory being selected in accordance with the requirements noted above.

In a more specific aspect of the invention directed to dual frequency signal processing, particularly DTMF signal processing, a novel encoding technique is employed for digitally encoding logic signals supplied by a pair of comparators, which technique provides a lower limit of resolution commensurate with the follow-on digital tone detection circuitry while requiring substantially less memory capacity to accurately capture the high band-low band information. The encoding technique employs a time encoder which generates two groups of serially appearing multi-bit digital characters, one group corresponding to the high frequency band of interest, the other to the low frequency band of interest. Each character contains both signal logic level information and signal transition time information, the latter in the form of a multi-bit time encoder time slot portion. Time encoder timing circuitry defines a succession of time encoder time frames of equal duration, each time frame being equally divided into a plurality of time encoder time slots. The duration of the time encoder time frame is dependent upon the time compressed equivalent of the highest frequency of interest to be processed and can be no greater than the half period of a signal having this frequency so that only one signal transition can occur in each time frame. In the preferred embodiment, the duration of the time encoder time frame is selected to be no greater than 25% of the period of the time compressed equivalent of the highest frequency signal of interest so that only one signal transition can ever occur in two successive time frames, which reduces the amount and complexity of the digital circuitry required. The number of time slots per time frame determines the lower limit of resolution of the time encoder and is selected to provide a resolution on the order of the resolution of the follow-on conventional digital tone decoder circuitry associated with the host device.

The multi-bit digital characters for each frequency band are generated in an identical fashion. During each successive time encoder time slot in a given time frame during which transition information does not affect the operation of the time encoder, the corresponding comparator logic signal is strobed into a storage device along with a multi-bit time slot number. During a predetermined portion of each time frame, one multi-bit character containing both logic level and time slot information portions is read from the storage device to an output memory unit. So long as no transition occurs in the input logic signal during a given time frame, the time slot information is of no consequence since no event of interest (i.e., a transition) has occurred. However, when a transition does occur during a given time frame, the logic level prior to the transition and the time slot during which the transition occurred are frozen in the storage device by terminating the strobe signal for the remaining duration of that time frame and for the entire time frame which immediately follows (termed the "hold" time frame). During the hold time frame the contents of the storage device are read out to the output memory unit during the predetermined read portion of the hold time frame, with the stored logic level signal being inverted to specify the logic level after the transition. At the end of the hold time frame, the strobe signal is reenabled and the process is repeated.

Each multi-bit digital character contains the salient information of interest for each time frame: viz., the logic level of the corresponding comparator and that fractional portion of the time frame (time slot number) when a transition occurred (if a transition did occur). By thus encoding the salient information once per time frame, using the relatively high sampling rate afforded by the time slots, high resolution is obtained with diminished information storage requirements.

The multi-bit character pairs stored in the output memory unit are time expanded by reading the character pairs out to a time decoder buffer memory at the required rate, and decoding and applying the character pairs to conventional digital tone decoder circuits in the preferred embodiment. Decoding is accomplished in a time decoder unit having timing circuitry for generating a succession of time decoder time frames, each having a plurality of time slots equal in number to the number of time encoder time slots but of different duration, the time slots being defined by multi-bit digital characters. The duration of the time decoder time slots is a function of the required time expansion ratio. During each time decoder time slot, each pair of multi-bit digital characters stored in the decoder buffer memory is read out and the time slot portion is compared with the time decoder time slot number. When a match is obtained, the logic level portion of the multi-bit digital character read from the time decoder buffer memory is coupled to one of a pair of latches associated to the corresponding associated digital tone decoder circuit and strobed into the latch. The outputs of each latch pair are sampled by the associated digital tone decoder circuit.

The invention employs a digital time compression and complementary time expansion technique to operate directly and either asynchronously or synchronously on digitally encoded time division multiplexed signals to produce logic level operating signals for standard digital tone decoders associated to the host device, the system requiring only a single hybrid processing unit including a single digital-to-analog converter, a sample and hold circuit, an optional low pass filter, one high band filter, one low band filter, a signal detection circuit and a comparator associated to each band, which permits the use of extremely high quality processing circuitry in the analog section and thus enables extremely reliable signal processing.

In operation, digitized information signals from a plurality of information channels are successively stored in a digital input memory, the memory being continuously updated to contain the most current information portions from each information channel. Typically, the input memory has sufficient capacity to store the most recent 10 to 50 msec. of digitized information from each information channel. The digital information is written into the input memory in the order received, i.e., data bytes from successive channels. During readout of the input memory, a number of bytes corresponding to a given channel are completely read out, after which a corresponding number of bytes from the next adjacent channel are read out, with the readout occurring at a rate substantially higher than the rate at which the information is written into the input memory. This relatively high readout rate for the input memory effects time compression of the digital information signals, which is compensated for after subsequent signal processing in the analog domain by time expansion in an output memory unit. In the specific embodiment, the per channel write rate is 8 KHz and the readout rate per channel is 512 KHz, thus providing a time compression of 64/1.

The number of bytes for each channel which are read in succession at the higher rate from the input memory is at least equal to the total number of input samples for each channel which occur during the preselected input time packet. For example, in the specific embodiment disclosed herein in which the per channel input sample rate is 8 KHz, the minimum number of bytes read out for each channel at the higher rate is 128, corresponding to a 16 msec input time packet (i.e., 16 msec of channel information). Further, in the preferred embodiment, the actual number of bytes read out for each channel is selected to be twice the minimum number (i.e., 256 bytes corresponding to 32 msec of information), the first half of each group of bytes being employed for the purpose of initializing both the band pass filters in the analog processing section and the time encoder described below.

The digital information read out from the input memory is coupled to a hybrid processor unit in which the group of digital characters corresponding to a given channel is converted from digital to analog form, filtered by a low pass filter and by a pair of high quality parallel connected band pass filters to separate the high band tones from the low band tones, and converted by a signal detection circuit and comparator to binary signals having a period equal to the period of the filtered analog signals. Due to the time compression noted above, the upper operating frequency of the digital-to-analog converter and the pass bands of the low pass filter and the band pass filters are shifted upward by the time compression ratio. The resulting signals output from the high band and the low band comparators are a succession of frequency translated time compressed segments of the DTMF signals present in each information channel.

The periodic binary signals from the high band and low band comparators are fed to the digital time encoder which analyzes each digital burst and encodes the information contained therein into a plurality of time encoded data words, each word consisting of a pair of bytes each containing information relating to the two parameters of interest: i.e., time encoder time slot information and binary level information signifying the presence or absence of a tone in the high band (one byte) and the low band (other byte). The time encoded data bytes generated by the time encoder are written into the output memory whose read/write sequence is the mirror image of the read/write sequence of the input memory. To avoid erroneous signal interpretation due to "ringing" of the band pass filters during initial signal portions, only those data bytes corresponding to the latter half of each channel read out, i.e., the second time packet, are actually written into the output memory of the preferred DTMF processor embodiment. The digital information stored in the output memory is read out to the time decoder at a rate providing the complementary time expansion, with each high and low band byte from successive channels being read out in succession.

The time encoded data bytes read from the output memory are applied to the time decoder which analyzes each byte to determine the binary level of the high and low band portions of the signal information for the corresponding information channel. For each channel, the time decoder updates a pair of output latches dedicated to the corresponding channel. The paired output latches are coupled to dedicated standard digital tone decoders.

Each time encoded data byte is generated by the time encoder of the preferred embodiment in the following fashion. The time encoder timing circuitry defines successive equal time encoder time frames each having a duration no greater than the half period of the time compressed equivalent of the highest frequency of interest. In the specific embodiment the half period of the time compressed equivalent of the highest frequency of interest is 4.784 $\mu$sec; therefore, the maximum duration of each time encoder time frame is less than 4.784 $\mu$sec. In this specific embodiment, the complexity of the time encoder is minimized by setting the time frame period equal to 1.953 $\mu$sec, which is less than 25% of the time compressed equivalent of the highest frequency of interest, or 2.392 $\mu$sec, thereby ensuring that transitions will not occur in two consecutive time frames. Each time encoder time frame is subdivided into 64 consecutive time slots of 30.5 nanoseconds duration. During each time encoder time frame, the logic signals from the high band and low band comparators are each initially delayed and applied to one input of a multi-bit storage device, preferably a data latch, associated thereto. Also coupled to each corresponding latch is the multi-bit character which defines each successive time encoder time slot. Each latch is strobed by a master timing signal during each time encoder time slot, so that each latch is updated once per time encoder time slot. The delayed logic signal from each comparator is compared with the corresponding non-delayed logic signal, and any difference between the two signifying a transition is detected and used to terminate the strobe signal for the remainder of the time encoder time frame and for the time encoder hold time frame which follows. Thus, when a transition occurs in either of the high band or low band signal paths, the time slot number during which the transition occurred and the logic signal level just prior to the transition are stored in the corresponding latch for the remainder of that time encoder time frame and the duration of the next succeeding time encoder time frame.

During a predetermined portion of each time encoder time frame the contents of each latch are read out in succession and stored in the output memory. For those time encoder time frames during which no transition has occurred, the time slot number is of no consequence and is thus arbitrary, while the data bit from the latch signifying the logic level of the corresponding comparator output is a valid representation of the state of the corresponding comparator signal. For each time encoder time frame during which a change actually occurs, the comparator logic level data bit still specifies the logic level prior to the change and the time encoder time slot number stored in the latch is also indeterminate at the time during which the contents of the latch are read out to the output memory. During the hold time frame, the comparator level data bit still specifies the corresponding output stage just prior to the change and the time encoder time slot portion of the byte stored in the latch specifies the actual time encoder time slot during which the change occured. The data bit, however, is inverted by an inverter so that the data bit supplied to the output memory specifies the correct logic level after the transition occurred. Since the duration of two successive time frames (a period of 3.906 μsec) is shorter than the minimum half period of the highest signal frequency to be processed (4.784 μsec), all transitions in the comparator output signal levels are faithfully detected.

The time encoded digital bytes are time expanded by reading each byte pair from the output memory and storing the read pairs in a buffer memory forming a portion of the time decoder unit at the proper rate. In the preferred embodiment, the time encoded digital byte pairs are written into the output memory unit at a per channel rate of 512 KHz, and are read from the output memory to the buffer memory at a per channel rate of 8 KHz to provide the compensating 64/1 time expansion. The time encoded digital bytes stored in the buffer memory are decoded by comparing the time slot portion of each byte with time decoder time slot number signals which identify the time decoder time slots. During each time decoder time slot the time encoder time slot portion of each high band and low band data word from each channel is compared with the time decoder time slot number. When the time slot portion of the time encoded data byte matches the time decoder time slot number, the comparator level data bit is strobed into the corresponding high or low band channel latch which is synchronously addressed by a master control logic circuit. Although the time slot portion of the time encoded data bytes is indeterminate for all time encoder time frames, except that following a time frame in which a transition occurred, this information is of no significance, since, by definition, no change occurred. For those time encoder time frames which immediately follow a time frame during which a transition did occur, the time slot portion of the time encoder data byte specifies the exact time encoder time slot during which the transition actually occurred, and thus, the correct data level bit is strobed into the correct output latch whenever the two time slot numbers match.

For a fuller understanding of the nature and advantages of the invention, reference may be had to the ensuing detailed description taken in conjunction with the accompanying drawings.

BRIEF DESCRIPTION OF THE DRAWINGS

FIGS. 2 and 2A are schematic timing diagrams illustrating the principle of the invention;

FIG. 16 is a block diagram of the output memory unit;

FIGS. 22 and 23 are memory addressing charts;

FIG. 25 is a circuit diagram of a signal detection and comparator circuit of the hybrid processor unit;

FIG. 26 is a circuit diagram of the high band portion of the time encoder unit;

FIG. 28 is a circuit diagram of the time comparator portion of the time decoder unit;

DESCRIPTION OF THE PREFERRED EMBODIMENTS

General System and Method

Figure 1:
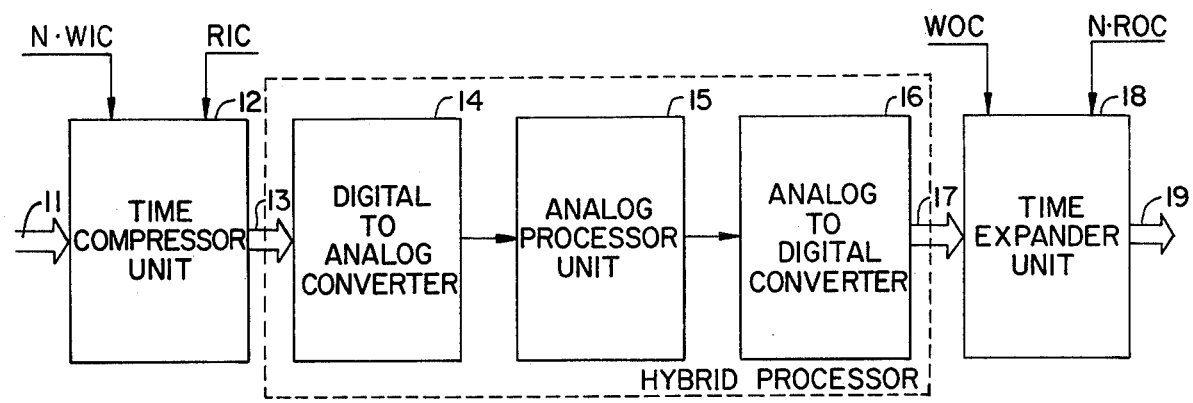
FIG. 1 is a block diagram illustrating the invention.

Turning now to the drawings, FIG. 1 is a block diagram illustrating the invention in its most general aspect. As see in this FIG., multiple channel time division multiplexed multi-bit digital information signals present on an input bus 11 are coupled to a time compressor unit 12 in which the multi-channel digital signals are compressed by a predetermined time factor using digital techniques. The compressed digital signals are supplied from the compressor unit 12 via a bus 13 to a group of sub-units collectively termed a hybrid processor, and including a digital-to-analog converter 14 in which groups of successively received digital characters corresponding to a given channel are converted from digital to analog form. Each successive resulting analog segment corresponding to a particular channel is coupled to an analog processor unit 15 in which the desired processing is performed. The processed analog signals are converted to digital form in an analog-to-digital converter 16 and subsequently coupled via a bus 17 to a time expander unit 18. Time expander unit 18 operates on the digital signals to perform a time expansion which is the complement of the time compression previously performed by time compressor unit 12, and the time expanded digital signals output from expander unit 18 on output bus 19 are coupled to appropriate downstream digital circuitry, the nature of which is dependent upon the particular analog processing performed in unit 15.

Time compressor unit 12 generally comprises a digital memory storage device of conventional design, such as a random access memory or the like, a clock generator for supplying the write input clock (WIC) and read input clock (RIC) signals, respectively, and conventional input/output buffers, latches, gates and the like. Time expander unit 18 is similar in construction and includes a clock generator for supplying the write output clock (WOC) and read output clock (ROC) signals, respectively. Digital-to-analog converter 14 may comprise any one of a number of known such units, the nature of which is dependent upon the nature of the multi-bit digital input information signals and the maximum required operating speed. Analog processor unit 15 may comprise any one of a number of known high quality analog signal processing units, several of which are identified below. Analog-to-digital converter 16 similarly may comprise any one of a number of known units whose structure and specific functional operation depends upon the analog processing technique employed and the desired format of the resulting digital signals.

Time compression is effected by unit 12 by selecting a proper ratio for the read input and write input clocks, the read input clock having a frequency substantially higher than the write input clock. The value of the write input clock is typically limited to a value approximately equal to the per channel sample rate of the digital input signals multiplied by the number of information channels. For example, for an N channel time division multiplexed input data stream having a per channel sample rate of 8 KHz, the value of the write input clock is substantially equal to N×8 KHz. Once the value of the write input clock is determined, the value of the read input clock is selected to afford the desired degree of compression. For example, to achieve a time compression ratio of 64/1 with a digital input signal stream having a per channel sample rate of 8 KHz, the value of RIC is chosen as 512 KHz.

The time expansion is effected by time expander unit 18 by selecting a proper ratio for the per channel read output and the write output clock frequencies, the ratio being the inverse of the ratio of the read input and the per channel write input clock frequencies in the simplified case of continuous processing, described in detail below. Thus, in the foregoing example the ROC and WOC frequencies are selected to provide a ratio of 1/64 for the case of continuous processing. This relationship may be equivalently expressed in terms of the clock rates or periods thus:

$$RIC/WIC = WOC/ROC$$

or $$WIP/RIP = ROP/WOP$$

where RIC, WIC, WOC and ROC are the per channel read input, write input, write output and read output clock rates, respectively; and WIP is the channel sample period (i.e., the period between successive samples in a given channel), and RIP, ROP and WOP are the periods of the read input, per channel read output and write output clocks, respectively.

It is important to note that the input and output clock frequencies are not absolutely related, i.e., WIC need not equal ROC, and RIC need not equal WOC: in fact, these frequencies will typically have different values. Rather, the relationship which must be maintained is the inverse relationship between the output clocks and the input clocks (or the equivalent relationship for the periods noted above).

FIG. 2 illustrates a second requirement for proper implementation of the general system and method: viz., through the system processing of contiguous input time packets. With reference to this figure, the uppermost portion schematically depicts a time division multiplexed N channel input data stream present on input bus 11 prior to storage in time compressor unit 12. The input data stream consists of an ordered succession of samples for each of information channels 0-N, the time scale being drawn from left to right. Thus, the order of appearance of the samples is as follows: Channel 0 sample 1, channel 1 sample 1, channel 2 sample 1, ... channel N sample 1; channel 0 sample 2, channel 1 sample 2, channel 2 sample 2, etc. The rate at which the successively appearing individual samples are stored in the time compressor unit 12 is N·WIC, where N is the total number of information channels and WIC is the per channel clock rate.

The input data stream may be conceptually described as N individual sets of individual samples such as those depicted for channel 0 and labeled "digital input to time compressor", and each set of samples for a given channel is grouped into successive input time packets, such as input time packet 0 consisting of samples 1-K, input time packet 1 consisting of the next K samples, etc., each input time packet containing no channel samples appearing in any other time packet. The samples grouped in each individual input time packet are considered to be stored at the rate WIC into the time compressor unit 12.

The individual samples 1-K from a given input time packet are read from time compressor unit 12 at the higher rate RIC in order to effect time compression. As shown in FIG. 2, successive time packets 0 and 1 are read from the time compressor unit 12 during the channel 0 processing portion of the system cycle, followed by the reading of successive channel 1 time packets 0 and 1 during the channel 1 processing time, followed by the 0 and 1 time packets from channel 2, channel 3, ..., channel N. After the successive 0 and 1 time packets from channel N have been read during the channel N processing time, time packets 1 and 2 of channel 0 are read from the time compressor unit 12 at the RIC compression rate during the next successive channel 0 processing portion of the system cycle, followed by time packets 1 and 2 from channel 1 during the channel 1 processing portion of the system cycle, etc.

The channel 0 compressed time packets 0 and 1 information is converted from digital to analog form in converter 14 and subjected to the predetermined analog processing in unit 15. The purpose for supplying the information in the time packet 0 (the previous time packet information) is to afford initialization to the circuit components in the analog processor unit 15. For example, in the dual frequency processing application noted below, the time packet 0 information is applied to the analog circuitry in order to ensure that any transient signals due to ringing of the filter portion of the circuitry have completely dissipated before the time packet 1 information is applied to the filters. Thus, the first of the two successive time packets serves as a "header" to initialize or prepare the analog processing circuitry for subsequent processing of the information in the immediately following time packet (e.g., time packet 1). It should be noted that, in some applications, the "header", may also provide initialization for digital circuit portions of systems embodying the invention. Further, it should also be noted that the "header" may comprise more than one preceding time packet or a portion of the preceding time packet. In those applications in which no header is required, the time compression and analog processing steps are simplified by eliminating the readout and conversion to analog form of the information contained in the previous time packet.

After analog processing, the information in the compressed time packet (i.e., time packet 1) is converted from analog to digital form and stored in the time expander unit at the WOC clock rate. At the appropriate portion of the system cycle, the information from compressed time packet 1 is expanded by reading the information from the time expander at the ROC rate. It is noted that the real time length of the expanded time packets in the continuous processing depicted in FIG. 2 is equal to the real time length of the corresponding input time packet.

Although FIG. 2 depicts only one of the N channels output from the time expander unit, in actuality N-1 other channels are output concurrently by the time expander, so that the total output clock rate is N · ROC. Depending upon the application, N individual information channels will be either output on N separate data paths, each at a per channel rate of ROC, or time division multiplexed onto a common data path, also at a per channel rate of ROC, for a total rate of N · ROC.

APPLICATIONS

DTMF Processing

Figure 3:
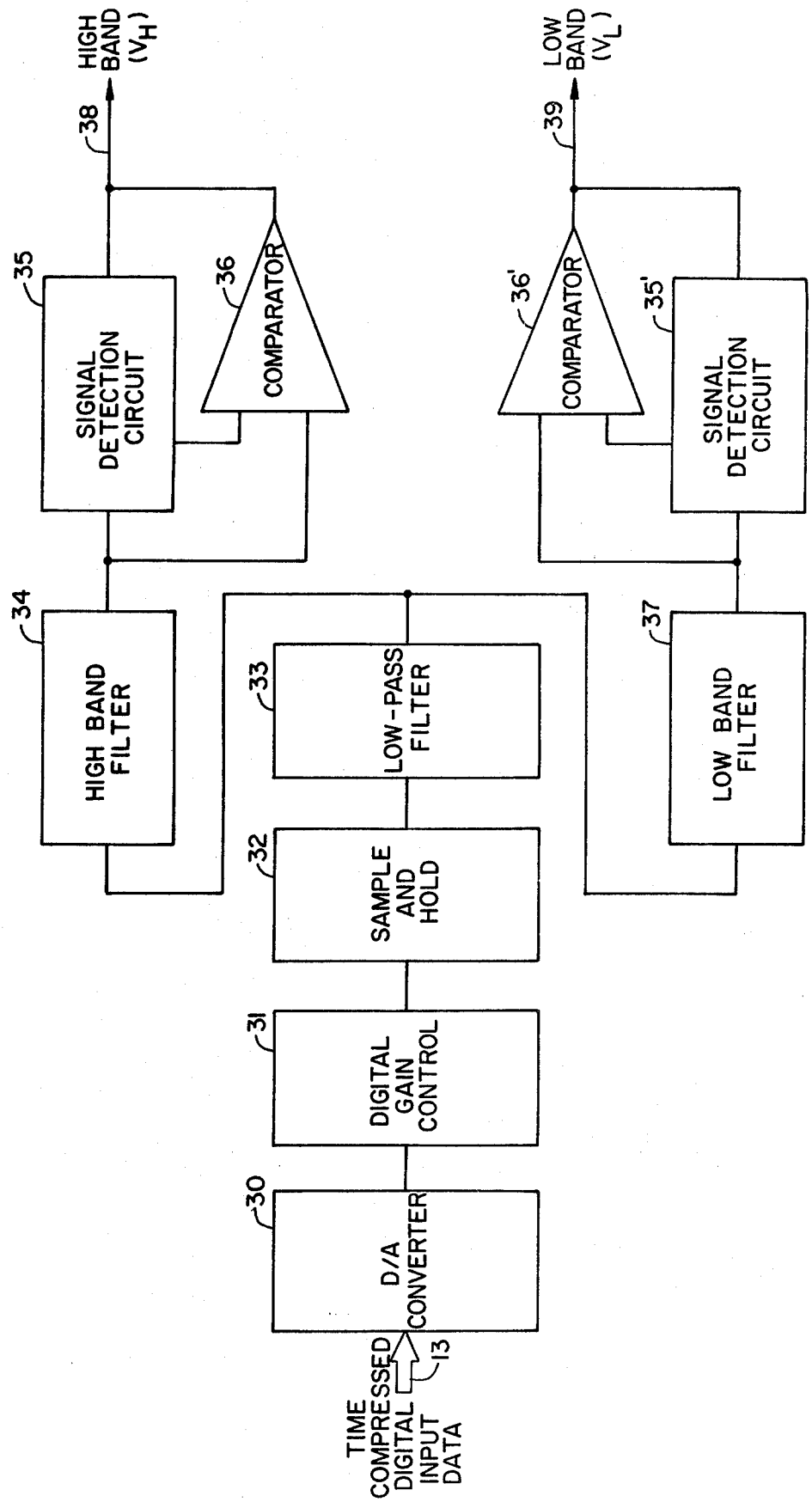
FIG. 3 is a generalized block diagram illustrating an embodiment of the hybrid processor used for DTMF processing.
Figure 4:
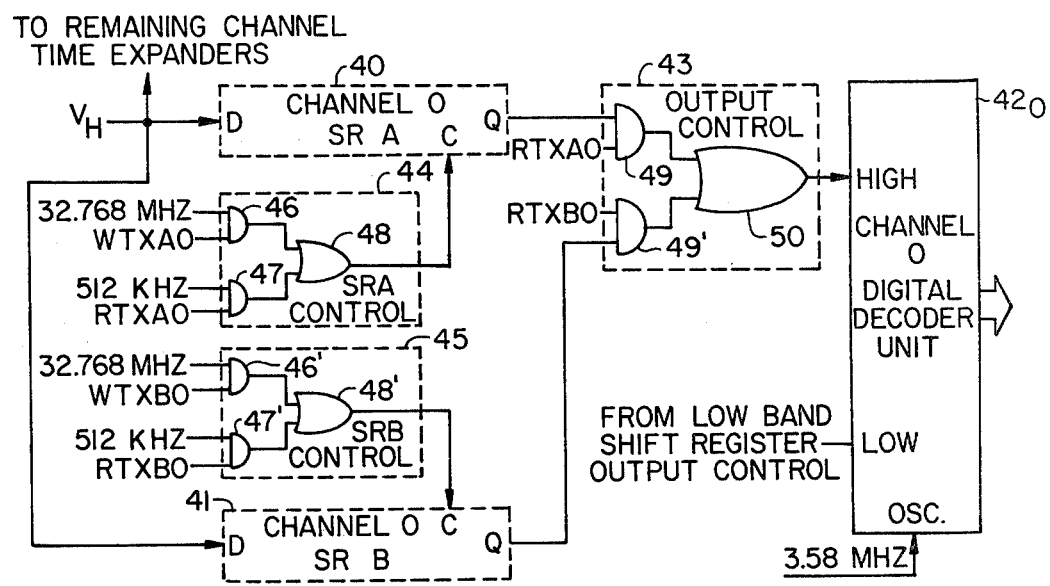
FIG. 4 is a schematic diagram of a first time expander unit suitable for use with the DTMF processor of FIG. 3.

FIGS. 1, 3 and 4 illustrate a first application of the invention to DTMF high band-low band signal processing. With reference to FIG. 1, time division multiplexed N channel digital input data is stored in time compressor unit 12 at a clock rate N×WIC, where WIC is the per channel sample rate and N is the number of information channels represented by the input data. In a specific embodiment, WIC equals 8 KHz and N equals 16 channels. Contiguous time packets of channel information (e.g., channel 0) are read from the time compressor unit 12 at a clock rate RIC selected to provide a time compression ratio of 64/1, i.e., RIC=512 KHz. The time compressed digital input data is processed by the hybrid processor unit shown in FIG. 3, which consists of a digital-to-analog converter 30 for converting the succession of digital input characters for each given channel to an analog signal, a digital gain control unit 31 shown in FIG. 24 which permits the analog signal range to be set to an optimum for signal processing in the remaining elements of the analog processor of FIG. 3, a sample and hold circuit 32, a low pass filter 33 for smoothing the analog signal, a pair of band pass filters 34, 37 for separating the high band tones from the low band tones and having edge frequencies which are multiples of the edge frequencies of the high band and low band ranges, and a pair of signal detection 35-comparator 36 circuits for converting signals output from each filter to binary signals having the same period as the filtered analog signals. Since the time compression caused by the high speed readout of the digital information signals from time compressor unit 12 causes a corresponding increase in the frequency of the time compressed signals, both the upper frequency of the low pass filter 33 and the pass bands of the band pass filters 34, 37 must be shifted upward by the 64/1 time compression ratio defined by RIC and WIC.

The resultant signals output from the hybrid processor unit on terminals 38, 39, which comprise a succession of frequency translated time compressed segments of the DTMF signals present in each information channel, are coupled to the time expander unit 18, such as that partially depicted in FIG. 4.

The specific configuration of the converter 30 is dependent upon the particular digital code employed in the host CBX. Examples of such codes are the Bell System logarithmically companding algorithm and the International CCITT companding algorithm.

Figure 24:
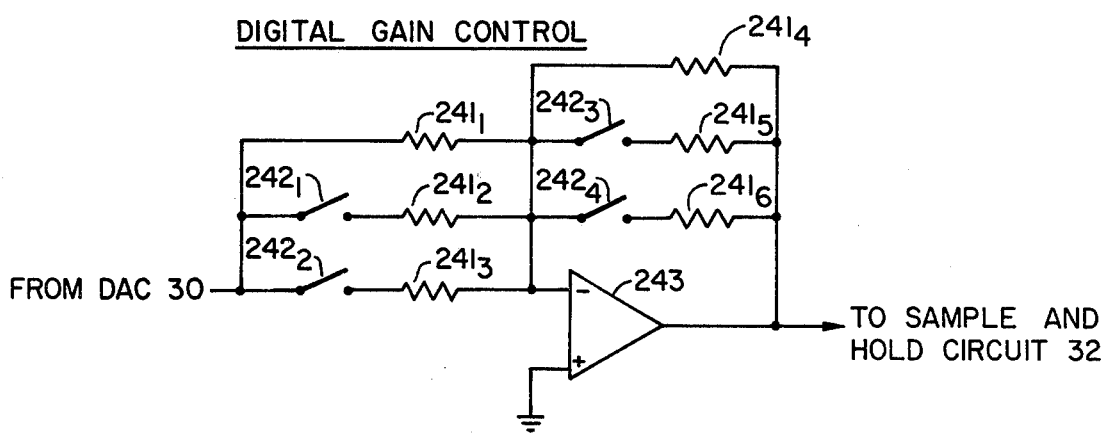
FIG. 24 is a circuit diagram of a digital gain unit employed in the hybrid processor unit.

With reference to FIG. 24, digital gain control circuit 31 includes a resistance network composed of individual fixed resistances $241_1$–$241_6$, a plurality of individually manually settable switches $242_1$–$242_4$ interconnected as shown, and an operational amplifier 243. Since the gain is set digitally via the miniature switches $242_1$–$242_4$, the proper switch setting can be calculated for any given system and simply set into the single processor unit shown in FIG. 3. This allows all channels to be processed identically and eliminates the necessity found in prior art devices of making separate range adjustments on individual channels.

Sample and hold circuit 32 preferably comprises a high quality circuit having as a first stage a unity gain current buffer specifically designed to provide high output currents (±300 ma) without introducing signal distortion due to slew rate limiting. The availability of a high charging current combined with the use of a high speed, low impendance N channel JFET switch (not illustrated), enables the sample and hold circuit 32 to acquire signals in an exceedingly short time. This, combined with an offset-hold charge cancelling technique, results in a very high quality, high speed sample and hold circuit.

In operation, just prior to the appearance of the next digital input character at the input to DAC 30, sample and hold circuit 32 is placed in the hold mode and held in this mode for 976 nanoseconds. This prevents transients which appear at the output of DAC 30 from affecting signal quality in an adverse way. The hold period is followed by a 976 nanosecond sample period, with the sample-hold sequence being continuously repeated.

The output of the sample and hold circuit 32 is coupled through a low pass filter 33 to the input of a pair of band pass filters 34, 37. Low pass filter 33 attenuates the higher frequencies generated during reconstruction of the analog signal by the upstream elements and preferably provides 12 db/octave rolloff with a −3db corner frequency of approximately 220 kHz. Low pass filter 33 also provides impedance matching for the band pass filters 34, 37.

Band pass filters 34, 37 each provide high quality filtering in two different frequency bands which are set 64 times higher than the expected DTMF high and low frequencies due to the 64 to 1 time compression effected by the time compressor unit 12. The corresponding band pass frequencies are 76.22 kHz–106 kHz for high band filter 34 and 43.9 kHz–61.12 kHz for low band filter 37. Each filter preferably has an in-band ripple of less than ±1 db and upper and lower −3 db corner frequencies set to accommodate DTMF signals which deviate from the norm by +1.5% at the upper edge and −1.5% at the lower edge. The stop band attenuation (measured across the pass band of the opposite filter at the frequency of a time-compressed dial tone (28.16 kHz)) exceeds 50 db. Both band filters 34 and 37 provide an elliptical type of frequency response which affords excellent transient response.

The output of each band filter 34, 37 is coupled to a separate signal detection circuit 35 (35') and comparator 36 (36') which are identical in structure and illustrated in FIG. 25. The comparators 36, 36' provide the normal function of converting the analog signal to a binary signal having the same period. The signal detection circuit 35, 35' performs two functions: that of generating a reference voltage for the associated comparator, and that of providing squelching for signals having an amplitude less than the minimum valid DTMF level. The variable reference voltage generated by the signal detection circuit 35, which is coupled to the negative input of comparator 36, is approximately 20 db below the peak signal level output from the associated band filter and thus tracks the received signal level to optimize the performance of associated digital tone decoders (not shown) by providing a constant amount of jitter for a given signal to noise ratio. The squelch detector portion of the signal detection circuit, i.e., a peak detector circuit 255, comparator 258, and AND gate 261, ensures that the received signal from the associated band filter will be above the minimum level of a valid DTMF signal before the AND gate 261 is enabled to permit the output signal from comparator 36 to be coupled therethrough for subsequent signal processing. The improvement in noise immunity afforded by the squelch detector is approximately 20 db. It should be noted that, although it is possible to use both the variable threshhold voltage and the squelch circuit with conventional signal processing techniques known in the art, a severe constraint on the "attack" and "decay" time constants designed into the threshold and squelch circuits exists, which is due to the fact that conventional DTMF processing techniques are non-synchronous, and therefore, require continuous processing of the signals present in each information channel. Typically, such continuous detection restricts the time constants to values which are less than optimum for DTMF decoding.

In contrast, the 32 msec. readout period of this embodiment is deliberately selected to be shorter than the minimum intra-tone period (40 msec.) of valid DTMF signals, which prevents the signal detection circuits 35, 35' from ever processing two valid DTMF signals during a single readout, and further allows the time constants designed into the variable reference circuit and the squelch detector to be optimized for DTMF detection. This advantage is further enhanced by a 500 microsecond pause between each readout of input data from time compressor unit 12: during each pause, a control logic unit described below in conjunction with the embodiment of FIG. 11, also directed to DTMF processing, issues a reset command to switching elements 259, 260 of the signal detection circuit, which resets the variable reference circuit and the squelch detector. This permits each successive readout to be processed identically, regardless of the signal conditions which preceded that readout.

With reference to FIG. 4, which illustrates the high band segment of the channel 0 portion of the time expander unit 18, the high band signal $V_h$ is coupled to the data input of a pair of shift registers 40, 41. The data output of each register 40, 41 is coupled to the high band data input of an associated channel 0 digital decoder unit $42_0$ via an output control unit 43. Shift registers 40, 41 are clocked by clock control units 44, 45, respectively.

Shift register control unit 44 includes a first AND gate 46 having a first input coupled to the 32.768 MHz. system clock and a second input to which a control signal termed WTXA0 is coupled. The control signal WTXA0 is the write time expander control signal for channel 0 which enables gate 46 to pass 8,192 cycles of the system clock to the clock input of register 40 during the 250 μsec. second half of the channel 0 readout period. Shift register control unit 44 includes a second AND gate 47, having as a first input a 512 kHz. clock signal and as a second input a control signal termed RTXA0. Control signal RTXA0 is a signal which enables AND gate 47 to pass the 512 kHz. signal to the clock input of shift register 40 for a period of 16 msec., i.e., the duration of the expanded output time packet period for channel 0. Control signals WTXA0 and RTXA0 are mutually exclusive enabling signals.

As noted above, the signal $V_H$ is also coupled to the data input of shift register 41, whose operation is controlled by shift register control unit 45 having the input signals as depicted in FIG. 4, i.e., the 32.768 MHz. and 512 kHz. clock signal, and two control signals WTXB0 and RTXB0. The duration of the WTXB0 signal is the same as the duration of the WTXA0 signal, and the period of the RTXB0 control signal is the same as that of the RTXA0 signal. However, WTXA0 and WTXB0 are mutually exclusive, and RTXA0 and RTXB0 are also mutually exclusive.

The output of shift register 40 is coupled to a first input of an AND gate 49 in output control unit 43, the other input to which is control signal RTXA0. Similarly, the output of shift register 41 is coupled to a first input of an AND gate 49' in output control unit 43, the remaining input to gate 49' being the control signal RTXB0. AND gates 49, 49' are coupled via an OR gate 50 to the high band data input of digital decoder unit $42_0$.

In operation, during the second half of alternate readout printers, WTXA0 and WTXB0 alternately enable AND gates 46, 47, respectively, thereby permitting 8,192 bits of data to be alternately written into either shift register 40 or shift register 41 at the 32.768 MHz. clock rate. During alternate 16 msec. readout portions, RTXA0 and RTXB0 are alternately held at the enabling level (true), with WTXA0 being used to write shift register 40 when RTXB0 is true; and WTXB0 being used to write data into shift register 41 when RTXA0 enables gates 47 and 49. When RTXA0 is at the enabling level, 8,192 bits of data are read from shift register 40 by means of the 512 kHz. clock and passed through output control unit 43 to the high band data input of digital decoder unit $42_0$. Similarly, when RTXB0 is at the enabling level, data is read from shift register 41 via the 512 kHz. clock and is transferred to the high band data input of digital decoder unit $42_0$ via enabled AND gate 49' and OR gate 50.

Thus, in the FIG. 4 embodiment, time expansion is performed by alternately reading data into one of the two shift registers 40, 41 at a higher clock rate while data is being read from the other shift register at the lower clock rate. It should be noted that the ratio of the read output to write output clock frequencies of the FIG. 4 embodiment is 1:64, which is the inverse of the ratio of the read input and write input clock frequencies for the embodiment of FIGS. 1 and 3. The period ratios are likewise inverse.

Although not depicted in FIG. 4, a similar pair of shift registers and shift register control units, and an output control unit are provided for the low band information signal $V_L$ supplied by the low band signal detection circuit 35' and comparator 36'. In addition, the high band signal $V_H$ is coupled to a plurality of shift register pairs and associated circuitry corresponding to the remaining number of information channels, while the low band signal $V_L$ is likewise coupled to corresponding circuitry.

Figure 5:
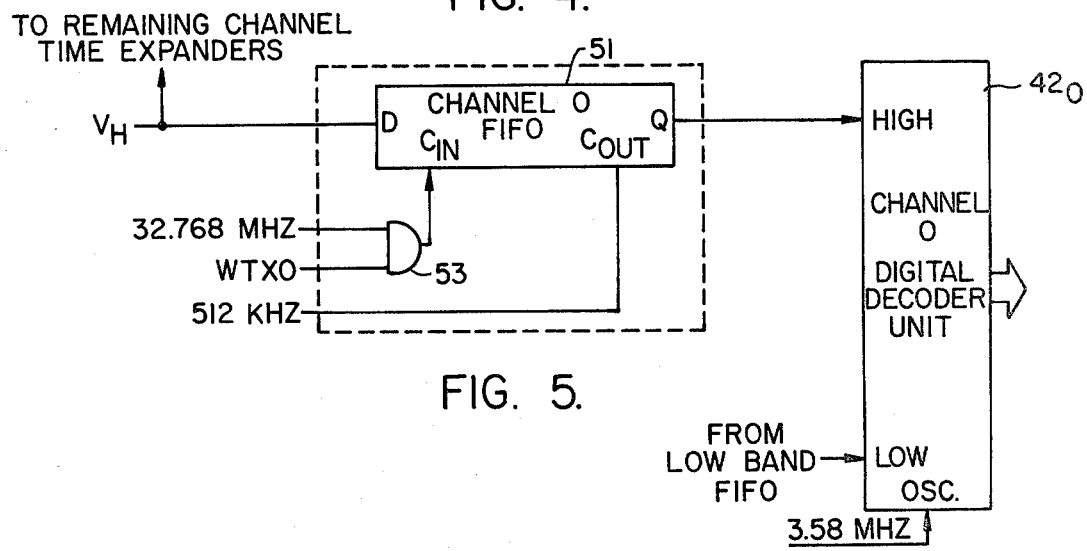
FIG. 5 is a schematic diagram of an alternate time expander unit suitable for use with the DTMF processor of FIG. 3.

FIG. 5 illustrates another embodiment of a time expander 18, similar in principle to the FIG. 4 embodiment, but employing a first in first out (FIFO) register arrangement. As seen in this FIG., the high band signal $V_H$ is coupled to the data input of a FIFO register 51, the data output of which is coupled to the high band data input of a digital decoder unit $42_0$. The input clock to FIFO 51 is provided by the output of an AND gate 53 having a 32.768 MHz. signal on a first input terminal and a control signal termed WTX0 as the input to the remaining terminal. The clock output terminal of FIFO 51 is coupled directly to a 512 kHz. clock signal.

In operation, data is shifted into FIFO register 51 under control of the 32.768 MHz. input clock when control WTX0 is active for 250 $\mu$sec. during the second half of the channel 0 readout. The output of FIFO 51 is continuously clocked by the 512 kHz. clock signal.

Although not expressly shown in FIG. 5, a similar FIFO and clock control circuitry is provided between the low band signal $V_L$ and the low band data input of digital decoder unit $42_0$.

Figure 6:
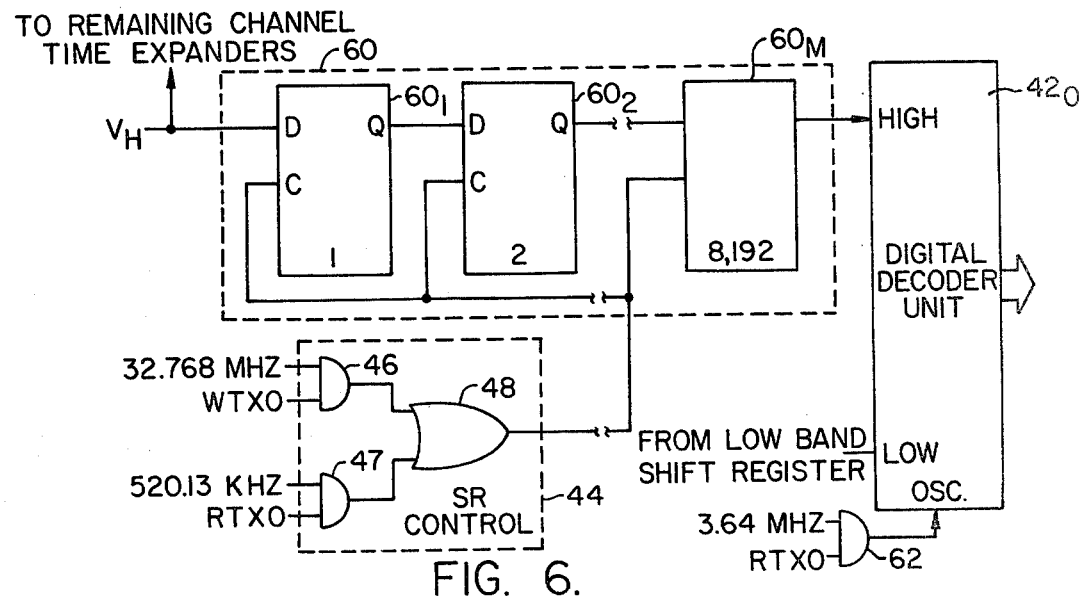
FIG. 6 is a schematic diagram of a time expander unit suitable for use with the DTMF processor of FIG. 3 in a packet burst mode of operation.

It should be noted that both of the above described embodiments of time expander unit 18 employ the continuous processing technique of FIG. 2. In contrast, FIG. 6 illustrates a "packet burst" processing technique illustrated in FIG. 2A. With reference to this figure, each compressed channel time packet resulting from analog processing and analog-to-digital conversion is expanded to an output time packet whose real time duration is less than that of the real time duration of the corresponding input time packet. In this embodiment the ratios of the respective clocks or periods must satisfy the following relationship:

$$\frac{RIC}{WIC} = \frac{1}{\frac{ROC}{WOC} \cdot F} = \frac{WOC}{ROC} \cdot \frac{1}{F}$$

or $$\frac{WIP}{RIP} = \frac{1}{\frac{WOP}{ROP} \cdot F} = \frac{ROP}{WOP} \cdot \frac{1}{F}$$

where the parameters are as defined supra. In selecting appropriate values for these parameters in any given application, the value of WIC is typically limited to a value close to the per channel data rate of the host device, while RIC is selected to afford the desired time compression ratio. WOC is normally dictated by the operational requirements of the analog processor unit 15 and the analog-to-digital converter unit 16. Thus, either a value for ROC or F may be additionally preselected, after which the value of the remaining parameter is determined by the equation supra. An example of preselecting the value of F is described below in connection with the FIG. 6 packet burst embodiment.

With reference to FIG. 6, the output of high band signal $V_H$ from the hybrid processor of FIG. 3 is coupled to the D input of a first flipflop $60_1$ of a shift register 60 comprising a cascaded chain of flipflops $60_1$, $60_2$, . . , $60_M$, which comprise the high band shift register 60 for the zeroeth information channel of the communication system. The number M of flipflops $60_i$ comprising register 60 is at least equal to the maximum number of bits of information in a compressed time packet after analog processing and analog to digital conversion of a given channel, which in the example illustrated is 8,192.

Clocking of the shift register 60 is controlled by shift register control unit 44, identical in structure to that shown and described above with reference to FIG. 4.

In operation, during the 250 $\mu$sec. second half of the channel readout, WTX0 control signal enables AND gate 46 to clock 8,192 bits of binary level information from high band signal $V_H$ into shift register 60 at the 32.768 MHz. write output clock rate. During the remainder of the period, gate 46 is disabled and AND gate 47 is enabled by control signal RTX0, which results in the clocking out of data from shift register 60 at a 520.13 kHz. read output clock rate. In order to provide error free operation of digital decoder unit $42_0$, the host oscillator input signal thereto is gated through an AND gate 62 by the RTX0 control signal to prevent the application of a clock signal train to the digital decoder unit $42_0$ during any time other than the time period defined by RTX0 control signal.

The digital decoder unit $42_0$ thus retains the signal processing status which existed at the conclusion of the processing of the previous time packet and utilizes this prior status to initiate processing of the subsequent time packet when control signal RTX0 unclamps the clock train to reactivate unit $42_0$.

Since there is a finite time period during which data is not being clocked out of shift register 60 to the decoder unit $42_0$ (i.e., when data is being clocked into shift register 60 at the higher rate), the read clock signal frequency assumes a different value from that ordinarily expected from the considerations described earlier relating to choice of ratioed clock frequencies for the continuous processing embodiment of FIGS. 4 and 5. In the example of FIG. 6, the data is written into shift register 60 during the 250 $\mu$sec. second half of the channel readout period. This is 25% of the total channel processing time (1 msec.). In addition, there are sixteen channels in the system illustrated and described. Therefore, the fraction F of the channel processing time period during which valid data is clocked out from shift register 60 is 63/64. Accordingly, the time expansion read clock, which would ordinarily be 512 kHz. for a continuous time packet processing embodiment, must be increased by 1/F, i.e., 64/63, to a frequency of 520.13 kHz. Since the successive expanded output time packets must be spliced into the output data stream in a manner which is transparent to the host system, provision must also be made in the host system to compensate for the time gap between successive expanded output time packets. Consequently, in addition to gating off the clock to digital decoder unit $42_0$ during the gap when RTX0 is false, the clock frequency for the unit $42_0$ must also be altered by 1/F from 3.58 MHz. to 3.64 MHz.

In summary, while the input time compression ratios of the processing periods noted above with respect to the description of FIG. 3 remain the same for packet burst time expansion as for continuous time expansion, the time expansion ratios for packet burst time expansion must satisfy the following expression:

$$RIC/WIC = WOC/ROC \cdot 1/F$$

Similarly, the oscillator frequency of the host system—in this embodiment the oscillator frequency for digital decoder unit 42—must also be increased by the factor 1/F. As will be apparent to those skilled in the art, the relationship for the clock (or period) ratios required for the proper packet burst processing according to the invention is the same as that for continuous processing since, in the latter case, F=1.

Low Speed FSK Modem

Figure 7:
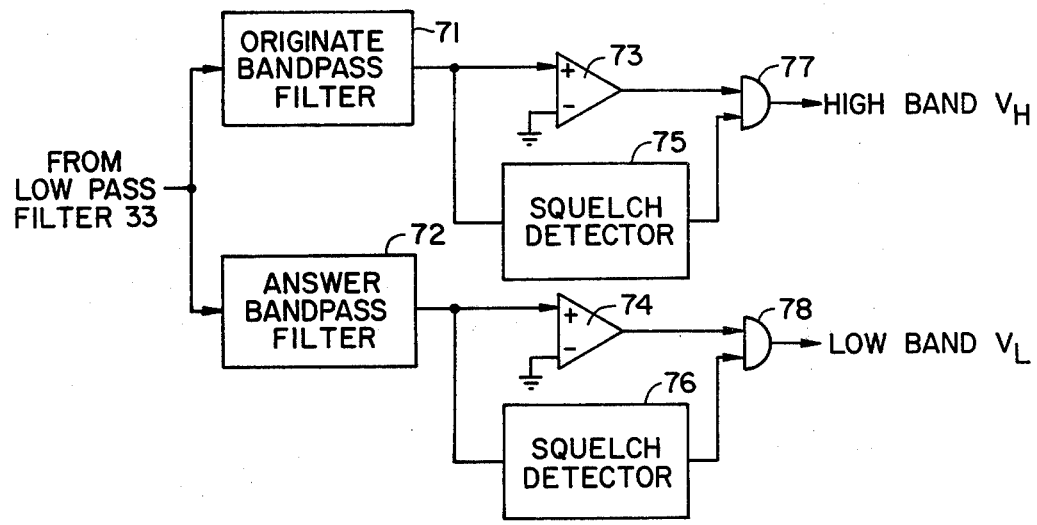
FIG. 7 is a block diagram of a portion of a hybrid processor unit used for low speed FSK modem processing.

FIG. 7 illustrates the analog processor unit and analog-to-digital converter portion of an embodiment of the invention suitable for use in low speed FSK modem signal processing. The analog processing portion shown in FIG. 7, which is substantially similar to the analog processor shown in FIG. 3 includes an originate band pass filter 71 and an answer band pass filter 72 to which analog signals output from low pass filter 33 of FIG. 3 are coupled for the purpose of separating the originate band frequencies from the answer band frequencies. The output of the originate band pass filter 71 is coupled to an originate band comparator 73 and a squelch detector 75, the outputs of which are coupled via an AND gate 77 to the $V_H$ output terminal. The output of the answer band pass filter 72 is coupled to a comparator 74 and a squelch detector 76, the outputs of which are coupled via an AND gate 78 to the $V_L$ output terminal. For continuous time packet processing, the high band and low band output signals may be coupled to a time expander unit of the type shown in FIGS. 4 and 5; for packet burst processing, the high band and low band output signals may be coupled to a time expander unit of the type shown in FIG. 6.

Assuming the same compression ratio (64/1), write input clock and read input clock frequencies as the FIG. 3 embodiment, the same write output clock and read output clock frequencies may be employed in the time expander unit. In addition, with a compression ratio of 64/1, the originate and answer band pass filters 71, 72 should have frequency pass band characteristics which are corresponding multiples by 64 of the normal pass band characteristics for filters of this type. Thus, rather than responding to originate band mark and space frequencies of 1270 Hz and 1070 Hz, respectively; and answer band mark and space frequencies of 2225 Hz and 2025 Hz, respectively; the filters 71, 72 should respond to corresponding frequencies of 81.28 kHz, 64.48 kHz, 142.40 kHz, and 129.60 kHz, respectively.

Digital Code Conversion

Figure 8:
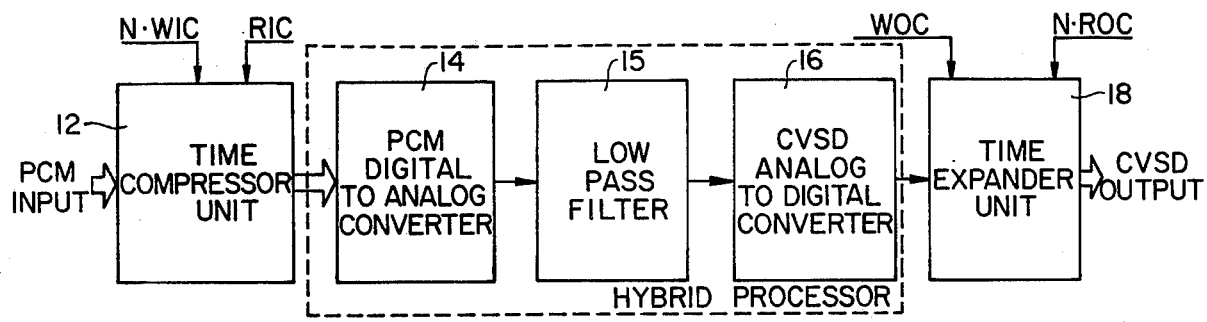
FIG. 8 is a block diagram of the invention used for CVSD encoding.

FIG. 8 illustrates one application of the invention to code conversion from a multi-bit digital input code to a single bit digital output code, viz., continuously variable slope delta modulation (CVSD) conversion. As seen in this figure, the pulse code modulated digital input signal train is applied to the time compressor unit in the manner described above and read out to a PCM digital-to-analog converter 14 which is a conventional device, such as a Precision Monolithic DAC76. The analog signal output from the converter 14 is coupled to the analog processor unit 15, which comprises a simple low pass filter, and thence to a CVSD analog-to-digital converter 16. The output of the converter 16 is stored in the time expander unit at the WOC rate and read from unit 18 at the ROC rate.

Figure 9:
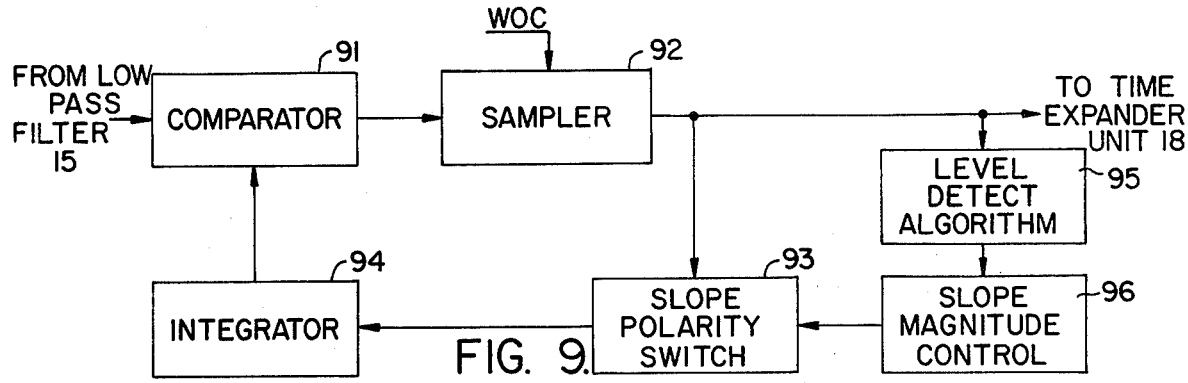
FIG. 9 is a block diagram of the CVSD analog-to-digital converter portion of the unit of FIG. 8.
Figure 10:
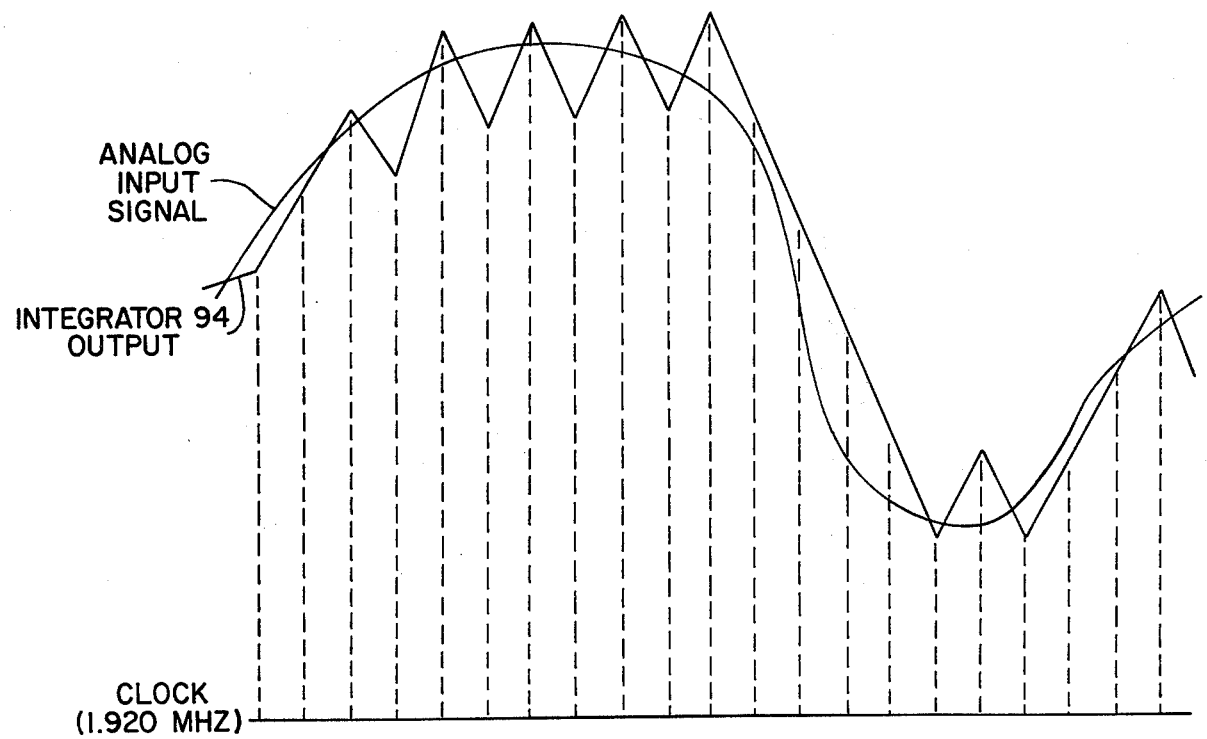
FIG. 10 is a waveform diagram illustrating the operation of the converter of FIG. 9.

CVSD analog-to-digital converter 16 is shown in block diagram form in FIG. 9 and is seen to comprise a simple delta modulator consisting of a comparator 91, a sampler 92, a slope polarity switch 93 and an integrator 94 intercoupled as shown, and circuit elements for performing a level detect algorithm for controlling the operation of the slope magnitude control unit which is coupled to the slope polarity switch 93 in order to provide an increased dynamic range by enabling the adjustment of the rate of integration of the integrator 94. FIG. 10 illustrates the analog input signal to comparator 91, the integrator 94 output signal, the clock (WOC) used to operate sampler 92 and the output data from sampler 92, seen to be a bi-level binary signal.

Assuming the same parameters as those set forth for FIG. 3, viz., the time compression ratio of 64/1, and values of 8 kHz and 512 kHz for the WIC and RIC clocks, and selecting a WOC sampling rate of 1.984 MHz (samples per second) a value of 31 kHz for the ROC rate will provide the requisite 1/64 inverse ratio. Thus, by the use of inverse time compression-time expansion ratios, 64,000 bits per second (bps) of pulse code modulated data (8 kHz channel sample rate × 8 bps) can be converted to 31,000 bps CVSD (31,000 samples per second with one bit per sample). Since PCM data is normally filtered after digital-to-analog conversion by means of a low pass filter having a corner frequency of 3.2 kHz, low pass filter 15 is designed to have a corner frequency of 204.8 kHz (64×3.2 kHz) to compensate for the 64/1 time compression formed in the time compressor unit 12.

As will be evident to those skilled in the art, the invention can also be used for converting CVSD encoded data into PCM encoded data. In such an application, the digital-to-analog converter 14 (FIG. 8) would comprise a CVSD decoder while the analog-to-digital converter 16 would comprise a PCM encoder. By setting WIC at 31 KHz, RIC at 1.984 MHz, WOC at 512 KHz, and ROC at 8 KHz, the invention may be used to convert 31,000 bps CVSD encoded data into 64,000 bps PCM encoded data. Thus, when the invention is inserted into a host PCM system operating at 64,000 bps per channel, the same information can be more efficiently transmitted over an intermediate transmission link at 31,000 bps, while maintaining end-to-end PCM compatibility with the host system, with the invention being substantially transparent to the host system.

Other examples of code conversion from one type of digital code to another digital format are also possible with the invention. For example, analog-to-digital converter 16 may comprise a 7 bit PCM encoder for converting 8 bit PCM input data to 7 bit PCM output data in order to reduce the bit rate of the information transmitted over an associated communication link. More specifically, by selecting a WOC rate of 512 kHz equal to the RIC rate, the result is a conversion of 8 bit PCM sampled at 8,000 samples per second (64,000 bps) into 7 bit PCM sampled at 8,000 samples per second (56,000 bps), corresponding to a bit rate reduction of 8,000 bps. Similarly, analog-to-digital converter 16 may comprise a 7 bit PCM encoder operated at a different rate (WOC) from the read input rate (RIC) of 8 bit PCM input data. For example, the converter 16 may have a clock rate WOC equal to $\frac{7}{8}$ RIC (448,000 samples per second), which would result in the conversion of 8 bit PCM sampled at 8000 samples per second into 7 bit PCM sampled at 7,000 samples per second. In such an arrangement, the corner frequency of low pass filter 15 may be reduced from the 204.8 kHz value for the FIG. 8 embodiment to ⅞ this value (179.2 kHz). In addition, analog-to-digital converter 16 may comprise an 8 bit PCM encoder operated at a slower rate (WOC) from the read input rate (RIC) of 8 bit PCM data to provide the resolution which is better than conventional 7 bit resolution at a reduced sample rate.

As the above discussion of code converter analog processing techniques employed with the invention demonstrates, the rate at which the processed analog signals may be sampled (i.e., the magnitude of WOC) may be higher, equal to or lower than the per channel rate at which the digital input data is converted from digital to analog form (i.e., the value of RIC). Stated differently, the readout rate from time compressor unit 12 and the write rate into time expander unit 18 are unrelated in magnitude, the only requirement being that the compressor per channel sampling rate ratios and the expander per channel sampling rate ratios be the complement of each other for continuous processing, and the compressor per channel sampling rate ratios and the expander per channel sampling rate ratios be the complement of each other multiplied by the proper fractional factor for packet burst processing. Further, the nature of the type of code conversion effected by the analog-to-digital converter 16 is dependent upon the particular application requirements and encompasses both single bit and multiple bit conversion.

Dual Frequency Time Encoder-Time Decoder

Figure 11:
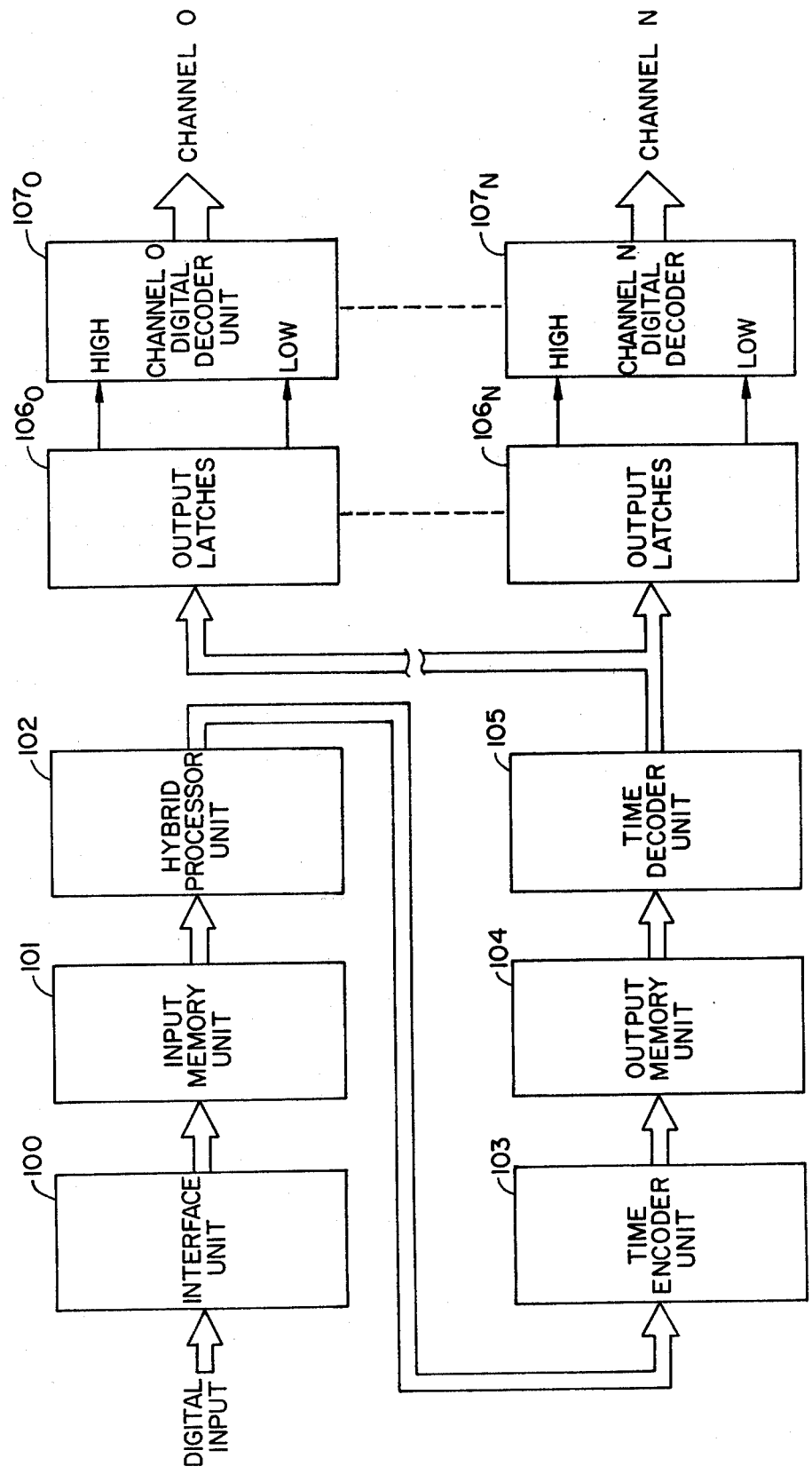
FIG. 11 is a generalized block diagram illustrating an embodiment of the invention used for DTMF processing and employing a novel digital encoding and decoding technique.

FIG. 11 illustrates a generalized block diagram of an embodiment of the invention employed to provide dual frequency signal processing and detection for a multiplicity of time division multiplexed information channels, and which includes a novel method and apparatus for efficiently capturing the salient frequency information.

Figure 13:
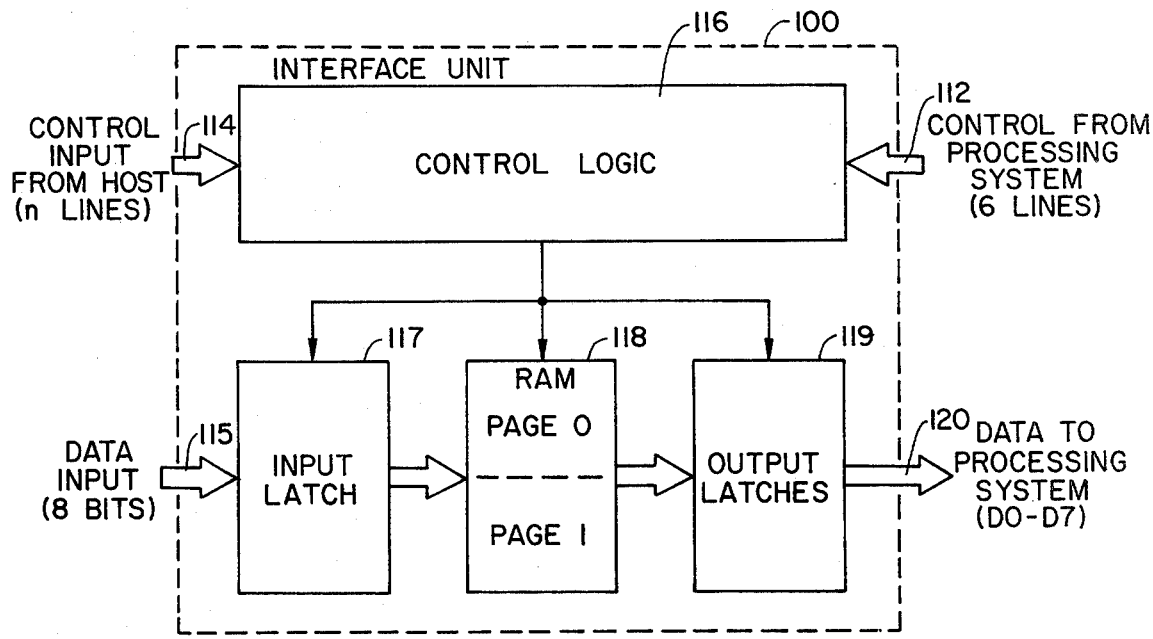
FIG. 13 is a block diagram of the interface unit.
Figure 14:
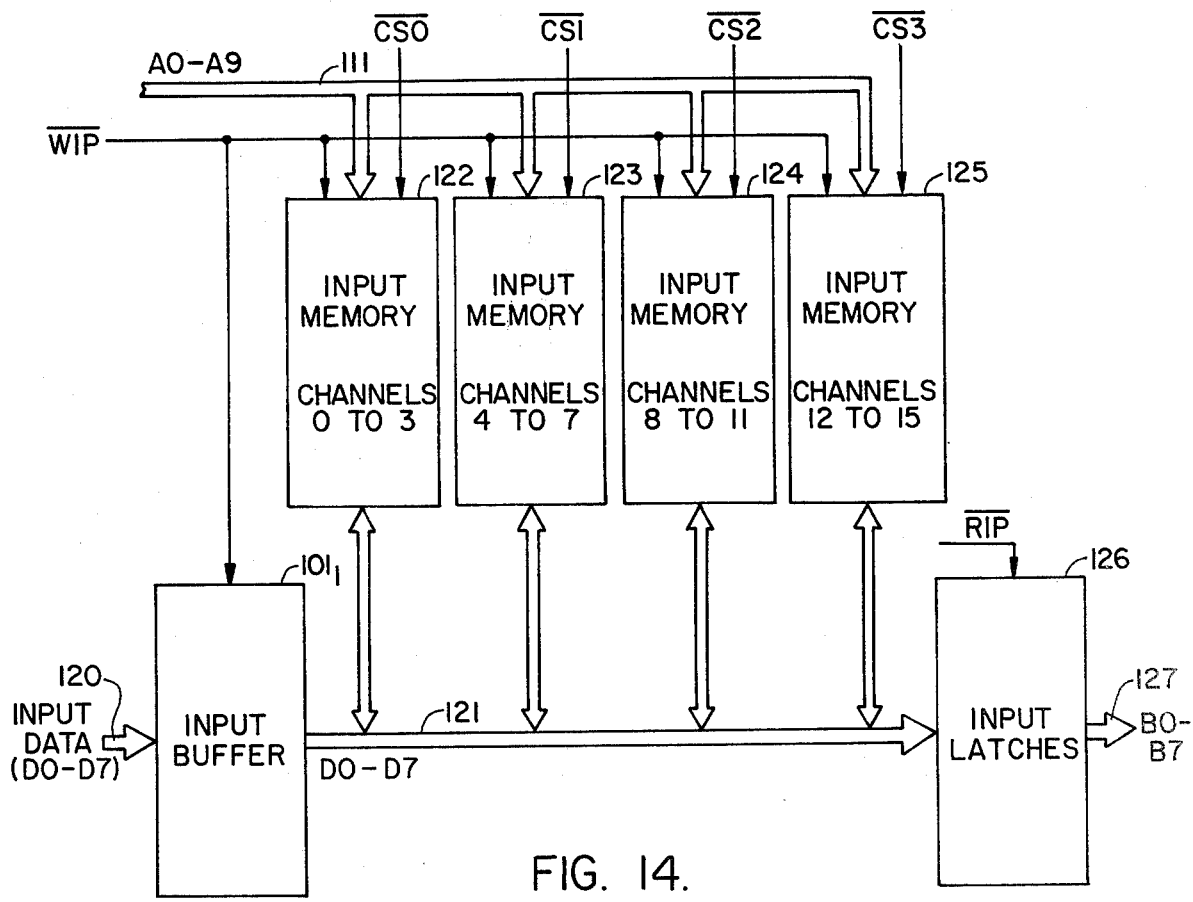
FIG. 14 is a block diagram of the input memory unit.

As seen in this FIG., digital input signals from a host device, such as a computerized branch exchange (CBX) or digital telephone switch are coupled via an interface unit 100 shown in greater detail in FIG. 13 to an input memory unit 101 shown in FIG. 14. The digital input signals typically comprise time division multiplexed digital information signals from a plurality of information channels 0, 1, 2, ... N, and control signals furnished by the host CBX serving to correlate the digital information signals with their respective channels and providing a host system clock. The digital input information signals are sequentially stored in their order of appearance in the input memory unit 101 by means of an internal system write input clock WIP (see FIG. 14) which is independent or asynchronous with respect to the host clock signal train but of approximately the same frequency, i.e., N·WIC. Alternatively, in some applications the write input clock may be synchronous with the host system clock. The signals stored in the input memory unit 101 are read out in a different sequential order channel by channel at a much higher frequency (512 KHz) by means of an internal system read input clock (RIC) $\overline{\text{RIP}}$ in conjunction with chip select signals $\overline{\text{CS0}}$-$\overline{\text{CS3}}$ (see FIG. 14) and are coupled to a single hybrid processor unit 102 in which the successive channel signal groups are converted from digital to analog form, filtered to separate the high band frequencies from the low band frequencies and thus provide a pair of analog signals, and converted to a pair of binary signals each having a period equal to that of the corresponding analog signal, respectively.

The signals output from the hybrid processor unit 102 are coupled to a time encoder unit 103 shown in FIG. 15 which encodes the received signals in the manner described below into a succession of unique multi-bit digital character pairs, which are then stored in an output memory unit 104 in their order of appearance. The unique digital character pairs stored in output memory unit 104 are sequentially read out channel by channel and coupled to a time decoder unit 105 shown in FIG. 17 which correlates each character pair with the proper information channel and provides data signals for a plurality of output latch pairs $106_O$–$106_N$ corresponding to information channels O–N. The output latch pairs $106_O$–$106_N$ are coupled to a corresponding number of dedicated dual frequency digital decoder units $107_O$–$107_N$, which preferably comprise a plurality of identical commercially available decoders such as the CRC8030 digital dual frequency tone decoder available from Rockwell/Collins Corporation.

The general operation of the system depicted in FIG. 11 is as follows. Digitized information (e.g., DTMF tones, speech, etc.) samples from a number of separate voice channels O–N are successively coupled by interface unit 100 to input memory unit 101 and stored therein by means of the write input clock $\overline{\text{WIP}}$ and $\overline{\text{CS0}}$-$\overline{\text{CS3}}$. Input memory unit 101 is continuously updated so that the most current digital samples from each voice channel are available for subsequent processing. Typically, input memory unit 101 has sufficient capacity to store the most recent 10 to 50 msec. of digitized information from each voice channel. While the digital input signals are stored in their order of appearance, i.e., a byte at a time from successive voice channels, the stored information is read from input memory unit 101 by signals $\overline{\text{CS0}}$-$\overline{\text{CS3}}$ and are set into input latch 126 by the read input clock signal $\overline{\text{RIP}}$ one voice channel at a time, with all of the bytes corresponding to a single information channel being read out in succession. In addition, the rate at which a group of bytes from a single information channel are read out, i.e., RIC, is substantially higher than the rate at which the input information bytes from that channel are stored into input memory unit, i.e., WIC. The read out rate is selected to provide the requisite time compression to enable processing of at least one time packet of input information samples per system channel processing time. In the preferred embodiment, in which a complete time packet "header" is employed, the read out rate RIC provides 64/1 time compression and two time packets each containing 128 samples are read out for subsequent processing in the analog domain during each system channel processing time. With an input channel sample rate of 8 kHz corresponding to a per channel sample period of 125 μsec, each time packet thus contains 16 msec of real time samples (125 μsec/sample × 128 samples) and 32 msec of real time channel information are read during each system channel processing time.

The information read from the input memory unit 101 channel by channel is processed by the hybrid processor unit 102, which preferably comprises the unit shown in FIG. 3 described supra. The resultant signals output from the high band and low band comparators of the hybrid processor unit 102 comprise a succession of frequency translated, time compressed segments of the dual tone multi-frequency signals present in each information channel and are coupled to time encoder unit 103 which analyzes the output of each comparator and encodes the salient information contained therein into a series of time encoded data words (bytes). The information encoded into these data bytes is sufficient to permit the subsequent circuitry, viz., output memory unit 104, time decoder unit 105, and output latch pairs 106$_i$ to reassemble the time compressed digital bursts from each information channel into a continuous, time expanded output capable of driving the digital dual frequency decoder units 107$_i$.

The data words output from the time encoder unit 103 are stored in the output memory unit 104 and subsequently read out to the time decoder unit 105, which drives the output latch pairs 106$_i$ to produce expanded time packets of signal information to tone decoders 107$_{O-107N}$.

The read/write sequence of output memory unit 104 is the mirror image of the read/write sequence of input memory unit 101: i.e., individual bytes from successive information channels are written into input memory unit 101 and the information stored in output memory unit 104 is read as individual bytes from successive channels; while information is read from input memory unit 101 a channel at a time, and output memory unit 104 is written a channel at a time. The ratio of the read input clock RIC to the write input clock WIC used in input memory unit 101 is the inverse of the ratio of the read output clock ROC to the write output clock WOC used in output memory unit 104. As a result, the input memory unit 101 performs time compression, while output memory unit 104 performs time expansion. In this manner, the time compression and data sequence translation performed by input memory unit 101 is exactly compensated for by the time expansion and the inverse data sequence translation performed by output memory unit 104.

Time encoder unit 103 generates a plurality of pairs of multi-bit digital characters for each pair of time compressed high and low band binary signals coupled thereto from hybrid processor unit 102. Each character contains a first portion identifying an encoder time slot (defined below) and a logic level signal signifying the binary level of the output of the corresponding comparator (i.e., high band or low band) at the beginning of the encoder time slot. Two sets of character pairs are generated for each information channel O–N: One corresponding to the high band, the other corresponding to the low band. After storage in output memory unit 104, each set of character pairs is examined by the time decoder unit 105 and is used to update the corresponding latch pair of output latch pairs 106$_i$. Latch pairs 106$_i$ are dedicated to different information channels, and each channel has a pair of latches: One corresponding to the high frequency band and one corresponding to the low frequency band. Each pair of output latches for each channel is thus periodically updated in accordance with the information present in each time packet of the corresponding channel. By thus dedicating a pair of output latches 106$_i$ to each voice channel O–N, and by properly splicing together successive readouts from each channel, a continuous digital representation of the filtered high and low bands of each information channel is produced and presented to decoder units 107$_i$ for detection. It is important to note that the updating of the output latches 106$_i$ is effected in accordance with the timing relations shown in FIG. 2 and discussed supra, so that the updated tone decoder 107$_i$ information is spliced into the output data stream in a manner which is transparent to the host system.

Figure 12:
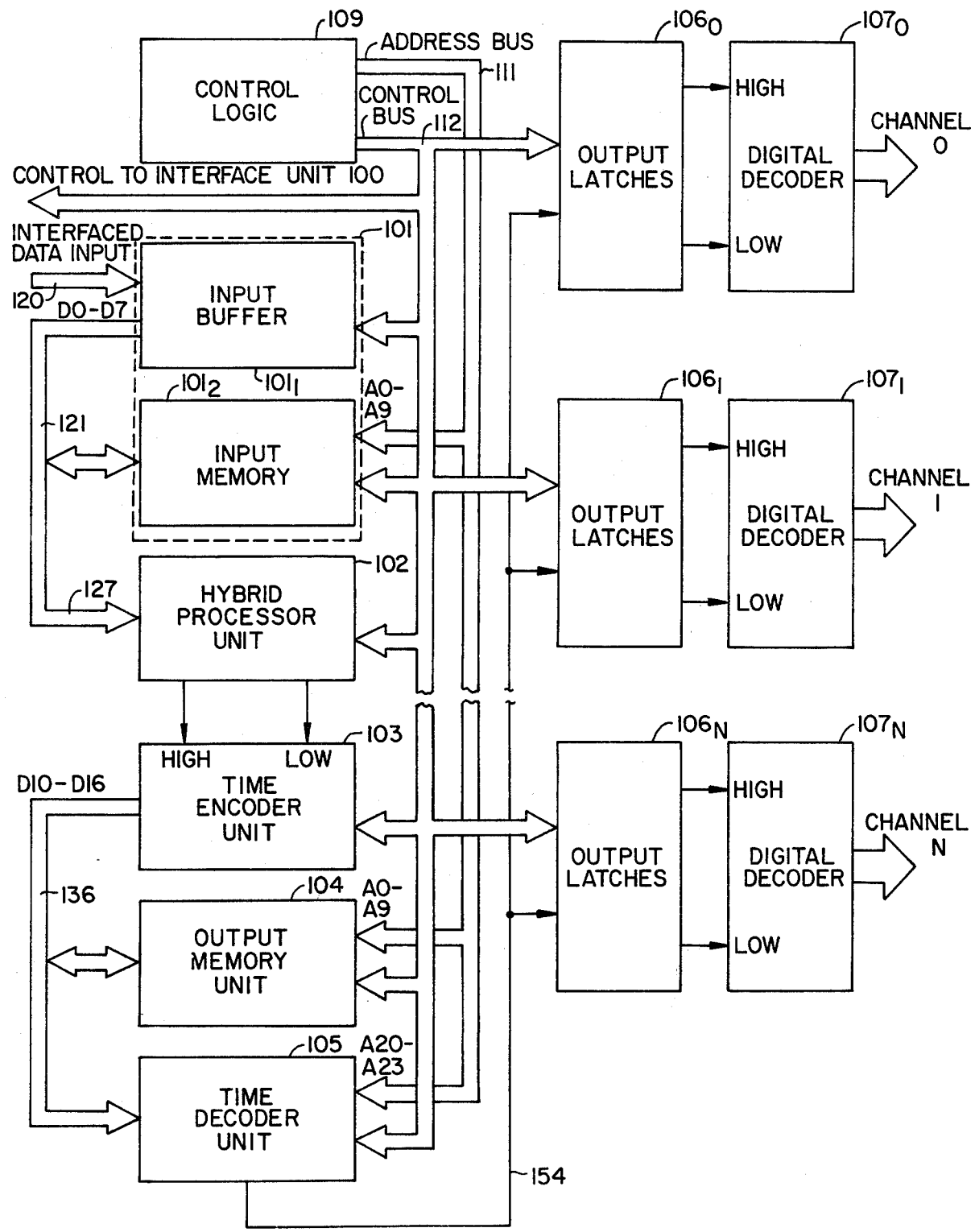
FIG. 12 is a more detailed block diagram showing the embodiment of FIG. 11.

FIG. 12 illustrates in block diagram form to greater detail the system of FIG. 11. As seen in this figure, from which the interface unit 100 is omitted, the input memory 101 consists of an input buffer 101$_1$ and an input memory 101$_2$, both described in greater detail below with respect to FIG. 14. In addition, a control logic unit 109 provides address information to an address bus 111 which is coupled to input memory unit 101$_2$, output memory unit 104, and time decoder unit 105, and supervisory and control signals to a control bus 112 coupled to the interface unit 100 (FIG. 11), input buffer 101$_1$, input memory 101$_2$, hybrid processor unit 102, time encoder unit 103, output memory unit 104, time decoder unit 105, and output latches 106$_i$.

Interface Unit 100

Interface unit 100, shown in FIG. 13, is tailored to the bus structure of the host CBX, the bus structure generally including a control input bus 114 consisting of n control conductors and a data input bus 115 consisting of a plurality of data bit conductors. For purposes of this disclosure, it is assumed that the data input bus 115 consists of eight data input lines. The control input bus 114 is coupled to a control logic unit 116, while the data input bus 115 is coupled to a plurality of input latches 117. The input latches 117 are coupled to a buffer ram memory unit 118, which has data outputs coupled to a plurality of output latches 119. Output latches 119 are coupled via a data bus 120 consisting of individual conductors D0–D7 to the input memory unit 101.

Figure 20:
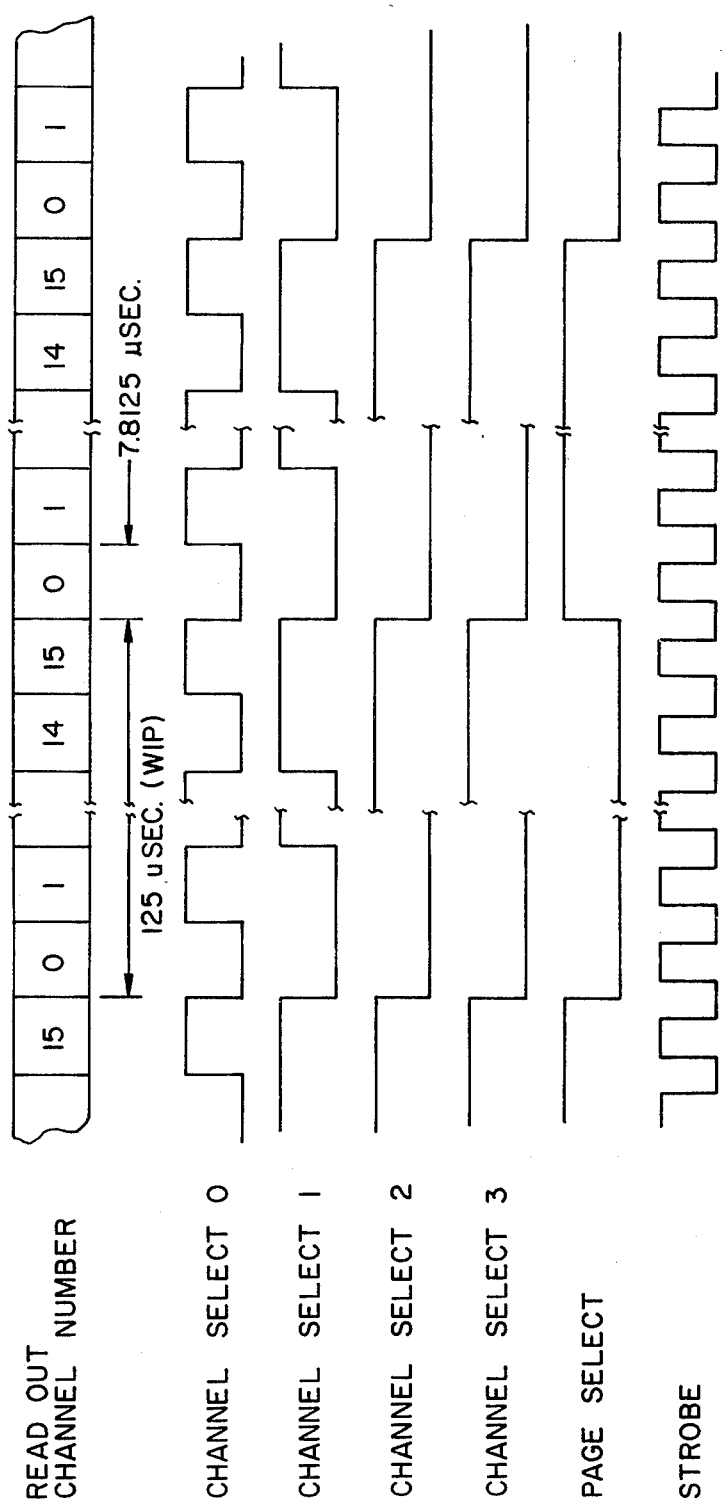

Control signals from the control logic unit 109 of the system (FIG. 12) are coupled via a control bus portion 112 to the control logic unit 116 of interface unit 100. The control signals are shown in FIG. 20 and consist of four channel select control lines for defining sixteen possible channels, a page select control signal and a strobe clock signal. In the specific embodiment of the invention, ram memory unit 118 is divided into two 16 byte by 8 bit pages, with each page being alternately filled with input data from the host CBX while the opposite page is being read out to the input memory unit 101. Since each page of the ram memory unit 118 stores one byte of input data from every channel, ram memory unit 118 serves to double buffer data being transferred from the host to the input memory unit 101.

An important feature of the invention is the lack of any requirement that the system of FIG. 12 be synchronized to the host CBX. In fact, data from ram memory unit 118 is transferred to the input memory unit 101 by the signals shown in FIG. 20 in a manner independent from the timing signals supplied to interface unit 100 via control input bus 114. Since the data transfer rate of the host CBX and that of the invention will inevitably be slightly different due to inaccuracies in the respective control oscillators, the time during which data is written into ram memory unit 118 will precess relative to the time at which data is read out of ram memory unit 118. This precession can cause an invalid byte of input data to be occasionally transferred from the host CBX to the system of FIG. 12; however, such a transfer of an invalid byte of data will not adversely affect the operation of the invention. Typically, the permutation caused by an invalid data byte is either filtered out by the band pass filters in the hybrid processor unit 102 or simply passes through the digital portion of the system with substantially no consequence to the time decoder portion.

In operation, input data is written into memory locations 0-15 of page 0 (page select=0) of ram memory unit 118, or into memory locations 0-15 of page 1 (page select=1). When page select is low and data from the host CBX is being written into page 0, page 1 is used as the data source for the eight bit output latches 119. Conversely, when page select=1 and data from the host CBX is being written into page 1, page 0 serves as the data source for the output latches 119. In this manner, the two 16 by 8 pages of the 32 by 8 bit ram memory unit 118 provide double buffering for the input data being transferred from the host CBX to the input memory unit 101.

The channel select lines shown in FIG. 20 are used to specify the information channel (i.e., memory location in ram memory unit 118) from which data is to be transferred to input memory unit 101. The four channel select lines shown are sequenced every 7.8125 μsec. in order to fetch new data from a given one of information channels 0-15 during this time period. After data has been fetched from information channel 15, the page select signal is toggled, thereby synchronizing paging to channel selection. By continually repeating the channel 0 through channel 15 selection sequence, new input data from each information channel is transferred to input memory unit 101 once every 125 μsec., which corresponds to a per channel sampling rate of 8 kHz (WIC). Control logic unit 116 of interface unit 100 decodes any given requested channel number specified by the channel select lines after the strobe signal transitions to the high state.

Lack of synchronization between the system of FIG. 12 and the host CBX may cause the page select signal to toggle during the time that input data is being read into input latches 117 under control of clocking signals supplied from the host CBX via control input bus 114. When this occurs, the data byte present in input latches 117 is read into the opposite page: However, consecutive data bytes from the same information channel will be written into opposite pages of ram memory unit 118, so that the transfer of data from the interface unit 100 to input memory unit 101 is not impaired.

Lack of synchronization between the system of FIG. 12 and the host CBX also can cause precession in the following manner. Assuming that the master control oscillator in control logic unit 109 generates a strobe signal whose frequency varies by a random amount bound by a maximum error, e.g., 0.01%, the sample period of 125 μsec. shown in FIG. 20 will deviate from the norm, thereby causing the sample period provided by control logic unit 109 to precess relative to the sample period defined by the host CBX. This, in turn, can cause the time at which the page select line toggles to precess relative to the time at which data from the host CBX is written into the interface unit 100. For example, assuming that the page select line had been toggling between channels 9 and 10, instead of always occurring between channels 9 and 10, the page select toggle time will precess until it occurs between channels 10 and 11, then slip to between channels 11 and 12, etc., with this precession continuing at a relatively constant rate.

The effect of this precession on the interface unit 100 will not be noticed until the page select toggle time precesses by a whole channel number. For example, if the page select is toggling between the writing of channels 9 and 10, the precession is not noticed until the toggle time slips to between channels 10 and 11. When this slippage occurs, only one information channel is affected, with a single byte of invalid input data appearing in the location in ram memory unit 118 reserved for that channel. Typically, the location of one channel in ram memory unit 118 will not be properly updated at the instant of slippage, causing the previous byte from that channel to remain therein or overwriting the previous byte before paging can occur.

Further, precession by one whole channel number is of no consequence unless a dual tone multiple frequency signal is being processed by the affected channel at the instant of slippage. Assuming typical register holding times, valid DTMF signal durations and a worst case crystal oscillator inaccuracy of 0.01%, only one or two bytes of invalid data may occur per every 1000 DTMF signals processed by that channel.

Moreover, when precession by one whole channel number occurs during the time that a DTMF signal is being processed by the affected channel at the instant of slippage, the effect is typically negligible since the permutation caused by a single invalid data byte is filtered out by the band pass filters in hybrid processor unit 102, or simply passes through the digital portion of the system of FIG. 12. The maximum adverse effect of an invalid data byte merely causes the time required to recognize a valid DTMF signal to be increased by a few msec.

Input Memory Unit 101

The input memory unit 101 is shown in FIG. 14 and includes input buffer 101₁ to which input data on data bus 112 is coupled from interface unit 100. Input buffer 101₁ preferably comprises eight tri-state gates which are enabled by the write input clock signal $\overline{WIP}$ ($=N \cdot WIC$) from control logic 109. The eight bit output of input buffer 101₁ is coupled via internal data bus 121 in parallel to the data input/output ports of four input memory modules 122, 123, 124, and 125. Addressing of the input memory modules 122-125 is controlled by the address signals on address bus 111 supplied by control logic 109 and selection of an individual input memory module is controlled by the chip select signals $\overline{CS0}$, $\overline{CS1}$, $\overline{CS2}$, and $\overline{CS3}$, all supplied from control logic unit 109 by individual lines of control bus 112.

Each input memory module 122-125 preferably comprises two 4 K static MOS RAMS which are operated in parallel to form a 1024 byte by eight bit memory array. The control logic partitions the memory array of each module 122-125 into four 256 byte by eight bit blocks, each block being reserved for one information channel. Since new data from each channel is written into the input memory at an 8000 sample per second rate, each 256 byte block in memory modules 122-125 contains the most recent 32 msec. of digital input data from the corresponding channel, i.e., two input time packets of information.

In operation, the appropriate memory address is established via address bus 111 just prior to the transition of the $\overline{WIP}$ control signal from high to low. Concurrent with this transition, the appropriate chip select line $\overline{CS0}$–$\overline{CS3}$ is driven low, which causes the input data present on internal data bus 121 to be written into the selected memory location of the appropriate module 122-125.

The data is read from input memory modules 122-125 into input latches 126 under control of the read clock signal $\overline{RIP}$ (RIC) and the signals $\overline{CS0}$–$\overline{CS3}$ supplied from control logic unit 109. Addressing is performed by the address signals on bus 111 and the specific module 122-125 is selected by chip select lines $\overline{CS0}$-$\overline{CS3}$.

Memory is read out following address selection via address bus 111 and module selection via the appropriate chip select signals $\overline{CS0}$-$\overline{CS3}$ by driving the $\overline{RIP}$ control line low to latch the data into input latches 126. As noted above, readout of the input memory modules 122-125 occurs an information channel at a time, with all 256 bytes stored for a given information channel being read out in succession corresponding to two time packets of channel information. As set forth more fully below, 32 msec. of digital information from voice channel 0 are first read out in time compressed fashion in 500 μsec., after which a 500 μsec. pause ensues, during which time no data is read from the input memory. This pause allows signals from channel 0 to decay in the band pass filters in hybrid processor unit 102 prior to processing of channel 1 information, which prevents interference between data readout from channel 0 and channel 1. After the 500 μsec. pause, channel 1 is read out, and the readout/pause sequence is continuously repeated for all 16 channels.

Hybrid Processor Unit 102

The hybrid processor unit 102 is shown in FIG. 3 and has been described supra. Briefly, unit 102 converts the digital channel information supplied from input latches 126 via bus 127 to high band $V_H$ and low band $V_L$ periodic binary signals for further processing by time encoder unit 103.

Time Encoder Unit 103

Figure 15:
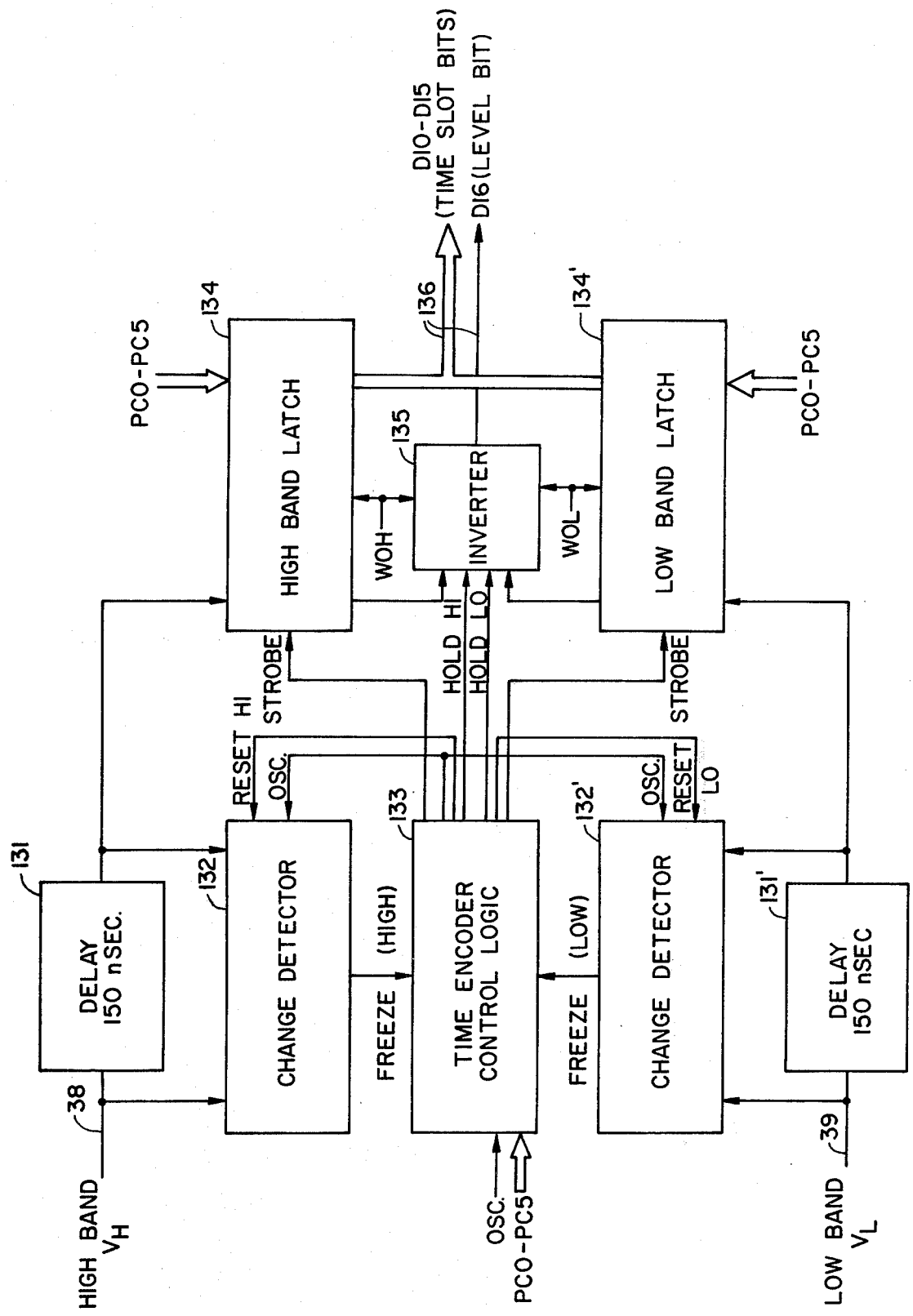
FIG. 15 is a block diagram of the time encoder unit.

With reference to FIG. 15, time encoder unit 103 contains parallel circuitry for encoding the high band and the low band binary signals present on conductors 38, 39, respectively, by generating a series of seven-bit digital character pairs for identifying encoder time slot information and comparator signal levels in the following manner. As seen in FIG. 15, unit 103 includes a high band delay circuit 131 for providing a 150 nanosecond delay for the $V_H$ signals output from the high band comparator 36, a change detector 132 illustrated in FIG. 26, a seven-bit high band latch 134 and an inverter circuit 135 also illustrated in FIG. 26, all under control of a control logic circuit 133 shown in FIG. 26. Substantially identical elements 131', 132' and 134' are provided for encoding the low band comparator signals present on input conductor 39. The time encoder control logic circuit 133 generates gated strobe signals for the high and low band latches 134, 134' and a timing signal OSC for change detectors 132, 132'. High band latch 134 is enabled for readout on a data bus 136 by a control signal WOH generated by control logic unit 109 (FIGS. 12 and 18), while low band latch 134' is enabled for data readout on data bus 136 by a control signal WOL also provided by control logic unit 109. Enabling control signals WOH and WOL are mutually exclusive, as described more fully below, with WOH occurring first in any given system cycle.

Timing signals PC0-PC5, which define successive encoder time slots described below, are supplied to both high band latch 134 and low band latch 134' from control logic unit 109.

With reference to FIG. 26, change detector 132 comprises an exclusive OR gate 261 having a first input coupled to $V_H$ and a second input coupled to the output of delay circuit 131. The output of exclusive OR gate 261 is coupled to the J input of a J-K flipflop 262, the clock input of which comprises the 32.768 MHz system clock (OSC). A control signal termed "RESET HI" is coupled to the K input of flipflop 262.

Control logic 133 includes a NOR gate 264 with inputs 32.768 MHz and the Q output from flipflop 262 termed "FREEZE". The output of NOR gate 264 is the strobe signal coupled to HI band latch 134.

Control logic 133 further includes a J-K type flipflop 265 having the 32.768 MHz system clock coupled to the clock input and a time signal termed "TS63" generated by an AND gate 266 having as inputs the timing signals PC0-PC5 from system control logic unit 109. Flipflop 265 generates a control signal termed "HOLD HI" during the time frame which follows a time frame during which the FREEZE control signal was generated.

Inverter 135 (one-half of which is shown in FIG. 26) comprises an exclusive OR gate 267 to which the HOLD HI control signal and the level bit from high band latch 134 are coupled, and a tri-state gate 268 to which the output of exclusive OR gate 267 and the WOH control signal are coupled. Inverter 135 functions in such a manner that the level bit coupled thereto from high band latch 134 on lead 269 is transferred to the output thereof directly when WOH control signal is active and HOLD HI is inactive; while the data bit is inverted when WOH is active and HOLD HI is active.

Time encoder unit 103 partitions time into 1.953 μsec duration time frames with each time frame subdivided into 64 successive 30.5 nanosecond time slots. For each time encoder time frame, a pair of time encoded seven-bit data bytes are generated on data bus 136: One data byte for the high band and one data byte for the low band. These bytes are alternately output by the time encoder unit 103 and written into the output memory unit 104 once per time encoder time frame.

Figure 27:
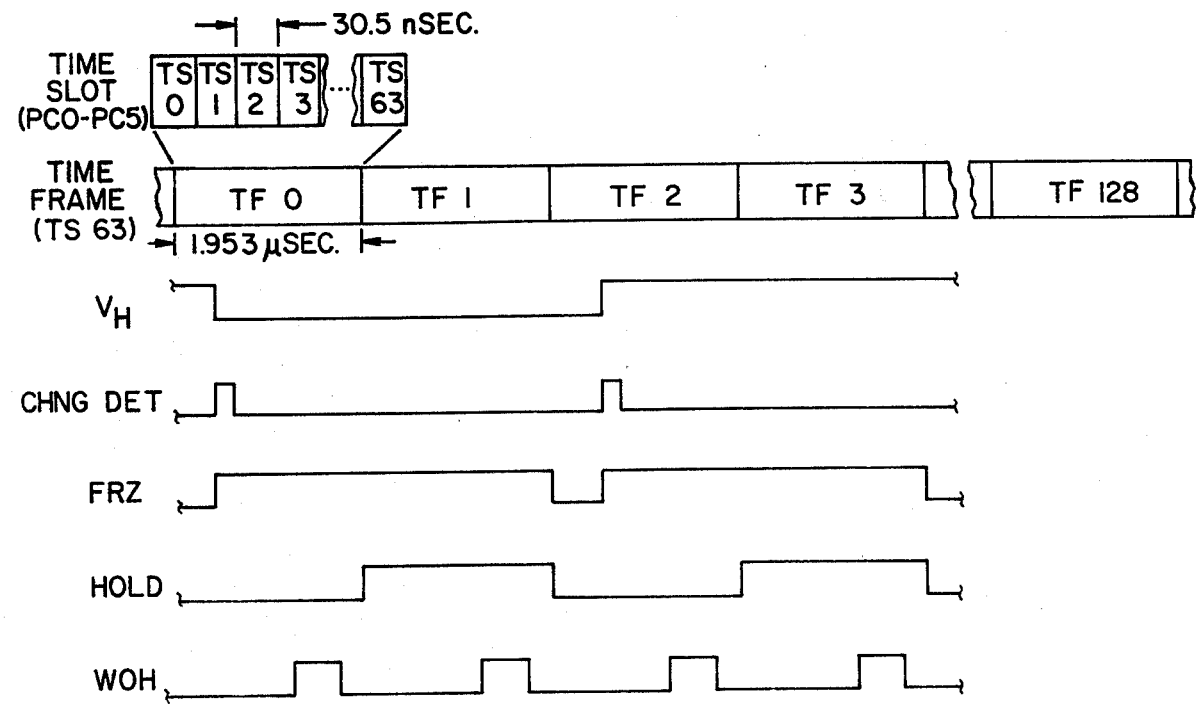
FIG. 27 is a timing diagram illustrating operation of the time encoder unit.

With reference to FIG. 27, each time frame defined by timing signals PC6-PC12 comprises 64 time slots defined by timing signals PC0-PC5. During each time frame, change detector 132 examines the direct $V_H$ and delayed $V_H$ signals to determine whether a transition appears in the $V_H$ signal. When a change is detected, the FREEZE signal goes active which terminates the strobe signal to the high band latch 134 and qualifies flipflop 265 to generate the HOLD HI signal at the end of that time frame. Both the FREEZE and HOLD HI signals remain active through the following time frame, termed the "hold" time frame. WOH signal, which occurs at the same frequency as the time encoder time frames, enables readout of the level bit on conductor 269 and the six-bit time encoder time slot number via data bus 136 to output memory unit 104.

In operation, and with reference specifically to the high band signal processing portion of FIG. 15, both the time slot member defined by signals PC0-PC5 and a delayed signal from the output of delay circuit 131 representing the delayed high band signal $V_H$ are input to latch 134. Latch 134 is strobed at the beginning of each time slot with the 32.768 MHz. clock signal (the system clock) and therefore contains the most recent time slot number and the level of the $V_H$ binary signal prior to the 150 nanosecond delay. During quiescent periods when no changes occur in the level of the $V_H$ signal, the data bit strobed into the latch from the delay circuit 131 accurately reflects the level of the $V_H$ signal. In addition, during quiescent periods, the six time slot bits are updated with a new time slot number every 30.5 nanoseconds.

During a WOH instruction, the high band latch 134 places the data stored therein on the seven-bit data bus 136 (D10–D16). Since the high band latch 134 is being continuously updated during quiescent periods, the output data bit (D16) will be stable (since the level of $V_H$ has not changed), but the time slot number (D10–D15) will change sixteen times during the persistence of the WOH instruction cycle signal (since the duration of WOH is sixteen times the duration of a time encoder time slot). The time encoded data bytes present on bus 136 subsequently written into output memory unit 104 during these quiescent periods will thus accurately reflect the level of the $V_H$ signal but will contain an indeterminate time slot number. As described more fully below, only the level of the $V_H$ signal is of importance during a quiescent period and thus the absolute value of the time slot number is not significant.

When a change of state occurs in the level of $V_H$, this change is synchronized to the 32.768 MHz. system clock and change detector 132 generates the FREEZE signal which terminates the strobe signal from control logic 133 to high band latch 134. This preserves both the time slot number present in high band latch 134 which existed at the instant of change and also the level of $V_H$ which existed just prior to the change. This data bit is inverted by inverter 135 during the next succeeding time frame, i.e., the hold time frame, and is placed on data bus 136 as bit D16. Once set, change detector 132 is not reset until the end of the hold time frame, which is the first complete 1.953 µsec. time frame to occur following the time frame during which the change occurred.

During the entire hold time frame, the output of high band latch 134 is stable and specifies the time slot number which existed at the time of the change as well as the level of $V_H$ prior to the change. Thus, the time slot number written into output memory unit 104 during a hold time frame will accurately reflect the time at which the change occurred, within the limit of resolution provided by a time slot. Also, during a hole time frame the data bit output from high band latch 134 is inverted by inverter 135 in response to the HOLD HI control signal so that the time encoded word on bus 136 specifies the state which existed just following the change. At the end of the hold time frame, change detector 132 is reset by the signal RESET HI generated by control logic unit 133, which allows the latch 134 to again be updated for each 30.5 nanosecond time slot until the next change is detected.

To summarize, the time encoder unit 103 defines successive 1.953 µsec. time frames, each of which is subdivided into 64 consecutive 30.5 nanosecond time slots. During each time frame, control logic unit 109 generates one WOH and one WOL instruction, each lasting for a period of sixteen time slots. For each time frame one high band and one low band time encoded byte is generated. For each time frame occurring during a quiescent period, data bit D16 specifies the level of the output of the high or low band comparator and the time slot number defined by data bits D10–D15 is indeterminate. For each time frame during which a change has occurred, the data bit D16 specifies the level prior to the change and the time slot number specified by data bits D10–D15 is also indeterminate at the time during which the contents of latch 134 are read out on bus 136. During the next time frame (i.e., the hold time frame), however, data bit D16 specifies the corresponding comparator output level following the change and the time slot during which the change occurred.

In selecting the period of the time encoder time frame and the period of the time slots, the following criteria apply. The highest frequency of interest which the high band filter 34 provides is 106 kHz, which has a half period of 4.717 µsec. In the worst case condition, a transition in the level of $V_H$ occurring at the beginning of one time frame will freeze the high band latch 134 for both the remainder of that time frame and the subsequent hold time frame, a period of 3.906 µsec. After this 3.906 µsec. interval, the latch is reset and enabled to process subsequent transitions. Since the maximum period during which high band latch 134 is disabled (3.906 µsec.) is shorter than the maximum period between transitions (4.717 µsec.), the time encoder unit 103 is capable of accurately processing the highest frequency passed by either band pass filter 34, 37. As noted below, the selection of a time frame period which has a duration less than one fourth of the period of the time compressed equivalent of the highest frequency of interest is dictated by the particular technique of freezing data in the latch for a maximum of two successive time frames. The primary criterion is the use of a time frame period whose duration is less than the period between transitions of interest of the highest frequency to be processed. In the specific embodiment of FIGS. 11–28, the transitions to be detected are dictated by the requirements of the associated digital tone decoders 107$_i$ found in the host system, and comprise the half period transition in the binary signals furnished on terminals 38, 39. Thus, in this embodiment the time frame duration must be less than the half period of the time compressed equivalent of the highest frequency of interest. However, other embodiments are envisioned in which the associated host detector devices are designed to sample only full cycles of the signals of interest. In such embodiments, the time frame must be less than the full period of the time compressed equivalent of the highest frequency of interest in order to satisfy the primary criterion. Similarly, when data is to be frozen in the latch for a maximum of two successive time frames in such embodiments, the time frame must be less than the half period of the time compressed equivalent of the highest frequency of interest.

It should further be noted that in the preferred embodiment the 1.953 µsec. time frame period corresponds to a non-time compressed period of 125 µsec., which is the per channel sample rate for the input data. The preferred embodiment unit 103 thus provides one high band byte and one low band byte for every input data byte entered into the system. However, the number of high and low bands bytes need not be equal to the number of input data bytes entered into the system.

The number of time slots per time frame, and thus the period of each time slot is primarily determined by the desired degree of resolution of the time of a transition in the $V_H$ signal, and is related to the resolution of the digital tone decoders 107. The resolution provided by the time slots in the preferred embodiment is 30.5 nsec corresponding to a time expanded resolution of 1.953 µsec in the 64/1 compression/expansion ratio selected for the unit. Since the resolution capability of the commercially available decoder noted above is 2.235 µsec for high band data, the time encoder of the invention introduces no significant resolution error to the DTMF detection process. For other applications, the number and period value of the time slots may be varied accordingly.

As will be evident to those skilled in the art, the time encoding technique provided by time encoder unit 103 enables highly efficient encoding of the salient information—viz., binary signal level and transition time relative to the time frame span (when a transition occurs)—with fine resolution. In the specific embodiment described supra, for example, level transitions for each band are encoded to a lower resolution of 30.5 nsec using a seven bit digital character for each 1.953 μsec time frame period. A total of 128 such digital characters are stored for each time compressed 16 msec equivalent channel segment processed by the hybrid processor, thus requiring a digital storage capacity of only 896 bits of information for each band of a given channel. For a 16 information channel system each having high band and low band information, the total required digital storage capacity is 29,672 bits of information. In contrast, in the FIG. 4 embodiment described supra, a total of 8,192 bits of information must be stored for each band of a given channel to provide the same resolution, and the total required digital storage capacity for a 16 channel system with high band and low band information is 262,144 bits of information. Thus, the time encoder technique affords a substantial reduction in storage with no sacrifice in resolution of the salient information.

It should be noted that the technique of freezing the time encoder latch contents for the remainder of the time frame in which a transition occurred and the succeeding hold time frame is primarily chosen to reduce the complexity of the time encoder circuitry and the number of components. If desired, an arrangement may be employed in which the latch contents are stored in an auxiliary buffer register at the end of the time frame in which a transition occurs, so that the latch is free to detect a transition at the beginning of the next succeeding time frame. In such an arrangement, the period of the time frame should be selected to be shorter than the minimum half period of the time compressed equivalent of the highest frequency of interest to be accurately processed.

Output Memory Unit 104

Output memory unit 104 is illustrated in FIG. 16 and is similar in design philosophy and structure to input memory unit 101. As seen in FIG. 16, output memory unit 104 comprises four memory modules 141-144, each comprising two 4 K static MOS RAMS operated in parallel to form a 1024 byte by eight bit memory array, with each module being selected by an appropriate select signal $\overline{CS0}$-$\overline{CS3}$ generated by control logic unit 109 and individual addresses being specified by bits A0-A9 on address bus 111. Data input to each memory module 141-144 is provided by data bus 136 from time encoder unit 103, with data bus 136 being coupled to the data input/output ports of the memory modules 141-144 in parallel fashion. In addition, data is written into the memory modules 141-144 in response to the $\overline{CS0}$-$\overline{CS3}$ and $\overline{WOP}$ control signal (WOC) from the control logic unit 109, the $\overline{WOP}$ signal being active during a WOH or WOL instruction cycle and causing storage of a high band byte and a low band byte at the rate of 512 KHz.

In operation, during a WOH or WOL instruction cycle, data is placed on data bus 136 from high band latch 134, or low band latch 134', and inverter 135. After selection of the appropriate memory location in one of the modules 141-144 via the ten bit address bus A0-A9, the concurrent pulsing of the $\overline{WOP}$ signal and the appropriate chip select line $\overline{CS0}$-$\overline{CS3}$, causes the time encoded data word to be written into the appropriate output memory module 141-144.

Data is read from memory modules 141-144 during read output instruction cycles (RO), specified by control logic unit 109, during which a desired memory address is established on address bus 111 and the appropriate chip select control signal $\overline{CS0}$-$\overline{CS3}$ is driven low. This enables the output of the selected one of the four memory modules 141-144, which are preferably tri-state outputs, thereby placing data onto the output memory data bus 136 for decoding by the time decoder unit 105 described below.

It should be noted that the chip select signals $\overline{CS0}$-$\overline{CS3}$ are shared by both input memory unit 101 and output memory unit 104 and thus that both units will be enabled during both a read input and a read output system cycle. However, since the data bus 136 associated to output memory unit 104 (D10-D16) is isolated from the data bus 121 (D0-D7) associated to the input memory unit 101, and since the read input and read output system cycles are mutually exclusive, no data bus conflicts or address ambiguities are created by the sharing of chip select signals $\overline{CS0}$-$\overline{CS3}$.

Time Decoder Unit 105

Figure 17:
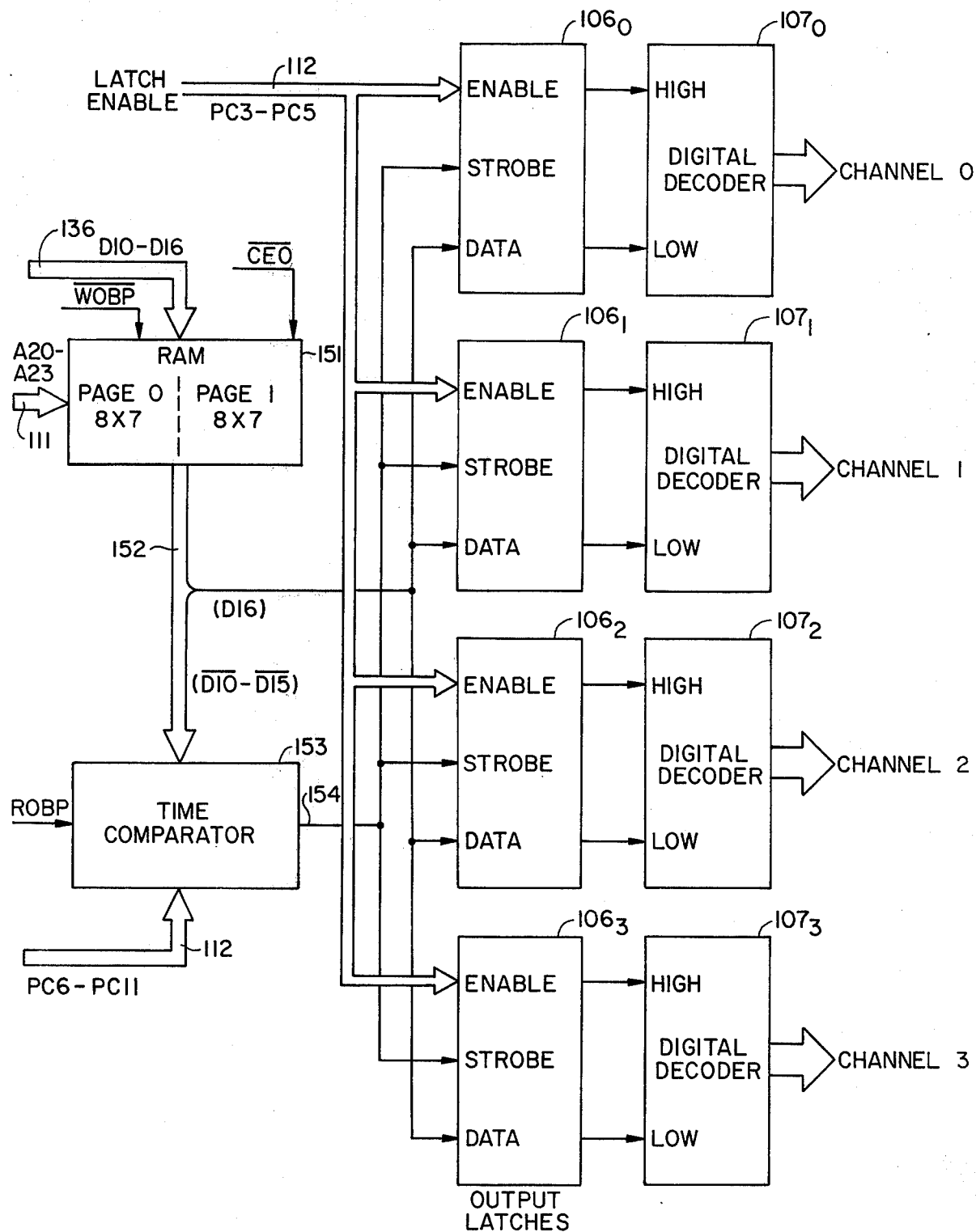
FIG. 17 is a block diagram illustrating the time decoder unit, output latches, and dual frequency decoders.

FIG. 17 illustrates one module of time decoder unit 105 used to decode the time frame encoded high and low bytes present on data bus 136 and to control the states of the output latch pairs $106_0$-$106_3$ corresponding to four of the information channels of the host CBX. Like input memory unit 101 and output memory unit 104, time decoder unit 105 is modular in concept and may be readily expanded to sixteen channels or more. Accordingly, since the operation of each module is identical, and for clarity, only one four channel module is described herein.

As seen in FIG. 17, the time decoder unit module includes a random access memory module 151 which preferably comprises a pair of random access memories operated in parallel to create a sixteen by eight bit memory, with only seven bits (D10-D16) of every byte actively used. Memory module 151 is partitioned into two eight byte by seven bit pages by means of control signal $\overline{WOBP}$, and individual bytes are addressed by signals A20-A23 on address bus 111, all supplied from control logic unit 109. Each page of memory module 151 is written with one high band/low band byte pair of time encoded data for each of the four channels served by this module at an 8 KHz per channel rate (i.e., each successive byte pair from a given channel is written at a 8 KHz rate), each page being written once every other time decoder time frame (i.e., once every 250 μsec.). In addition, memory module 151 is enabled by a separate chip enable signal $\overline{CE0}$ supplied from control logic unit 109. The time encoded high band data bytes on data bus 136 are written into memory module 151 during the occurrence of the ROH control signal described below, while the low band data bytes are written during the ROL control signal, also described below. High band and low band data bytes are first written into channel locations 0–3 of page zero, after which high band and low band data bytes are written into channel locations 0–3 of page one. The writing of alternate pages is continuously repeated, and the remaining three memory modules (not illustrated) corresponding to channels 4-15 are operated in a similar fashion, using independent chip enable signals $\overline{CE1}$-$\overline{CE3}$ supplied by control logic unit 109 and address signals A20-A23 on commonly shared address bus 111.

While one page of the memory module 151 is being written from the output memory unit 104, the time encoded data words stored in the other page are processed by a time comparator 153 to which the memory module 151 is coupled by a data bus 152. As suggested by FIG. 28, time comparator 153 preferably comprises seven exclusive-OR gates $282_i$, with six gates $282_1$-$282_6$ having as one input the inverse of one of the data bits (D10-D15) on bus 152 and as the remaining input one of the control lines PC6-PC11 from control bus 112. The seventh gate $282_7$, has one grounded input terminal and a terminal to which the $\overline{ROBP}$ control signal is coupled from control unit 109. The $\overline{ROBP}$ control signal is used to strobe the output lead 154 coupled to the latches $106_i$. The operation of comparator 153 is such that the logic level on the output conductor 154 transitions in the appropriate direction to strobe the paired latches $106_0$-$106_3$ whenever the six bit digital characters present on bus 152, which are the inverse of bits D10-D15, indicate that bits $\overline{D10}$-$\overline{D15}$ match the six bit characters on control bus 112 and the $\overline{ROBP}$ signal is active.

In operation, each time encoded data byte supplied to memory module 151 and stored in one page thereof corresponds to one of the time frames defined by the time encoder unit 103. A new set of high band and low band data bytes from all four channels serviced by the modules shown in FIG. 17 is written into the memory module 151 every 125 μsec. Since each data byte corresponds to one time encoder time frame, memory module 151 is written and subsequently processed by time comparator 153 time frame by time frame.

As noted above, time encoder unit 103 divides the 1.953 μsec. duration time frame defined thereby into 64 consecutive 30.5 nanosecond time slots by decoding the six PC0-PC5 control bus bits from control logic unit 109. In a similar manner, time decoder unit 105 divides each 125 μsec. time frame page processing period into 64 consecutive 1.953 μsec. duration time slots by decoding the six PC6-PC11 bits on control bus 112 supplied from control logic unit 109. Since each time decoder unit 105 time frame and time slot is a multiple of 64 of each time encoder unit 103 time frame and time slot, the time compression created by the input memory unit 101/time encoder unit 103 operation is exactly compensated for or balanced by the time expansion created by the output memory unit 104/time decoder unit 105 operation.

More specifically, time comparator 153 divides each 125 μsec. page processing period into the 64 contiguous 1.953 μsec. time slots noted above. During each time decoder time slot, the time encoded data bytes stored in all eight memory locations of the given page are read out and input to time comparator 153. Simultaneously, the six bit control signals PC6-PC11 present on control bus 112 define successive time slot numbers for the time decoder unit 105. During each time decoder time slot, each of which is 1.953 μsec. in duration, all eight locations of the memory page being processed are addressed and read out, i.e., each high band and low band data byte for each of the four information channels processed by time comparator 153 is compared with the time decoder time slot number.

Concurrent with the sequential addressing and reading out of the high band and low band data bytes from memory module 151, strobe inputs of the dual latches $106_0$-$106_3$ are sequentially enabled by the control signals PC3-PC5 supplied from control logic unit 109 via control bus 112. Whenever a time comparison occurs between the time slot number from memory module 151 and the output decoder unit time slot number defined by PC6-PC11, time comparator 153 generates a strobe pulse on line 154. At this time, only the output latch $106_i$ which corresponds to the memory location being read out is enabled, and thus the strobe pulse generated on line 154 only affects the appropriate one of the paired data latches $106_i$. Accordingly, upon occurrence of a time comparison, the resulting strobe pulse latches the data bit present on conductor D16 of data bus 152 from memory module 151 into the appropriate data latch $106_i$. Since every memory location in memory module 151 contains a time encoded data byte which must produce a time comparison during one of the time slots of the time decoder unit 105, every output latch $106_i$ is updated with new data once during each 125 μsec. time processing period.

As noted above, those time encoded data words generated by the time encoder unit 103 during quiescent periods contain an indeterminate or invalid time slot number and a data bit D16 which accurately reflects the level of the respective comparator output signal $V_H$, $V_L$ during the quiescent period. When such words are processed by time comparator 153, the invalid time slot number contained within that word will match an output decoder unit time slot number at some indeterminate time during that frame processing period. When the comparison occurs, the appropriate one of the paired latches $106_i$ will be updated to the state of the data bit being read out of the memory module 151. Since by definition this data bit was not the result of a change (the bit was generated during a quiescent period) the time at which the time comparison occurs is of no consequence. In this manner, the output latch $106_i$ merely retains the corresponding $V_H$ or $V_L$ signal level for quiescent periods.

As further noted above, time encoder unit 103 also considers the time frame during which a change occurred in the level of the corresponding signal $V_H$, $V_L$ to be part of the quiescent period. Correspondingly, the time slot number portion of the corresponding data word is similarly invalid and the data bit reflects the signal level prior to the change. Since the level signified by the stored data bit is the same as that stored for the previous time frame, updating of the corresponding data latch $106_i$ does not change the output state of the latch. Accordingly, since the latch output state does not change, the instant at which time comparison is made is of no consequence.

The only time encoded data bytes corresponding to a time frame when a change in the signal level occurred are those occurring during the time encoder unit's "hold time" frame, which occurs immediately after the time frame during which the change actually occurred. Further, as described above, such bytes include time slot number portions which are valid. During the time frame processing period in the time decoder unit 105 corresponding to the hold time frame of the time encoder unit 103, the time comparison occurs during the time slot which existed when the time encoder unit 103 actually detected a change in the $V_H$ or $V_L$ signal level. When such a time comparison occurs, the corresponding output latch $106_i$ is updated to the signal level following the change of state. Since this updating only occurs during the proper time slot, each output latch 106$_i$ provides an exact time expanded replica of the level of $V_H$ and $V_L$ to a lower limit of accuracy of one time decoder time slot (i.e., 1.953 μsec.).

As further noted above, the duration of the time encoder unit 103 time frame is chosen to be sufficiently short that changes in the level of the $V_H$, $V_L$ signals cannot occur during two consecutive time frames, i.e., no change can occur during the hold time frame. Accordingly, the time frame following the hold time frame will always contain an invalid time slot number and a valid indication of the state of the corresponding comparator output. Since the state of the corresponding output latch 106$_i$ is never altered during this time frame, the invalid time slot number is of no consequence.

To summarize, each output latch 106$_i$ is updated at the rate of 512 KHz, i.e., once during every 125 μsec. time decoder time frame processing period. Due to the symmetry of the time encoder unit 103 and the time decoder unit 105, the high band and low band latch outputs for each channel comprise a time corrected replica of the high band and low band comparator outputs during the readout period for a given channel. Thus, the data output by each high band latch and identical to that provided by the comparators of conventional decoders, which permits commercially available DTMF decoders to be driven directly from the output latches 106$_i$ of the invention.

Control Logic Unit 109

Figure 18:
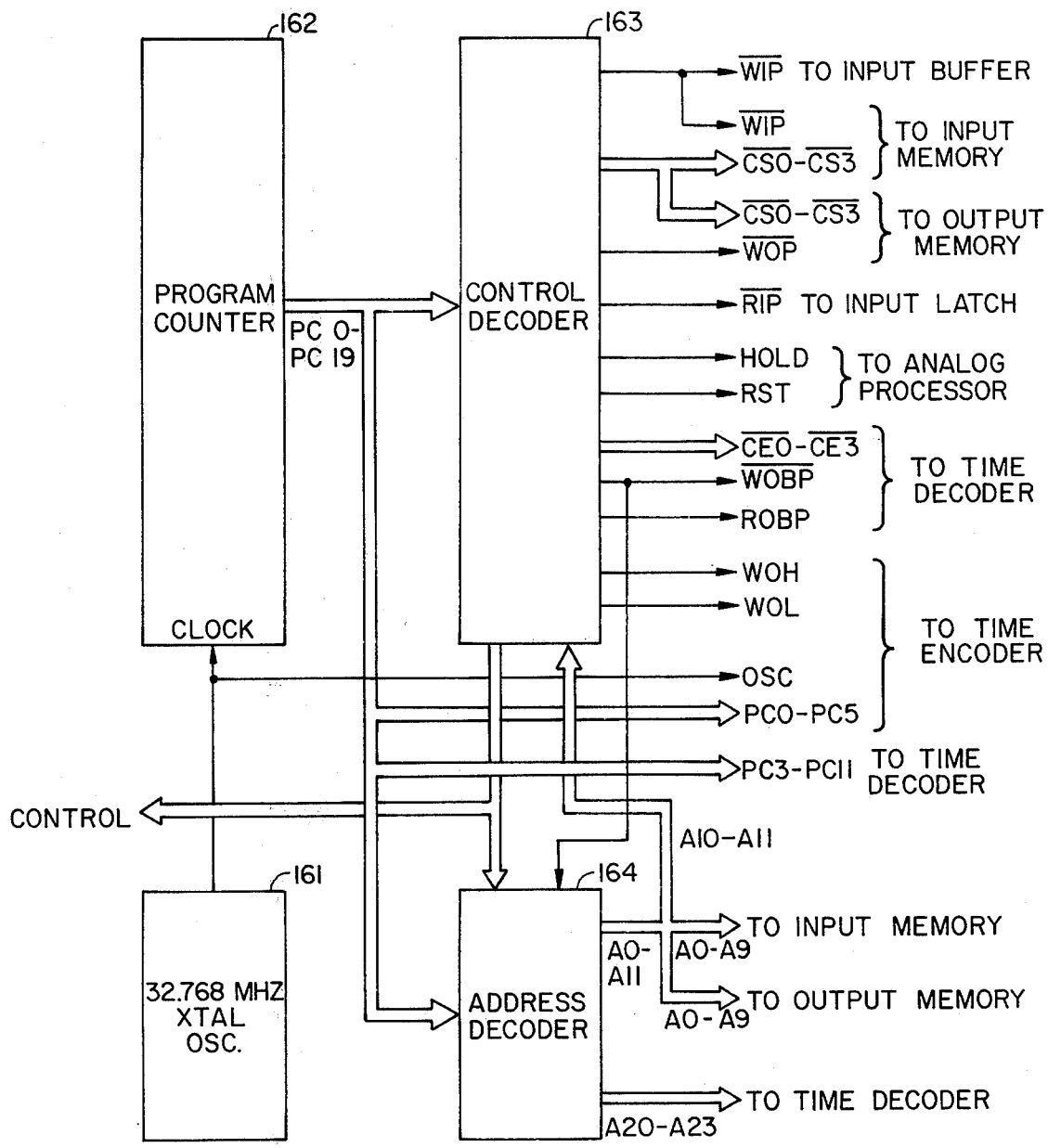
FIG. 18 is a block diagram of the control logic unit.

Control logic unit 109 is shown in FIG. 18 and includes a master oscillator 161, preferably a crystal oscillator having a fundamental frequency of 32.768 MHz. in the specific embodiment described herein, which is coupled to the clock input of a program counter 162. Program counter 162 comprises a twenty bit binary program having 1,048,576 unique states with a cycle time of 32 msec., and preferably comprises a six bit high speed synchronous counter (PC0–PC5) followed by a fourteen bit ripple counter (PC6–PC19).

As noted above, the six PC0–PC5 bits from the program counter are used to provide time slot reference numbers for time encoder unit 103, while the nine PC3–PC11 bits are used to define the time slots for the time decoder unit 105 and to enable the output latches 106$_i$ in a predetermined sequential fashion. Program counter bits PC0–PC11, PC13 and PC14 are decoded in a control decoder unit 163 to generate the control signals shown in FIG. 18 and discussed above which are used to control the operation of the system. An address decoder 164 converts the seventeen PC3–PC19 bits from program counter 162 into the sixteen address lines A0–A11, A20–A23 used for memory addressing under control of the five control signals noted below generated by control decoder 163.

Figure 19:
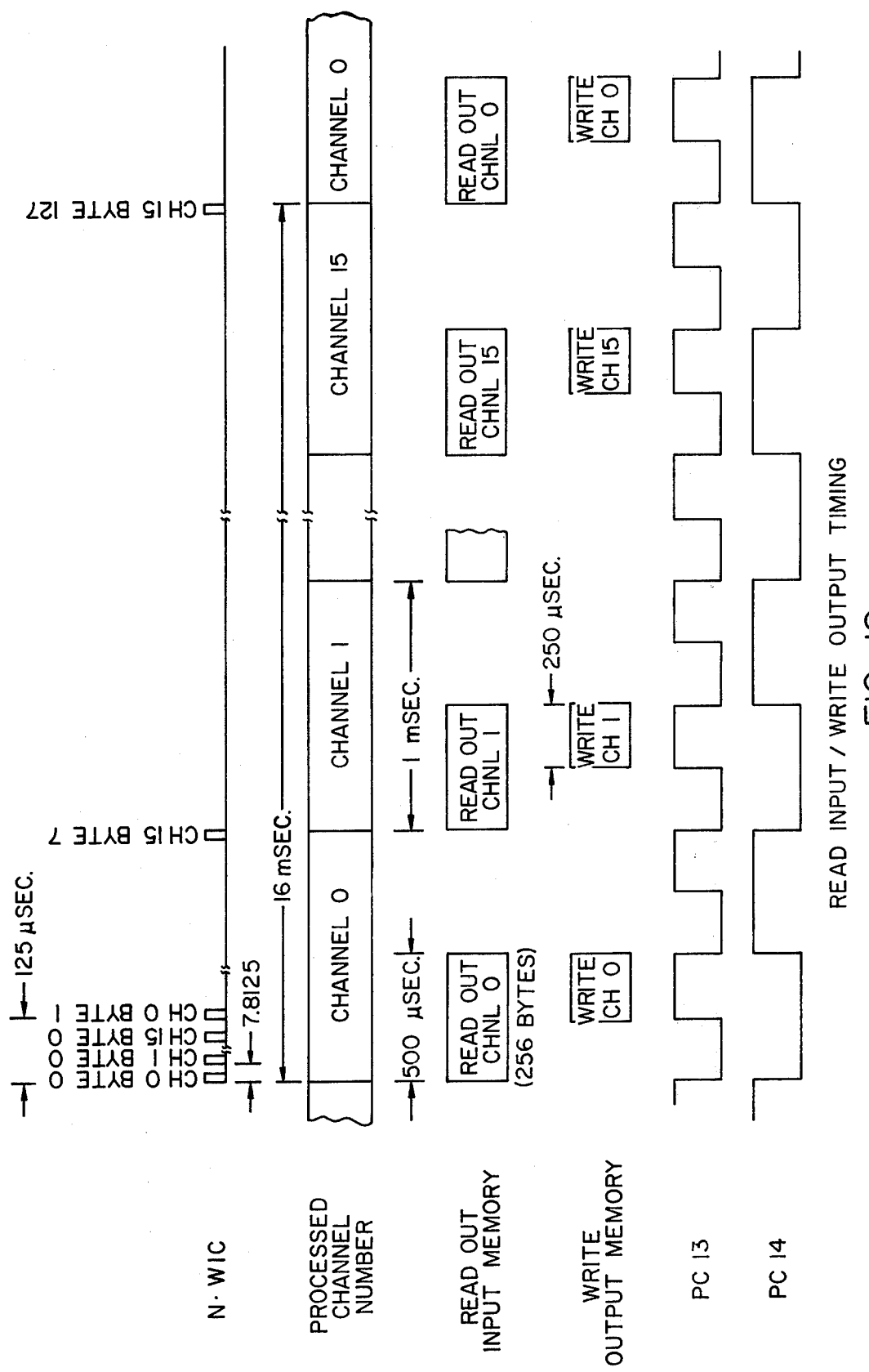
FIGS. 19-21 are timing diagrams illustrating operation of the FIG. 11 embodiment.

FIG. 19 is a timing diagram showing the read sequence for input memory unit 101 and the subsequent write sequence for output memory unit 104. As shown in this Fig., 256 bytes of input digital data from information channel zero, which is the equivalent of 32 msec. of information, are time compressed by a factor to 64 to 1 and read from input memory unit 101 in 500 μsec. Following the readout of information channel zero, a 500 μsec. "pause" period ensues during which no data is read from input memory unit 101. After the 500 μsec. pause, the data from information channel one is read out from input memory unit 101, a subsequent pause occurs, and the readout/pulse sequence is repeated for all sixteen channels.

Since the combined time of the readout and pause periods is one msec., and sixteen channels are consecutively read out, each channel is read once every 16 msec. Since each 256 byte readout represents 32 msec. of input digital information, a 50% overlap occurs in the data contained in consecutive readouts from a given channel with only the latter half of each readout containing new or fresh data. Time encoder unit 103 is initialized with old data contained in the first half of each readout, which serves to also initialize the hybrid processor unit 102 components, but only writes time encoded data into output memory unit 104 during the second half of each readout. Specifically, this allows time for transients generated by band pass filters 34, 37 in hybrid processor unit 102 at the beginning of each readout period to decay, and enables time encoder unit 103 to be properly initialized.

It should be noted that the 50% overlap of consecutive readouts in combination with the intrachannel 500 μsec. pause necessitates a 64 to 1 time compression ratio when processing sixteen channels, due to the resulting overall data processing efficiency of 25%. Thus, it is understood that the time compression ratio may vary according to the number of information channels and the percentage overlap chosen in the design of any given system.

As suggested by FIG. 19, there are three macrocycles employed in the invention: A first macrocycle occurring during each intrachannel 500 μsec. pause; a second macrocycle occurring during the first half of the readout of every channel when data is being read from input memory unit 101; and a third macrocycle occurring during the second half of the readout period of a given channel. Each macrocycle is defined by control decoder 163 from bits PC13 and PC14.

Figure 21:
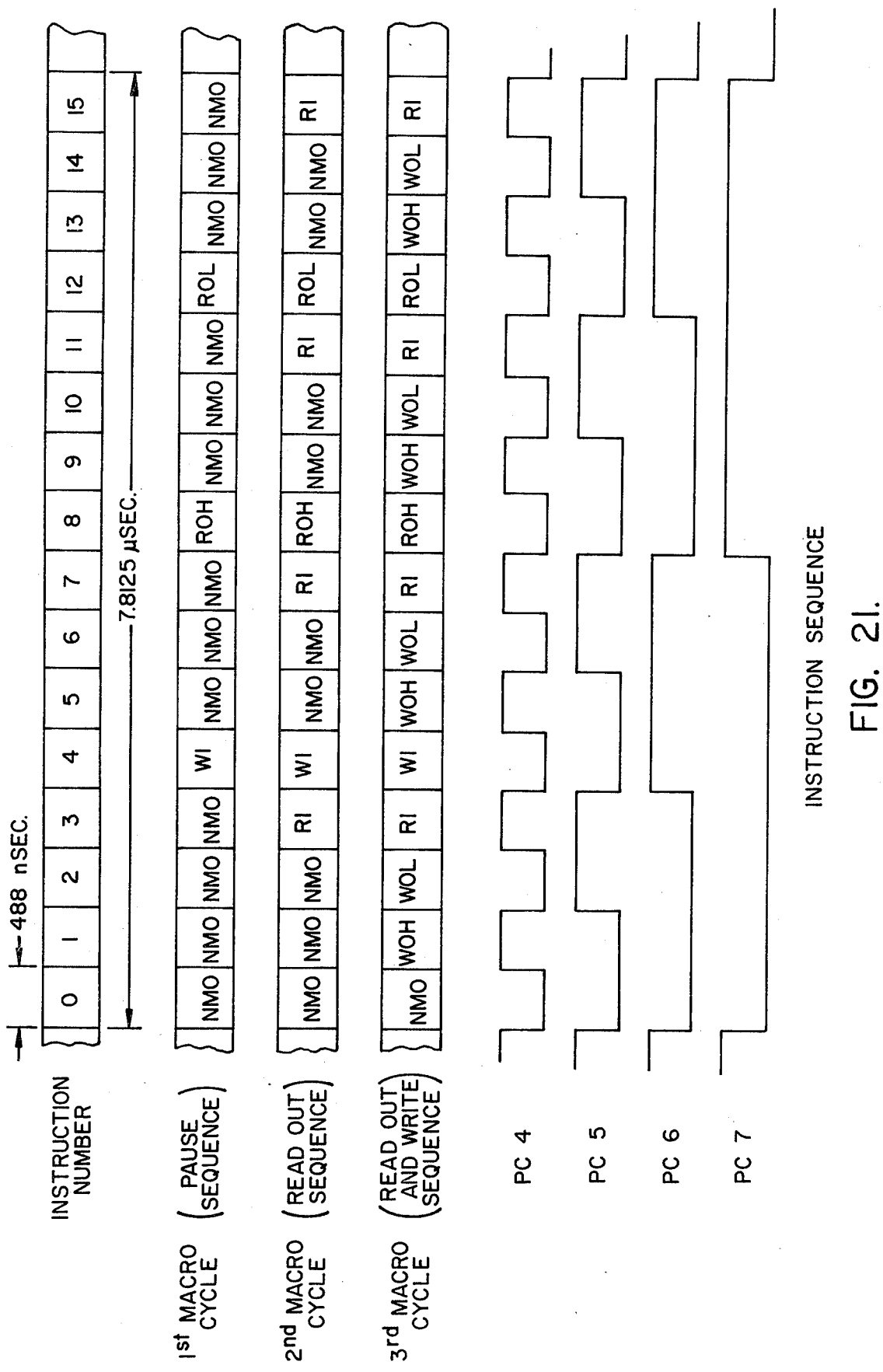

As seen in FIG. 21, during each macrocycle the sequence of sixteen memory related instructions is repetitively executed by the control logic unit 109. The instruction sequences are established by control logic unit 109 which decodes the four PC4–PC7 bits from program counter 162 to create sixteen contiguous 484 nanosecond time periods. One memory related instruction is executed during each such time period, with a different sequence of instructions being used by each of the three different macrocycles depicted in FIG. 21. The mnemonic descriptor, instruction and operation are as follows:

| Mnemonic | Instruction | Operation |
|---|---|---|
| NMO | No Memory Operation | Data is neither written into nor read out of either memory. |
| WI | Write Input | Data is written into the input memory 101$_2$ from the input buffer 101$_1$. |
| RI | Read Input | Data is read from the input memory 101$_2$ and strobed into the input latch 126. |
| WOH | Write Output High | Time encoded high band data is written into the output memory unit 104 from the time encoder unit 103. |
| WOL | Write Output Low | Time encoded low band data is written into the output memory unit 104 from the time encoder unit 103. |
| ROH | Read Output High | Time encoded high band data is read from the output memory unit 104 and transferred |

| Mnemonic | Instruction | Operation |
|---|---|---|
| | | to the time decoder unit 105. |
| ROL | Read Output Low | Time encoded low band data is read from the output memory unit 104 and transferred to the time decoder unit 105. |

The read/write operations for input memory $101_2$ are controlled by write input signal $\overline{WIP}$ and the four chip select signals $\overline{CS0}$-$\overline{CS3}$. Similarly, the read/write operations for output memory unit 104 are controlled by write output signal $\overline{WOP}$ and the same four chip select signals $\overline{CS0}$-$\overline{CS3}$. The read/write operation of the memory module 151 and the corresponding additional memory modules used to control the remaining ones of the sixteen channels (not illustrated) are read (ROBP), write ($\overline{WOBP}$) and four chip enable signals $\overline{CE0}$-$\overline{CE3}$. The chip select signals $\overline{CS0}$-$\overline{CS3}$ are generated by control decoder 163 from the two most significant bits A10, A11 from address decoder 164 while the chip enable signals $\overline{CE0}$-$\overline{CE3}$ are generated by control decoder 163 from the PC10, PC11 program counter bits. All further memory addressing is performed via the remaining fourteen A0-A9 and A20-A23 address lines generated by address decoder 164.

The seventeen PC3-PC19 bits from program counter 162 are utilized by address decoder 164 to create two separate address buses, heretofore commonly designated as address bus 111. The first address bus contains the twelve A0-A11 lines and is used to address input memory unit 101 and output memory unit 104; the second address bus contains the four A20-A23 lines and is used for addressing the time decoder unit 105 memory modules. In actuality, the twelve bit memory bus used to address input memory unit 101 and output memory unit 104 is subdivided into two separate buses: One containing the two most significant bits A10, A11 and used for module selection by control decoder 163; a second containing the remaining ten A0-A9 bits and used directly by the input and output memory units 101, 104.

Address decoder 164 employs the four different memory addressing algorithms shown in FIG. 22 for converting the program counter 162 count into the twelve bit input/output memory unit addresses. The specific algorithm employed by the decoder for memory addressing depends upon the type of instruction which is being executed by control decoder 163. These instructions are coupled from control decoder 163 to address decoder 164 via five separate lines and consist of a write input (WI), read input (RI), write output (WO), read output (RO), and $\overline{WOBP}$ control signal. The WI and RI instructions are identical to those shown in FIG. 21; WO occurs during WOH or WOL instructions, and RO occurs during ROH or ROL instructions.

The second address bus consisting of the four address bits A20-A23 controls the addressing of the time decoder unit 105 memory modules, e.g., memory module 151. Address decoder 164 employs the two separate algorithms shown in FIG. 23 for converting the program counter 162 count supplied to address decoder 164 into the proper address for the time decoder unit 105 memory modules. The algorithm selected depends upon whether data is to be written into a selected memory module, which occurs during readout of output memory unit 104, or whether data is being read from a selected memory module. Choice of the proper algorithm is determined by the state of the write output buffer WOBP control signal generated by control decoder 163.

Alternate DTMF Processor Embodiments

Figure 29:
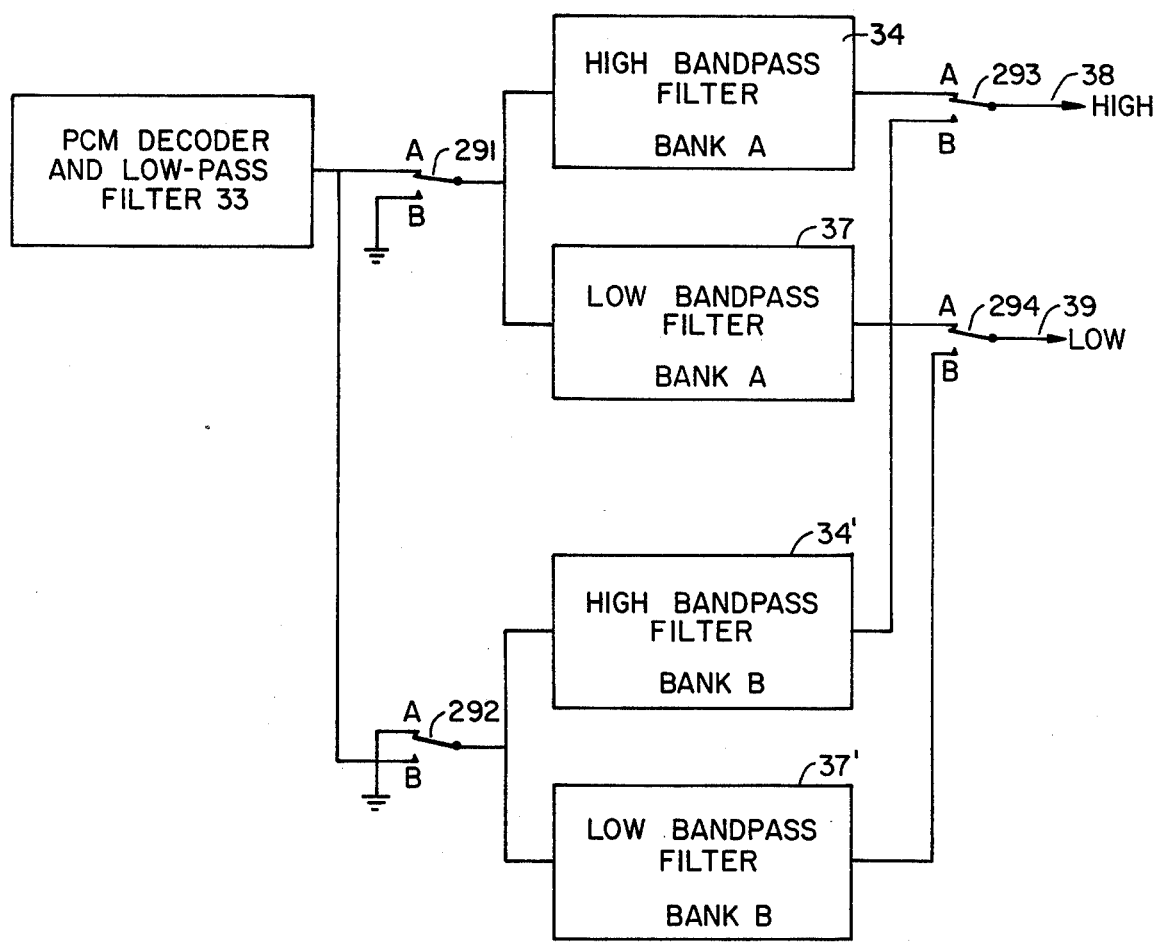
FIG. 29 is a block diagram of a portion of the analog processor unit of an alternate DTMF processor having a doubled capacity.

FIG. 29 illustrates a portion of the analog processor section of a DTMF processor having double the capacity of the unit described above with reference to FIGS. 11-28. As seen in FIG. 29, a second set of band pass filters 34', 37' is included in the analog processor section, together with a plurality of switches 291-294 schematically illustrated as single pole double throw switches having alternate positions A and B.

To process information channels 0-15, switches 291-294 initially are placed in the A position, in which the input to filter bank B comprising band pass filters 34', 37', is grounded while the analog input signals from the low pass filter 33 of the analog processor unit 102 are coupled through bank A comprising band pass filters 34, 37 and coupled via conductors 38, 39 to the time encoder unit 103 which processes the signals applied thereto in the manner described above.

During each 500 $\mu$sec. pause period between successive read out periods of channels 0-15 (see FIG. 19), switches 291-294 are placed in the alternate B position in which the filter bank A input terminal is grounded, and the analog signals supplied by low pass filter 33 are coupled through bank B, the outputs of which are coupled via conductors 38, 39 to time encoder unit 103 for further processing. Thus, the processing of information channels 16-31 is identical to that provided for information channels 0-15, with the exception that the readout and pause periods are reversed.

During each pause between readout of a group A channel (i.e., channels 0-15), a group B channel (i.e., channels 16-31) is read out. Since switches 291-294 are in position B during group B readouts, the signals from channels 16-31 are received by the band pass filters 34', 37' in filter bank B and are output to time encoder 103. The time encoder 103 and follow on circuitry process each readout in the manner described above, updating the output latches $106_i$ in the group B decoder modules as required.

During each group B pause, the switches 291-294 are in position A thereby grounding the input to filter bank B. The readout period for group A becomes the pause period for group B, allowing signals to decay in the bank B band pass filters 34', 37' to prevent inter-channel interference.

Figure 30:
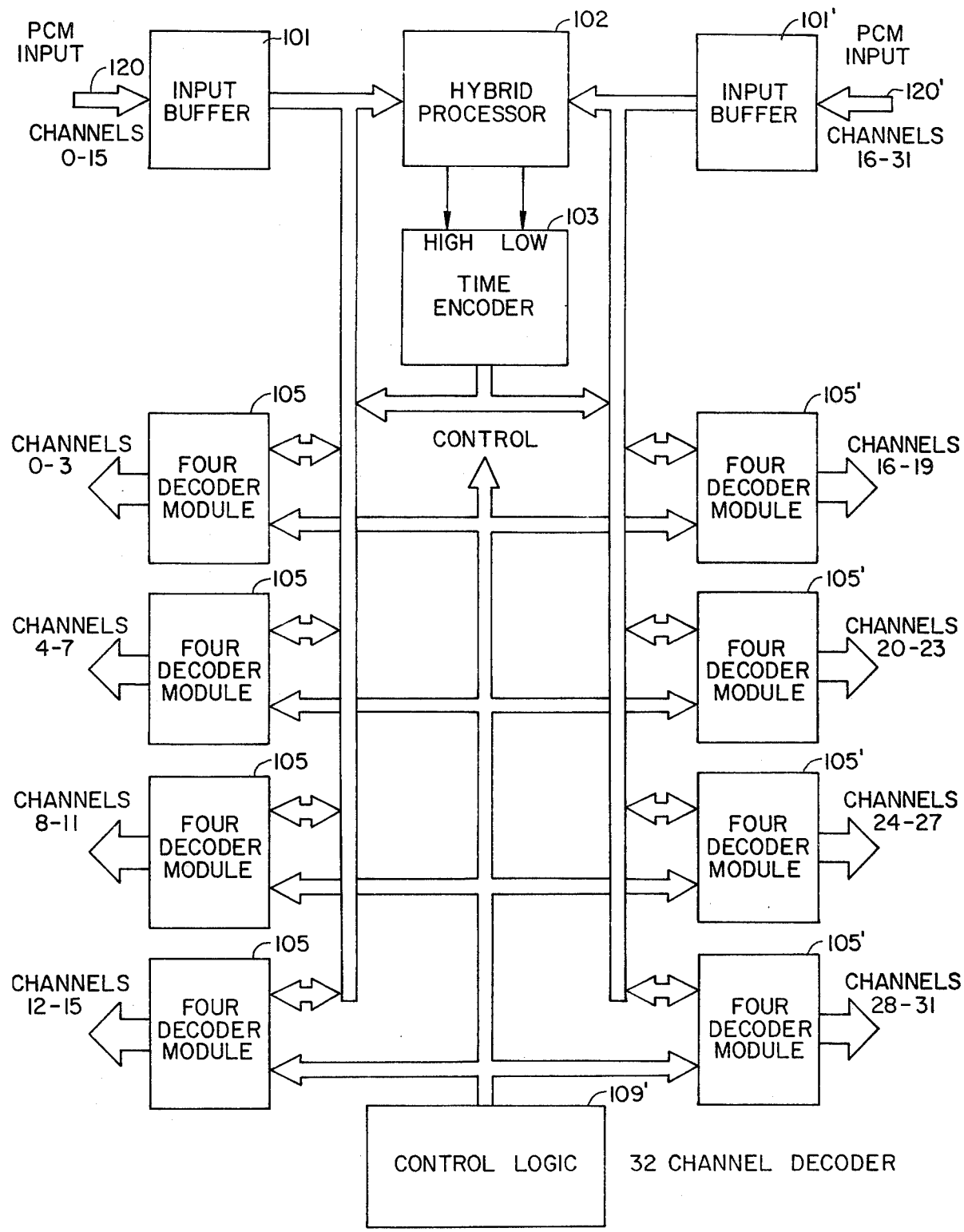
FIG. 30 is a system block diagram of the doubled capacity DTMF processor.

Control logic unit 109 is designed to accomodate the expansion from 16 to 32 channels described above since, during every pause period for channels 0-15, the control logic unit 109 generates all of the address and control signals required to read out and process channels 16-31. Further, control logic unit 109 is also designed to allow groups of decoder modules 105 to share the same address and control buses 111, 112, while separate data buses are used to prevent bus conflicts during data transfer (see FIG. 30). In order to accomodate an expansion to 32 channels, the capacity of interface unit 100 can be doubled, or two 16-channel interface units can simply be operated in parallel.

Signal processing systems fabricated in accordance with the teachings of the invention enjoy several distinct advantages over prior art systems used to provide analog processing for multi-channel digital information signals, particularly time division multiplexed signals.

For example, by compressing the multi-channel stream of digital input information, high quality signal processing in the analog domain can be applied to the information in each particular channel, using commercially available precision circuitry designed to perform the desired analog signal processing with high reliability. Thus, high quality DTMF processing, code conversion to more efficient coding schemes and other desirable signal processing techniques can be carried out on the input digital information using relatively expensive components, but at a fraction of the cost hitherto necessary to provide analog signal processing elements for each channel of information or for groups of channels. Moreover, either single or multiple different predetermined analog processing techniques may be incorporated into the hybrid processor. Further, by the proper use of complementary time compression and time expansion ratios, products incorporating the continuous processing embodiment of the invention are completely transparent to the communication system with which they may be employed. In packet burst embodiments of the invention, the clock rate for the downstream portions of the host system can be simply altered to accomodate the invention. As a result, no modification of the communication system per se is required, and the product incorporating the invention may be simply inserted between appropriate data ports in the host system. Moreover, the invention is modular in concept so that a particular application may be readily addressed using the modular "building block" approach. Particularly advantageous is the fact that the products incorporating the invention are memory intensive: i.e., specific application products may be fabricated using digital memory devices which have traditionally decreased in unit price.

DTMF processor systems fabricated in accordance with the teachings of the invention enjoy several advantages over the known prior art DTMF processors noted above. Due to the fact that only a single analog processing unit is required for this system, a correspondingly high quality digital to analog converter 30, sample and hold circuit 32, low pass filter 33 and band pass filters 34, 37 may be employed to provide extremely high quality signal processing with high reliability. In addition, the system may be modified to process digital input signals encoded in accordance with a different encoding scheme by simply changing the digital to analog converter 30, typically a commercially available circuit contained in a single IC package. Further, the system operates either synchronously or asynchronously with respect to the host CBX, the latter feature eliminating costly interface circuitry and permitting direct application of the digital input signals to the input memory via the interface buffer. Moreover, the system only requires a single circuit (digital gain control 31) for setting the proper signal level ranges for all of the information channel digital signals which enables a system to be quickly set up in a reliable manner. The system further eliminates the need for individual multiple analog processing elements operating directly on the digital input data in the corresponding multiplicity of information channels, and is tolerant of occasional invalid input data samples. Moreover, the system is completely modular with respect to the input memory unit 101, the output memory unit 104, and the time decoder unit 105, which permits various system configurations to be quickly devised without the necessity of extensive system redesign. Also, the system is completely compatible with commercially available low cost DTMF and FSK digital tone decoders. In addition, the time encoder and decoder method and apparatus enables reliable processing of DTMF or FSK signals in a manner which requires storage in the output memory unit of a substantially smaller amount of information for each segment of channel information in order to reliably detect the salient information with the same or finer resolution than that afforded by known devices.

Further, the analog processor unit of the invention provides extremely reliable high quality analog signal processing, particularly with respect to the variable thresh-hold reference employed in the high band and low band comparators, the squelch feature and the associated time constants permitted by synchronous detection.

While the above provides a full and complete disclosure of the preferred embodiment of the invention, various modifications, alternate constructions and equivalents may be employed without departing from the true spirit and scope of the invention. Therefore, the above description and illustrations should not be construed as limiting scope of the invention, which is defined by the appended claims.

What is claimed is:

1. A method of processing multiple channel digital information signals encoded in a first format, said method comprising the steps of:
    (a) storing said digital signals in their order of appearance in an input memory device at a first per channel rate;
    (b) reading successive groups of said digital signals from said input memory device at a second rate substantially greater than said first rate to effect time compression of said digital signals, each group containing digital signals from a single one of said channels and representing the time compressed equivalent of at least one time packet $P_i$ of information of predetermined temporal length, successive time packets $P_i$ being devoid of overlapping information;
    (c) converting each of said single channel groups of digital signals to an equivalent analog signal segment of equivalent temporal length to said at least one time packet $P_i$;
    (d) applying at least one predetermined analog processing technique to each of said analog signal segments;
    (e) converting each of said analog signal segments after said analog processing to a group of resulting digital signals of equivalent temporal length to said at least one time packet $P_i$;
    (f) storing each said group of resultant digital signals in an output memory device at a third rate; and
    (g) reading said resultant digital signals from said output memory device at a fourth per channel rate;
    said fourth rate enabling the resultant digital signals comprising each channel group to be read out during a time period $P_0$ no greater than the temporal length of said time packet $P_i$;
    the ratio of said second rate to said first rate being equal to the ratio of said third rate to said fourth rate multiplied by $P_i/P_0$ to effect a time expansion which compensates for said time compression.

2. The method of claim 1 wherein said analog processing technique includes the step of (i) passing each of said analog signal segments through a pair of parallel branch band pass filters to provide a pair of analog signal trains each having frequency components which lie substantially entirely within the pass band of the filter associated thereto.

3. The method of claim 2 wherein said step (e) of converting includes the steps of (ii) generating a pair of binary signal trains each corresponding to a different one of said pair of analog signal trains and each having a period substantially equal to the period of the associated analog signal train, and (iii) transmitting each of said binary signal trains to a separate portion of said output memory device.

4. The method of claim 3 wherein said step (ii) of generating includes the step of individually comparing each of said analog signal trains with a variable reference voltage having a magnitude proportional to the peak value of the respective one of said analog signal trains.

5. The method of claim 3 wherein said step (ii) of generating includes the steps of generating a pair of control signals for preventing transmission of a corresponding one of said pair of binary signal trains when the associated analog signal train has an amplitude lying below a predetermined threshhold, and gating the corresponding one of said pair of binary signal trains with the associated one of said pair of control signals.

6. The method of claim 3 wherein said step (f) includes the step of storing each of said pair of binary signal trains in the respective separate portion of said output memory device at said third rate and wherein step (g) of reading includes the step of reading the stored signal trains from the respective separate portion of said output memory device at said fourth per channel rate.

7. The method of claim 1 further including the step of generating first, second, third and fourth clock signal trains each defining said first, second, third and fourth rates, respectively, the frequency ratio of said second clock signal train to said first clock signal train being equal to the frequency ratio of said third clock signal train to said fourth clock signal train multiplied by $P_i/P_0$.

8. The method of claim 1 wherein each single channel digital signal group read from said input memory device during said step (b) includes at least a portion of a previously read time packet $P_i$ of information from the same information channel.

9. The method of claim 1 wherein said digital information signals are multi-bit digital characters.

10. The method of claim 1 wherein said time period $P_0$ is equal to the temporal length of said time packet $P_i$.

11. The method of claim 1 wherein said step (e) of converting includes the step of encoding each of said analog signal segments in a different digital code format from said first format.

12. The method of claim 11 wherein said first format comprises a multi-bit parallel encodement and said different format comprises a single-bit serial encodement.

13. The method of claim 11 wherein said first format comprises a single-bit encodement and said different format comprises a multi-bit parallel encodement.

14. The method of claim 11 wherein said first format comprises an N-bit parallel encodement and said different format comprises an M-bit parallel encodement, where N and M are both integers.

15. The method of claim 14 wherein $N=M$ and wherein said third rate is different from said second rate.

16. The method of claim 14 wherein $N \neq M$ and wherein said third rate is different from said second rate.

17. The method of claim 14 wherein $N=M$ and wherein said first rate is different from said fourth rate.

18. The method of claim 14 wherein $N \neq M$ and wherein said first rate is different from said fourth rate.

19. The method of claim 14 wherein $N \neq M$ and wherein said second rate equals said third rate.

20. The method of claim 14 wherein $N \neq M$ and wherein said first rate equals said fourth rate.

21. The method of claim 1 wherein $P_0 < P_i$ and further including the steps of:
(h) coupling said resultant digital signals to a plurality of digital detector devices each associated to a different information channel and each requiring an operating clock signal of nominal frequency $f_0$; and
(j) providing a clock signal having a frequency $f_0 \cdot P_i/P_0$ to each said digital detector device.

22. The method of claim 21 wherein said step (h) of coupling includes the step of causing each said digital detector device to be in the state thereof existing at the end of the respective previous period $P_0$ at the beginning of the next succeeding period $P_0$.

23. The method of claim 1 wherein said step (b) of reading includes the step of providing a pause between readout of said successive groups.

24. The method of claim 23 further including the step of initializing the analog circuitry employed in said step (d) of applying during said pause.

25. The method of claim 1 wherein said multiple channel digital information signals are time division multiplexed.

26. A system for processing multiple channel digital information signals encoded in a first format, said system comprising:
an input memory device for storing a plurality of said digital information signals;
first means for storing said digital signals in their order of appearance in said input memory device at a first per channel rate;
first means for reading successive groups of said digital signals from said input memory device at a second rate substantially greater than said first rate to effect time compression of said digital signals, each group containing digital signals from a single one of said channels and representing the time compressed equivalent of at least one time packet $P_i$ of information of predetermined temporal length, successive time packets $P_i$ being devoid of overlapping information;
first means for converting each of said single channel groups of digital signals to an equivalent analog signal segment of equivalent temporal length to said at least one time packet $P_i$;
means for applying at least one predetermined analog processing technique to each of said analog signal segments;
second means for converting each of said analog signal segments after said analog processing to a group of resultant digital signals of equivalent temporal length to said at least one time packet $P_i$;
an output memory device for storing a plurality of said resultant digital signals;
second means for storing each of said groups of resultant digital signals in said output memory device at a third rate; and second means for reading said resultant digital signals from said output memory device at a fourth per channel rate, said fourth rate enabling the resultant digital signals comprising each channel group to be read out during a time period $P_0$ no greater than the temporal length of said time packet $P_i$;

the ratio of said second rate to said first rate being equal to the ratio of said third rate to said fourth rate multiplied by the ratio $P_i/P_0$ to effect a time expansion which compensates for said time compression.

27. The combination of claim 26 wherein said means for applying said at least one analog processing technique includes a pair of parallel branch band pass filters for providing a pair of analog signal trains each having frequency components which lie substantially entirely within the pass band of the filter associated thereto.

28. The combination of claim 27 wherein said first converting means includes means for generating a pair of binary signal trains each corresponding to a different one of said pair of analog signal trains and each having a period substantially equal to the period of the associated analog signal train, and means for coupling each of said binary signal trains to a separate portion of said output memory device.

29. The combination of claim 28 wherein said means for generating a pair of binary signal trains includes means for individually comparing each of said analog signal trains with a variable reference voltage having a magnitude proportional to the peak value of the respective one of said analog signal trains.

30. The combination of claim 28 wherein said means for generating a pair of binary signal trains includes means for generating a pair of control signals for disabling said coupling means when the associated analog signal train has an amplitude lying below a predetermined threshhold, and means for gating the corresponding one of said pair of binary signal trains with the associated one of said pair of control signals.

31. The combination of claim 28 wherein said second storing means includes means for storing each of said pair of binary signal trains in the respective separate portion of said output memory device at said third rate and wherein said second reading means includes means for reading the stored signal trains from said respective separate portions at said fourth per channel rate.

32. The combination of claim 26 further including means for generating first, second, third and fourth clock signal trains each defining said first, second, third and fourth rates, respectively, the frequency ratio of said second clock signal train to said first clock signal train being equal to the frequency ratio of said third clock signal train to said fourth clock signal train multiplied by the ratio $P_i/P_0$.

33. The combination of claim 26 wherein said digital information signals are multi-bit digital characters and said input memory device and said output memory device each comprises a random access memory unit.

34. The combination of claim 26 wherein said first reading means includes means for reading at least a portion of a previously read time packet $P_i$ of information during readout of a single channel signal group.

35. The combination of claim 26 wherein said means for applying a predetermined analog processing technique to said analog signals includes a single digital-to-analog converter.

36. The combination of claim 26 wherein said means for converting said analog signal segments to resultant digital signals includes means for encoding each of said analog signal segments in a different digital code format from said first format.

37. The combination of claim 36 wherein said first format comprises a multi-bit parallel encodement and said different format comprises a single-bit serial encodement.

38. The combination of claim 37 wherein said encoding means includes a continuously variable slope delta modulation circuit means.

39. The combination of claim 36 wherein said first format comprises a single bit encodement and said different format comprises a multi-bit parallel encodement.

40. The combination of claim 36 wherein said first format comprises an N-bit parallel encodement and said different format comprises an M-bit parallel encodement, where N and M are both integers.

41. The combination of claim 40 wherein $N=M$ and wherein said third rate is different from said second rate.

42. The combination of claim 40 wherein $N \neq M$ and wherein said third rate is different from said second rate.

43. The combination of claim 40 wherein $N=M$ and wherein said first rate is different from said fourth rate.

44. The combination of claim 40 wherein $N \neq M$ and wherein said first rate is different from said fourth rate.

45. The combination of claim 40 wherein $N \neq M$ and wherein said second rate equals said third rate.

46. The combination of claim 40 wherein $N \neq M$ and wherein said first rate equals said fourth rate.

47. The combination of claim 26 further including a plurality of digital detector devices each associated to a different channel and each having a clock signal input terminal, data input terminal means adapted to be coupled to said output memory device, and means responsive to the presence of a clock signal train having a nominal frequency $f_0$ at said clock signal input terminal for storing data presented to said data input terminal means; and means coupled to said clock signal input terminal for generating a clock signal train having a frequency $f_0 \cdot P_i/P_0$ when $P_0 < P_i$.

48. The combination of claim 47 further including means for causing each said digital detector device to achieve the state thereof existing at the end of a respective previous period $P_0$ at a time no later than the beginning of the next succeeding period $P_0$.

49. The combination of claim 48 wherein said maintaining means includes gating means coupled to said clock signal train generating means and said clock signal input terminal for terminating application of said clock signal train to said clock signal input terminal between successive periods $P_0$.

50. The combination of claim 26 wherein said system further includes control means for disabling said first reading means for a predetermined period after readout of a single channel group of digital signals to provide a pause between successive channel group readouts.

51. The combination of claim 26 wherein said multiple channel digital information signals are time division multiplexed.

52. A method of encoding a periodic signal having a minimum interval of interest, said method comprising the steps of:

(a) repeatedly generating a plurality of ordered groups of time encoder time slot signals, each time encoder time slot signal defining a successive time encoder time slot having a period substantially less than said minimum interval of interest, said groups defining successive time encoder time frames each having a duration less than said minimum interval of interest;

(b) sensing the level of said periodic signal during at least one of said time encoder time frames;

(c) detecting a level transition in said periodic signal; and (d) storing a signal representative of the level of said periodic signal and the contemporaneous one of said time encoder time slot signals in a storage device when a transition is sensed.

53. The method of claim 52 wherein said step (b) of sensing includes the step (i) of sampling the level of said periodic signal during said at least one time encoder time frame.

54. The method of claim 53 wherein said step (i) of sampling is performed during the appearance of each of said time encoder time slot signals.

55. The method of claim 52 wherein said step (b) of sensing includes the step of sampling the level of said periodic signal during successive time encoder time frames.

56. The method of claim 52 wherein each of said time encoder time slot signals comprises a multi-bit digital character.

57. The method of claim 52 further including the step (e) of terminating said step (d) of storing for the remainder of the corresponding time encoder time frame when a transition is detected.

58. The method of claim 57 wherein said step (a) of generating includes the step (ii) of limiting said time encoder time frame to a duration less than one-half of said minimum interval and wherein said step (e) of terminating is performed for the remainder of said corresponding time encoder time frame and the next succeeding time encoder time frame.

59. The method of claim 52 wherein said minimum interval is the time between adjacent transitions in said periodic signal.

60. The method of claim 52 wherein said minimum interval is the period of at least one cycle of said periodic signal.

61. The method of claim 52 wherein said step (d) of storing includes the step of storing a signal representative of the level of said periodic signal prior to said transition.

62. The method of claim 52 wherein said step (d) of storing includes the step of storing a signal representative of the level of said periodic signal after said transition.

63. The method of claim 52 wherein said periodic signal comprises a time compressed representation of a real time periodic signal, and wherein said minimum interval is the time compressed equivalent of a real time minimum interval of interest.

64. The method of claim 52 wherein said step (d) of storing includes the step (iii) of deleting a previously stored time encoder time slot signal and level signal when storing a successive level signal and corresponding contemporaneous time encoder time slot signal.

65. The method of claim 52 further including the steps (f) of reading from said storage means during a predetermined portion of at least one of said time frames a stored level signal and the contemporaneous time encoder time slot signal and (g) writing the signals read by step (f) into an output memory device.

66. The method of claim 65 further including the steps of:

(h) repeatedly generating a second plurality of ordered groups of time decoder time slot signals, each time decoder time slot signal defining a successive time decoder time slot each having a period substantially greater than the period of said time encoder time slots, said groups of time decoder time slot signals defining successive time decoder time frames each having a duration substantially greater than the duration of said time encoder time frames;

(j) reading a predetermined number of said time encoder time slot signals and corresponding level signals sequentially from said output memory device during the duration of the given time decoder time slot;

(k) comparing the successively read time encoder time slot signals with said given time decoder time slot signal; and (l) generating a strobe signal for enabling the corresponding level signal to be stored in an associated latch when said step (k) provides a comparison.

67. The method of claim 66 wherein each of said time decoder time slot signals comprises a multi-bit digital character.

68. A system for encoding a periodic signal having a minimum interval of interest, said system comprising:

means for repeatedly generating a plurality of ordered groups of time encoder time slot signals, each time encoder time slot signal defining a successive time encoder time slot having a period substantially less than said minimum interval of interest, said groups defining successive time encoder time frames each having a duration less than said minimum interval of interest;

means for sensing the level of said periodic signal during at least one of said time encoder time frames;

means for detecting a level transition in said periodic signal;

storage means; and means for storing a signal representative of the level of said periodic signal and the contemporaneous one of said time encoder time slot signals in said storage means when a transition is sensed.

69. The combination of claim 68 wherein said sensing means includes means for sampling the level of said periodic signal during said at least one time encoder time frame.

70. The combination of claim 69 wherein said sampling means includes means for sampling said level of said periodic signal at least once during the appearance of each of said time encoder time slot signals.

71. The combination of claim 68 wherein said sensing means includes means for sampling the level of said periodic signal during successive time encoder time frames.

72. The combination of claim 68 wherein each of said time encoder time slot signals comprises a multi-bit digital character.

73. The combination of claim 68 further including control means responsive to the detection of a level transition by said detecting means for disabling said storing means for the remainder of the corresponding time frame and for reenabling said storing means after a predetermined time period.

74. The combination of claim 73 wherein each said time encoder time frame has a duration less than one-half of said minimum interval and wherein said control means includes means for reenabling said storing means after the end of said next succeeding time frame.

75. The combination of claim 68 wherein said minimum interval is the time between adjacent transitions in said periodic signal.

76. The combination of claim 68 wherein said minimum interval is the period of at least one cycle of said periodic signal.

77. The combination of claim 68 wherein said storing means includes means for storing a signal representative of the level of said periodic signal prior to said transition.

78. The combination of claim 68 wherein said storing means includes means for storing a signal representative of the level of said periodic signal after said transition.

79. The combination of claim 68 wherein said periodic signal comprises a time compressed representation of a real time periodic signal, and wherein said minimum interval is the time compressed equivalent of a real time interval of interest.

80. The combination of claim 68 wherein said storing means includes means for deleting a previously stored time encoder time slot signal and level signal when storing a successive level signal and corresponding contemporaneous time encoder time slot signal.

81. The combination of claim 68 further including means for reading from said storage means during a predetermined portion of said at least one time encoder time frame a stored level signal and the contemporaneous time encoder time slot signal, an output memory device, and means for storing in said output memory device a plurality of said level signals and corresponding contemporaneous time encoder time slot signals successively read from said storage means.

82. The combination of claim 81 further including means for repeatedly generating a second plurality of ordered groups of time decoder time slot signals, each time decoder time slot signal defining a successive time decoder time slot each having a period substantially greater than the period of said time encoder time slot, said groups of time decoder time slot defining successive time decoder time frames each having a duration substantially greater than the duration of said time encoder time frames;

second means for reading a predetermined number of said time encoder time slot signals and corresponding level signals sequentially from said output memory device during the duration of a given time decoder time slot;

means for comparing the successively read time encoder time slot signals with said given time decoder time slot signal;

latch means having a strobe signal input terminal and a data input terminal;

means coupled to said comparing means for generating a strobe signal when a time encoder time slot signal corresponds to said given time decoder time slot signal; and means for respectively coupling said strobe signal generating means and said level signals to said strobe signal input terminal and said data input terminal of said latch means.

83. The combination of claim 82 wherein each of said time encoder time slot signals and said time decoder time slot signals comprises a multi-bit digital character.

84. A method of processing multiple channel digital information signals, said method comprising the steps of:

(a) storing said digital signals in their order of appearance in an input memory device at a first per channel rate;

(b) reading successive groups of said digital signals from said input memory device at a second rate substantially greater than said first rate to effect time compression of said digital signals, each group containing digital signals from a single one of said channels and representing the time compressed equivalent of at least one time packet $P_i$ of information of predetermined temporal length, successive time packets $P_i$ being devoid of overlapping information;

(c) converting each of said single channel groups of digital signals to an equivalent analog signal segment of equivalent temporal length to said at least one time packet $P_i$;

(d) passing each of said analog signal segments through a frequency filter to remove unwanted frequency components;

(e) converting each of said analog signal segments after said step (d) of passing to a binary periodic signal;

(f) digitally encoding each said binary periodic signal to provide a group of resultant digital signals of equivalent temporal length to said at least one time packet $P_i$ by;

(i) repeatedly generating a plurality of ordered groups of time encoder time slot signals, each time encoder time slot signal defining a successive time encoder time slot having a period substantially less than a minimum interval of interest, said groups defining successive time encoder time frames each having a duration less than said minimum interval of interest;

(ii) sensing the level of said binary periodic signal during successive ones of said time encoder time frames;

(iii) detecting a level transition in said binary periodic signal; and (iv) storing a signal representative of the level of said binary periodic signal and the contemporaneous one of said time encoder time slot signals in a storage device when a transition is sensed, said representative signal and said contemporaneous time slot signal comprising a resultant digital signal;

(g) storing each said group of resultant digital signals in an output memory device at a third rate; and (h) reading said resultant digital signals from said output memory device at a fourth per channel rate; said fourth rate enabling the resultant digital signals comprising each channel group to be read out during a time period $P_0$ no greater than the temporal length of said time packet $P_i$;

the ratio of said second rate to said first rate being equal to the ratio of said third rate to said fourth rate multiplied by $P_i/P_0$ to effect a time expansion which compensates for said time compression.

85. The method of claim 84 wherein said step (d) of passing includes the step of passing each of said analog segments through a pair of parallel branch band pass filters to provide a pair of analog signal train segments each having frequency components which lie substantially entirely within the pass band of the filter associated thereto; said step (e) of converting includes the step of generating a pair of binary periodic signals each corresponding to a different one of said pair of analog signal train segments; and said step (f) of digitally encoding is performed on each said pair of binary periodic signals to provide two groups of resultant digital signals for each said analog signal segment.

86. The method of claim 85 wherein said step (g) of storing includes the step of storing said two groups of resultant digital signals in different portions of said output memory device, said group being stored at said third rate.

87. The method of claim 84 wherein each single channel digital signal group read from said input memory device during said step (b) includes at least a portion of a previously read time packet $P_i$ of information from the same information channel.

88. The method of claim 84 wherein said time period $P_0$ is equal to the temporal length of said time packet $P_i$.

89. The method of claim 84 wherein said step (ii) of sensing includes the step of repeatedly sampling the level of said binary periodic signal during said successive time encoder time frames.

90. The method of claim 89 wherein said step of repeatedly sampling is performed at a fifth rate equal to the frequency of generation of said time encoder time slots.

91. The method of claim 84 wherein each of said time encoder time slot signals comprises a multi-bit digital character.

92. The method of claim 84 further including the step of terminating said step (iv) of storing for the remainder of the corresponding time encoder time frame when a transition is detected.

93. The method of claim 92 wherein said step (i) of generating includes the step of limiting said time encoder time frame to a duration less than one-half of said minimum interval and wherein said step of terminating is performed for the remainder of said corresponding time encoder time frame and the next succeeding time encoder time frame.

94. The method of claim 84 wherein said minimum interval is the time between adjacent transitions in said periodic signal.

95. The method of claim 84 wherein said minimum interval is the period of at least one cycle of said periodic signal.

96. The method of claim 84 wherein said step (iv) of storing includes the step of storing a signal representative of the level of said binary periodic signal prior to said transition.

97. The method of claim 84 wherein said step (iv) of storing includes the step of storing a signal representative of the level of said binary periodic signal after said transition.

98. The method of claim 84 wherein said step (iv) of storing includes the step of deleting a previously stored time encoder time slot signal and level signal when storing a successive level signal and corresponding contemporaneous time encoder time slot signal in said storage device.

99. The method of claim 84 wherein said step of reading further includes the steps of:
(j) repeatedly generating a corresponding second plurality of ordered groups of time decoder time slot signals, each time decoder time slot signal defining a successive time decoder time slot each having a period substantially greater than the period of said time encoder time slots, said groups of time decoder time slot signals defining successive time decoder time frames each having a duration substantially greater than the duration of said time encoder time frames;
(k) reading a predetermined number of said resultant digital signals sequentially from said output memory device during the duration of the given time decoder time slot;
(l) comparing the successively read time encoder time slot signal portion of said resultant digital signals with said given time decoder time slot signal; and
(m) generating a strobe signal for enabling the corresponding level signal portion of said resultant digital signal to be stored in an associated latch when said step (l) provides a comparison.

100. The method of claim 99 wherein each of said time encoder and time decoder time slot signals comprises a multi-bit digital character.

101. The method of claim 99 wherein the ratio of said third rate to said fourth rate equals the ratio of the rate of generation of said time encoder time slot signals to the rate of generation of said time decoder time slot signals.

102. The method of claim 99 wherein the number of time encoder time slot signals per time encoder time frame equals the number of time decoder time slot signals per time decoder time frame.

103. A system for processing multiple channel digital information signals encoded in a first format, said system comprising:
an input memory device for storing a plurality of said digital information signals;
first means for storing said digital signals in their order of appearance in said input memory device at a first per channel rate;
first means for reading successive groups of said digital signals from said input memory device at a second rate substantially greater than said first rate to effect time compression of said digital signals, each group containing digital signals from a single one of said channels and representing the time compressed equivalent of at least one time packet $P_i$ of information of predetermined temporal length, successive time packets $P_i$ being devoid of overlapping information;
first means for converting each of said single channel groups of digital signals to an equivalent analog signal segment of equivalent temporal length to said at least one time packet $P_i$;
filtering means for removing unwanted frequency components from each of said analog signal segments;
second means for converting each of said analog signal segments output from said filtering means to a binary periodic signal;
means for encoding each said binary periodic signal to provide a group of resultant digital signals of equivalent temporal length to said at least one time packet $P_i$, said encoding means comprising:
means for repeatedly generating a plurality of ordered groups of time encoder time slot signals, each time encoder time slot signal defining a successive time encoder time slot having a period substantially less than a minimum interval of interest, said groups defining successive time encoder time frames each having a duration less than said minimum interval of interest;

means for sensing the level of said binary periodic signal during successive ones of said time encoder time frames;

means for detecting a level transition in said binary periodic signal;

a storage device; and second means for storing a signal representative of the level of said binary periodic signal and the contemporaneous one of said time encoder time slot signals in said storage device when a transition is sensed, said representative signal and said contemporaneous time slot signal comprising a resultant digital signal;

an output memory device for storing a plurality of said resultant digital signals;

third means for storing each of said groups of resultant digital signals in said output memory device at a third rate; and second means for reading said resultant digital signals from said output memory device at a fourth per channel rate, said fourth rate enabling the resultant digital signals comprising each channel group to be read out during a time period $P_0$ no greater than the temporal length of said time packet $P_i$;

the ratio of said second rate to said first rate being equal to the ratio of said third rate to said fourth rate multiplied by the ratio $P_i/P_0$ to effect a time expansion which compensates for said time compression.

104. The combination of claim 103 wherein said filtering means includes a pair of parallel branch band pass filters for providing a pair of analog signal train segments each having frequency components which lie substantially entirely within the pass band of the filter associated thereto; said first converting means includes means for generating a pair of binary periodic signals each corresponding to a different one of said pair of analog signal train segments; and said encoding means includes means for providing two groups of said resultant digital signals for each said analog signal segment.

105. The combination of claim 104 wherein said third storing means includes means for storing said two groups of resultant digital signals in different portions of said output memory device, each group being stored at said third rate.

106. The combination of claim 103 wherein said first reading means includes means for reading at least a portion of a previously read time packet $P_i$ of information from the same information channel for each single channel digital signal group.

107. The combination of claim 103 wherein said time period $P_0$ is equal to the temporal length of said time packet $P_i$.

108. The combination of claim 103 wherein said sensing means includes means for repeatedly sampling the level of said binary periodic signal during said successive time encoder time frames.

109. The combination of claim 108 wherein said sampling means includes clock means for generating a sample clock having a frequency equal to the rate of generation of said time encoder time slots.

110. The combination of claim 103 wherein each of said time encoder time slot signals comprises a multi-bit digital character.

111. The combination of claim 103 further including control means responsive to the detection of a level transition by said detecting means for disabling said second storing means for the remainder of the corresponding time frame and for reenabling said storing means after a predetermined time period.

112. The combination of claim 111 wherein each said time encoder time frame has a duration less than one-half of said minimum interval and wherein said control means includes means for reenabling said storing means after the end of the next succeeding time frame.

113. The combination of claim 103 wherein said minimum interval is the time between adjacent transitions in said periodic signal.

114. The combination of claim 103 wherein said minimum interval is the period of at least one cycle of said periodic signal.

115. The combination of claim 103 wherein said second storing means includes means for storing a signal representative of the level of said binary periodic signal prior to said transition.

116. The combination of claim 103 wherein said second storing means includes means for storing a signal representative of the level of said binary periodic signal after said transition.

117. The combination of claim 103 wherein said second storing means includes means for deleting a previously stored time encoder time slot signal and level signal when storing a successive level signal and corresponding contemporaneous time encoder time slot signal.

118. The combination of claim 103 further including time decoder means including means for repeatedly generating a second plurality of ordered groups of time decoder time slot signals, each time decoder time slot signal defining a successive time decoder time slot each having a period substantially greater than the period of said time encoder time slots, said groups of time decoder time slot signals defining successive time decoder time frames each having a duration substantially greater than the duration of said time encoder time frames;

buffer storage means for temporarily storing a predetermined number of said resultant digital signals read from said output memory device;

third means for sequentially reading said predetermined number of said resultant digital signals from said buffer storage means during the duration of a given time decoder time slot;

means for comparing the successively read time encoder time slot signals with said given time decoder time slot signal;

latch means having a strobe signal input terminal and a data input terminal;

means coupled to said comparing means for generating a strobe signal when a time encoder time slot signal corresponds to said given time decoder time slot signal; and means for respectively coupling said strobe signal generating means and said level signals to said strobe signal input terminal and said data input terminal of said latch means.

119. The combination of claim 118 wherein each of said time encoder time slot signals and said time decoder time slot signals comprises a multi-bit digital character.

* * * * *